(12) United States Patent
Seifert et al.

(10) Patent No.: US 11,340,620 B2
(45) Date of Patent: May 24, 2022

(54) NAVIGATING A MOBILE ROBOT

(71) Applicant: Boston Dynamics, Inc., Waltham, MA (US)

(72) Inventors: Samuel Seifert, Boston, MA (US);
Marco da Silva, Arlington, MA (US);
Alexander Rice, Boston, MA (US);
Leland Hepler, Boston, MA (US);
Mario Bollini, Boston, MA (US);
Christopher Bentzel, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 196 days.

(21) Appl. No.: 16/661,062

(22) Filed: Oct. 23, 2019

(65) Prior Publication Data

US 2021/0041878 A1 Feb. 11, 2021

Related U.S. Application Data

(60) Provisional application No. 62/883,643, filed on Aug. 7, 2019.

(51) Int. Cl.
*G05D 1/02* (2020.01)
*B25J 9/16* (2006.01)
(Continued)

(52) U.S. Cl.
CPC .......... *G05D 1/0214* (2013.01); *B25J 9/1697* (2013.01); *B25J 13/089* (2013.01);
(Continued)

(58) Field of Classification Search
CPC .. G05D 1/0214; G05D 1/0016; G05D 1/0044; G05D 1/0061; G05D 1/0088; G05D 1/0238; G05D 1/0246
See application file for complete search history.

(56) References Cited

U.S. PATENT DOCUMENTS 8,073,564 B2 * 12/2011 Bruemmer ........... G05D 1/0027
   700/245
10,816,994 B2 * 10/2020 Tian ....................... B25J 13/085
(Continued)

OTHER PUBLICATIONS

International Search Report, Application No. PCT/US2019/057586, dated Feb. 3, 2020, 13 pages.

*Primary Examiner* — Nicholas Kiswanto
(74) *Attorney, Agent, or Firm* — Honigman LLP; Brett A. Krueger

(57) ABSTRACT

A method for controlling a robot includes receiving image data from at least one image sensor. The image data corresponds to an environment about the robot. The method also includes executing a graphical user interface configured to display a scene of the environment based on the image data and receive an input indication indicating selection of a pixel location within the scene. The method also includes determining a pointing vector based on the selection of the pixel location. The pointing vector represents a direction of travel for navigating the robot in the environment. The method also includes transmitting a waypoint command to the robot. The waypoint command when received by the robot causes the robot to navigate to a target location. The target location is based on an intersection between the pointing vector and a terrain estimate of the robot.

28 Claims, 34 Drawing Sheets

(51) Int. Cl.
 B25J 13/08 (2006.01)
 G05D 1/00 (2006.01)
(52) U.S. Cl.
 CPC ......... G05D 1/0016 (2013.01); G05D 1/0044 (2013.01); G05D 1/0061 (2013.01); G05D 1/0088 (2013.01); G05D 1/0238 (2013.01); G05D 1/0246 (2013.01)

(56) References Cited

U.S. PATENT DOCUMENTS

2001/0037163 A1 11/2001 Allard
2015/0190925 A1 7/2015 Hoffman et al.
2017/0203446 A1 7/2017 Dooley et al.

* cited by examiner

Time = $T_1$

Time = $T_2$

NAVIGATING A MOBILE ROBOT

CROSS-REFERENCE TO RELATED APPLICATIONS

This application claims priority under 35 U.S.C. § 119(e) to U.S. Provisional Patent Application 62/883,643, filed on Aug. 7, 2019. The disclosure of this prior application is considered part of the disclosure of this application and is hereby incorporated by reference in its entirety.

TECHNICAL FIELD

This disclosure relates to navigating mobile robots.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be easy and intuitive for people to operate and navigate.

SUMMARY

One aspect of the disclosure provides a method for controlling a robot. The method includes receiving, at data processing hardware of an operator device, image data from at least one image sensor. The image data corresponds to an environment about the robot. The method also includes executing, by the data processing hardware, a graphical user interface (GUI) for display on a screen of the operator device. The GUI is configured to display a scene of the environment about the robot based on the image data and receive an input indication indicating selection of a pixel location within the scene of the environment about the robot. The method also includes determining, by the data processing hardware, a pointing vector V based on the selection of the pixel location. The pointing vector represents a direction of travel for navigating the robot in the environment. The method also includes transmitting, by the data processing hardware, a waypoint command W to the robot. The waypoint command W when received by the robot causes the robot to navigate to a target location T. The target location is based on an intersection between the pointing vector V and a terrain estimate G of the robot. The terrain estimate G may include a ground plane estimate. For simplicity, the present disclosure will refer to the "terrain estimate" as the "ground plane estimate".

Implementations of the disclosure may include one or more of the following optional features. In some implementations, the scene of the environment about the robot includes any one of: a forward scene of the environment based on the image data, the image data captured by a forward-left camera and a forward-right camera disposed on the robot; a left scene of the of the environment based on the image data, the image data captured by a left camera disposed on the robot; a right scene of the environment based on the image data, the image data captured by a right camera disposed on the mobile robot; an aft scene of the environment based on the image data, the aft scene captured by an aft camera disposed on the robot; or a top-down scene of the robot based on the image data, the image data captured by a payload camera, the forward-left camera, the forward-right camera, the left camera, the right camera, and the aft camera.

In some examples, the method further includes determining, by the data processing hardware, whether the intersection between the pointing vector and the terrain estimate is in front of the robot, and when the intersection between the pointing vector and the terrain estimate is in front of the robot, identifying, by the data processing hardware, the intersection as the target location. In these examples, the method may further include, when the intersection between the pointing vector and the terrain estimate is behind the robot: reflecting, by the data processing hardware, the intersection to determine a reflected intersection in front of the robot; and identifying, by the data processing hardware, the reflected intersection as the target location. Additionally or alternatively, in these examples, the method may further include, prior to identifying the intersection as the target location: determining, by the data processing hardware, that a first distance between a current position of the robot and the intersection between the pointing vector and the terrain estimate dissatisfies a threshold distance; and moving, by the data processing hardware, the intersection to an intermediate location closer to the robot to form a moved intersection, wherein a second distance between the current position of the robot and the moved intersection satisfies the threshold distance.

The robot may be configured to determine whether the target location is located behind an obstacle. Here, the robot is configured to autonomously navigate to the target location when the target location is not located behind the obstacle. However, when the target location is located behind the obstacle, the robot is configured to determine whether maneuvering around the obstacle is feasible, and when maneuvering around the obstacle is feasible, autonomously navigate the robot around the obstacle and to the target location. Additionally, when the target location is located behind the obstacle and when maneuvering around the obstacle is not feasible, the robot may be further configured to prevent the robot from autonomously navigating to the target location.

In some implementations, the at least one image sensor includes one or more fisheye cameras and one or more infrared cameras. The at least one image sensor may be disposed on the robot and the operator device may be in communication with the image sensor via a network.

In some examples, the graphical user interface is further configured to: receive a rotation input to rotate a field of view of the environment about the robot in a direction away from a current scene displayed in the graphical user interface; and display a preview scene by rotating the field of view of the environment about the robot in the direction away from the current scene. The graphical user interface may be configured to display the preview scene without requiring physical movement by the robot and/or the graphical user interface may be configured to receive the rotation input in response to receiving an input indication indicating selection of a rotation graphic displayed in the graphical user interface. In additional examples, the rotation of the field of view of the environment about the robot in the direction away from the current scene simulates the robot executing a turning maneuver in the direction away from the current scene and toward the preview scene.

Another aspect of the disclosure provides for a system for operating a robot. The system includes data processing hardware and memory hardware in communication with the data processing hardware. The memory hardware stores instructions that when executed on the data processing hardware cause the data processing hardware to perform operations that include receiving image data from at least one image sensor. The image data corresponds to an environment about the robot. The operations also include executing a graphical user interface (GUI) for display on a screen of the operator device. The GUI is configured to display a scene of the environment about the robot based on the image data and receive an input indication indicating selection of a pixel location within the scene of the environment about the robot. The operations also include determining a pointing vector V based on the selection of the pixel location. The pointing vector represents a direction of travel for navigating the robot in the environment. The operations also include transmitting a waypoint command W to the robot. The waypoint command W when received by the robot causes the robot to navigate to a target location T. The target location is based on an intersection between the pointing vector V and a terrain estimate G of the robot.

Implementations of the disclosure may include one or more of the following optional features. In some implementations, the scene of the environment about the robot includes any one of: a forward scene of the environment based on the image data, the image data captured by a forward-left camera and a forward-right camera disposed on the robot; a left scene of the of the environment based on the image data, the image data captured by a left camera disposed on the robot; a right scene of the environment based on the image data, the image data captured by a right camera disposed on the mobile robot; an aft scene of the environment based on the image data, the aft scene captured by an aft camera disposed on the robot; or a top-down scene of the robot based on the image data, the image data captured by a payload camera, the forward-left camera, the forward-right camera, the left camera, the right camera, and the aft camera.

In some examples, the operations further include determining whether the intersection between the pointing vector and the terrain estimate is in front of the robot, and when the intersection between the pointing vector and the terrain estimate is in front of the robot, identifying the intersection as the target location. In these examples, the operations may further include, when the intersection between the pointing vector and the terrain estimate is behind the robot: reflecting the intersection to determine a reflected intersection in front of the robot; and identifying the reflected intersection as the target location. Additionally or alternatively, in these examples, the operations may further include, prior to identifying the intersection as the target location: determining that a first distance between a current position of the robot and the intersection between the pointing vector and the terrain estimate dissatisfies a threshold distance; and moving the intersection to an intermediate location closer to the robot to form a moved intersection, wherein a second distance between the current position of the robot and the moved intersection satisfies the threshold distance.

The robot may be configured to determine whether the target location is located behind an obstacle. Here, the robot is configured to autonomously navigate to the target location when the target location is not located behind the obstacle. However, when the target location is located behind the obstacle, the robot is configured to determine whether maneuvering around the obstacle is feasible, and when maneuvering around the obstacle is feasible, autonomously navigate the robot around the obstacle and to the target location. Additionally, when the target location is located behind the obstacle and when maneuvering around the obstacle is not feasible, the robot may be further configured to prevent the robot from autonomously navigating to the target location. The robot may include a quadruped robot.

In some implementations, the at least one image sensor includes one or more fisheye cameras and one or more infrared cameras. The at least one image sensor may be disposed on the robot and the operator device may be in communication with the image sensor via a network.

In some examples, the graphical user interface is further configured to: receive a rotation input to rotate a field of view of the environment about the robot in a direction away from a current scene displayed in the graphical user interface; and display a preview scene by rotating the field of view of the environment about the robot in the direction away from the current scene. The graphical user interface may be configured to display the preview scene without requiring physical movement by the robot and/or the graphical user interface may be configured to receive the rotation input in response to receiving an input indication indicating selection of a rotation graphic displayed in the graphical user interface. In additional examples, the rotation of the field of view of the environment about the robot in the direction away from the current scene simulates the robot executing a turning maneuver in the direction away from the current scene and toward the preview scene.

Another aspect of the disclosure provides a method for navigating a mobile robot. The method includes receiving, at data processing hardware, a pixel location in a scene of a robotic environment captured by a camera on a mobile robot and determining, by the data processing hardware, a pointing vector from the pixel location and calibration information of the camera. The pixel location being received is selected by an operator of the mobile robot. The method further includes combining, by the data processing hardware, the pointing vector with a terrain estimate of the mobile robot to form an intersection. The intersection includes a physical location in the robotic environment. The method further includes transmitting, by the data processing hardware, the physical location to the mobile robot causing the mobile robot to navigate to the physical location in the robotic environment.

Implementations of the disclosure may include one or more of the following optional features. In some implementations, the scene is any one of i) a forward scene of the robotic environment captured by a forward-left camera and a forward-right camera on the mobile robot, ii) a left scene of the robotic environment captured by a left camera on the mobile robot, iii) a right scene of the robotic environment captured by a right camera on the mobile robot, iv) an aft scene of the robotic environment captured by an aft camera on the mobile robot, and v) a top-down scene of the robotic environment captured by a hypothetical camera positioned above the mobile robot.

In some examples of the method, combining the pointing vector with the terrain estimate to form the intersection includes determining, by the data processing hardware, whether a distance between the mobile robot and the intersection is greater than a distance threshold of the mobile robot. These examples of the method further include when the distance is greater than the distance threshold of the mobile robot, moving, by the data processing hardware, the intersection closer to the mobile robot to form a moved intersection such that a shortened distance between the mobile robot and the moved intersection is less than or equal to the distance threshold.

In other examples of the method, combining the pointing vector with the terrain estimate to form the intersection includes determining, by the data processing hardware, whether the intersection is behind the mobile robot. These examples of the method further include when the intersection is behind the mobile robot, reflecting, by the data processing hardware, the intersection in front of the mobile robot to form a reflected intersection. Here, the reflected intersection includes another physical location in the robotic environment for the mobile robot to navigate to. Optionally, some other examples of the method further include determining, by the data processing hardware, whether a distance between the mobile robot and the reflected intersection is greater than a distance threshold of the mobile robot. These other examples of the method further include when the distance is greater than the distance threshold of the mobile robot, moving, by the data processing hardware, the reflected intersection closer to the mobile robot to form a moved intersection such that a shortened distance between the mobile robot and the moved intersection is less than or equal to the distance threshold of the mobile robot.

In some examples of the method, the scene of the robotic environment includes a first scene of the robotic environment captured by a first camera on the mobile robot and at least one second scene of the robotic environment different than the first scene of the robotic environment. The at least one second scene of the robotic environment captured by at least one second camera on the mobile robot is different than the first camera on the mobile robot. In these examples, the method further includes displaying, by the data processing hardware, the first scene of the robotic environment together with the at least one second scene of the robotic environment. The method further includes in response to the operator changing between the first scene of the robotic environment and the at least one second scene of the robotic environment, changing, by the data processing hardware, a direction in which the mobile robot navigates.

In other examples of the method, the scene is a first-person view of the robotic environment and the method further includes displaying, by the data processing hardware, the scene together with and a top-down scene of the robotic environment captured by a hypothetical camera positioned above the mobile robot. The method further includes in response to a pixel location selection in one of the displayed scenes, mirroring, by the data processing hardware, the pixel location selection in another one of the displayed scenes.

In some examples of the method, transmitting the physical location in the robotic environment includes transmitting a position command with the physical location to the mobile robot. Optionally, the camera may have a fisheye camera and two infrared cameras. Additionally, the mobile robot may have four legs.

Another aspect of the disclosure provides for a system for navigating a mobile robot. The system includes data processing hardware and memory hardware in communication with the data processing hardware. The memory hardware stores instructions that when executed on the data processing hardware cause the data processing hardware to perform operations including receiving a pixel location in a scene of a robotic environment captured by a camera on a mobile robot and determining a pointing vector from the pixel location and calibration information of the camera. The pixel location is selected by an operator of the mobile robot. The operations performed by the data processing hardware further include combining the pointing vector with a terrain estimate of the mobile robot to form an intersection. The intersection includes a physical location in the robotic environment. The operations performed by the data processing hardware further include transmitting the physical location to the mobile robot causing the mobile robot to navigate to the physical location in the robotic environment.

Implementations of the disclosure may include one or more of the following optional features. In some implementations, the scene is any one of i) a forward scene of the robotic environment captured by a forward-left camera and a forward-right camera on the mobile robot, ii) a left scene of the robotic environment captured by a left camera on the mobile robot, iii) a right scene of the robotic environment captured by a right camera on the mobile robot, iv) an aft scene of the robotic environment captured by an aft camera on the mobile robot, and v) a top-down scene of the robotic environment captured by a hypothetical camera positioned above the mobile robot.

In some examples of the system, the operation of combining the pointing vector with the terrain estimate to form the intersection includes determining whether a distance between the mobile robot and the intersection is greater than a distance threshold of the mobile robot. The operations further include when the distance is greater than the distance threshold of the mobile robot, moving the intersection closer to the mobile robot to form a moved intersection such that a shortened distance between the mobile robot and the moved intersection is less than or equal to the distance threshold.

In other examples of the system, the operation of combining the pointing vector with the terrain estimate to form the intersection includes determining whether the intersection is behind the mobile robot. The operations further include when the intersection is behind the mobile robot, reflecting the intersection in front of the mobile robot to form a reflected intersection. Here, the reflected intersection includes another physical location in the robotic environment for the mobile robot to navigate to. Optionally, in some other examples of the system, the operations further include determining whether a distance between the mobile robot and the reflected intersection is greater than a distance threshold of the mobile robot. The operation further include when the distance is greater than the distance threshold of the mobile robot, moving, by the data processing hardware, the reflected intersection closer to the mobile robot to form a moved intersection such that a shortened distance between the mobile robot and the moved intersection is less than or equal to the distance threshold of the mobile robot.

In some examples of the system, the scene of the robotic environment includes a first scene of the robotic environment captured by a first camera on the mobile robot and at least one second scene of the robotic environment different than the first scene of the robotic environment. The at least one second scene of the robotic environment captured by at least one second camera on the mobile robot is different than the first camera on the mobile robot. In these examples of the system, the operations further includes displaying the first scene of the robotic environment together with the at least one second scene of the robotic environment. The operations further include in response to the operator changing between the first scene of robotic the environment and the at least one second scene of the robotic environment, changing a direction in which the mobile robot navigates.

In other examples of the system, the scene is a first-person view of the robotic environment and the operations further include displaying the scene together with and a top-down scene of the robotic environment captured by a hypothetical camera positioned above the mobile robot. The operation further includes in response to a pixel location selection in one of the displayed scenes, mirroring the pixel location selection in another one of the displayed scenes.

In some examples of the system, the operation of transmitting the physical location in the robotic environment includes transmitting a position command with the physical location to the mobile robot. Optionally, the camera may have a fisheye camera and two infrared cameras. Additionally, the mobile robot may have four legs.

Yet another aspect of the disclosure provides for a method for "pre-rotating" a mobile robot. The method includes receiving, at data processing hardware, a real image of a forward view of a robotic environment captured by a one or more real cameras disposed on a mobile robot. Where the mobile robot is in a forward orientation and facing a forward direction. The method further includes determining, by the data processing hardware, a preview angle by which the mobile robot will rotate when turning from the forward orientation to a turned orientation, where the mobile robot is facing a rightward direction or a leftward direction. The method further includes for each point on a virtual rectangle projected by the hypothetical scene camera, determining, by the data processing hardware, whether a respective point corresponds to a pixel in the real image and displaying, by the data processing hardware, a preview scene includes the corresponding pixels. The preview scene being displayed is a view of the robotic environment that is turned by the preview angle in either the rightward direction or the leftward direction without the mobile robot actually turning from the forward orientation to the turned orientation.

Implementations of the disclosure may include one or more of the following optional features. In some implementations, the method further includes when the respective point on the virtual rectangle corresponds to the pixel in the real image, coloring in, by the data processing hardware, the respective point with an image color from the corresponding pixel. The method further includes when the respective point on the virtual rectangle does not correspond to any pixel in the real image, coloring in, by the data processing hardware, the respective point black. The method further includes rendering, by the data processing hardware, the preview scene based on the colored in virtual rectangle.

In other examples of the method, determining the preview angle includes receiving, by the data processing hardware, a virtual velocity corresponding to user input provided by an operator for controlling the mobile robot to turn from the forward orientation to the turned orientation. These examples of the method further include integrating, by the data processing hardware, the virtual velocity over time to generate the preview angle.

Some examples of the method further include starting, by the data processing hardware, a countdown timer in response to an operator providing user input for controlling the mobile robot to turn from the forward orientation to the turned orientation. These examples of the method further include before the countdown timer expires, determining continuously, by the data processing hardware, the preview angle to which to turn the view of the robotic environment based on the user input provided by the operator. These examples of the method further include when the countdown timer expires, transmitting, by the data processing hardware, an angle of rotation that is equal to the preview angle to the mobile robot causing the mobile robot to turn by the angle of rotation from the forward orientation to the turned orientation.

In other examples of method, the real image of the forward view of the robotic environment is captured by a forward-left camera and a forward-right camera disposed on the mobile robot. Optionally, the camera may have a fisheye camera and two infrared cameras. Additionally, the mobile robot may have four legs.

Still yet another aspect of the disclosure provides for a system for "pre-rotating" a mobile robot. The system includes data processing hardware and memory hardware in communication with the data processing hardware. The memory hardware stories instructions that when executed on the data processing hardware cause the data processing hardware to perform operations including receiving a real image of a forward view of a robotic environment captured by a one or more real cameras disposed on a mobile robot, where the mobile robot is in a forward orientation and facing a forward direction. The operations performed by the data processing hardware further include determining a preview angle by which the mobile robot will rotate when turning from the forward orientation to a turned orientation, where the mobile robot is facing a rightward direction or a leftward direction. The operations performed by the data processing hardware further include for each point on a virtual rectangle projected by the hypothetical scene camera, determining whether a respective point corresponds to a pixel in the real image and displaying a preview scene including the corresponding pixels. The preview scene being a view of the robotic environment that is turned by the preview angle in either the rightward direction or the leftward direction without the mobile robot actually turning from the forward orientation to the turned orientation.

Implementations of the disclosure may include one or more of the following optional features. In some implementations, the operations further include when the respective point on the virtual rectangle corresponds to the pixel in the real image, coloring in the respective point with an image color from the corresponding pixel. The operations further include when the respective point on the virtual rectangle does not correspond to any pixel in the real image, coloring in, by the data processing hardware, the respective point black. The operations further rendering hardware the preview scene based on the colored in virtual rectangle.

In other examples of the system, the operation of determining the preview angle includes receiving a virtual velocity corresponding to user input provided by an operator for controlling the mobile robot to turn from the forward orientation to the turned orientation. These examples of the system further include integrating the virtual velocity over time to generate the preview angle.

In some examples of the system, the operations further include starting a countdown timer in response to an operator providing user input for controlling the mobile robot to turn from the forward orientation to the turned orientation. In these examples of the system, the operations further include before the countdown timer expires, determining continuously the preview angle to which to turn the view of the robotic environment based on the user input provided by the operator. In these examples of the system, the operations further include when the countdown timer expires, transmitting an angle of rotation that is equal to the preview angle to the mobile robot causing the mobile robot to turn by the angle of rotation from the forward orientation to the turned orientation.

In other examples of system, the real image of the forward view of the robotic environment is captured by a forward-left camera and a forward-right camera disposed on the mobile robot. Optionally, the camera may have a fisheye camera and two infrared cameras. Additionally, the mobile robot may have four legs.

DESCRIPTION OF DRAWINGS

Like reference symbols in the various drawings indicate like elements.

DETAILED DESCRIPTION

Figure 1:
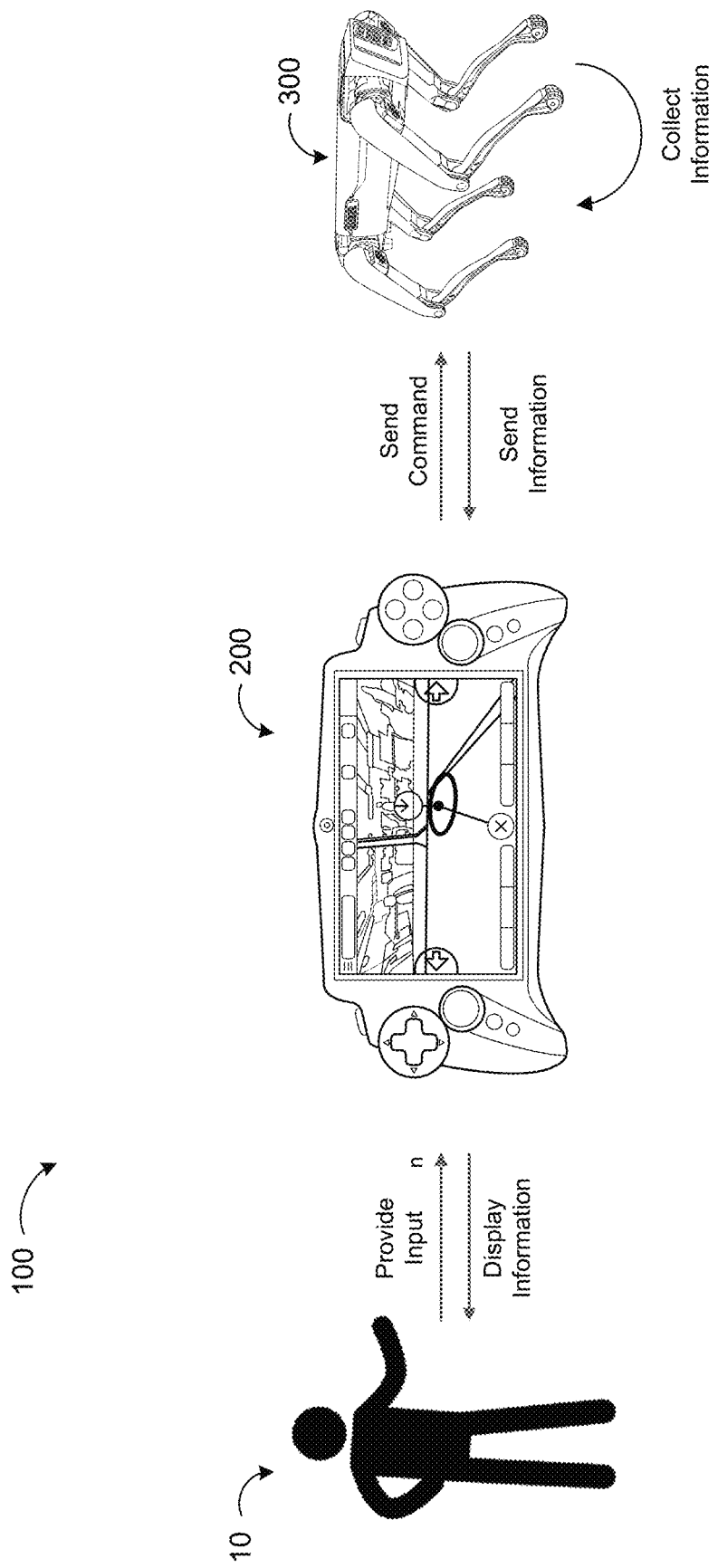
FIG. 1 is a block diagram of an example system for navigating a robot.

FIG. 1 shows a system 100 for navigating a robot 300 in which an operator 10 uses a mobile device 200 to navigate the robot 300 within a robotic environment. The robotic environment generally refers to a spatial area associated with some type of terrain that may be traversed by a robot 300. For example, the terrain may include an urban terrain having buildings, streets, sidewalks, parks, alleys, stairs, ramps, tunnels, etc.; a rural terrain having roads, fields, hills, mountains, caves, etc.; a subterranean terrain, having caves, tunnels, etc.; or any combination thereof.

The robot 300 collects information about the robotic environment surrounding the robot 300 was well as information associated with operating in the robotic environment. The robot 300 sends some or all of this information to the mobile device 200, including an image of the robotic environment captured by the robot 300. The mobile device 200 then displays the image to the operator 10 so that the operator 10 can view the robotic environment that the robot 300 is operating in, which in this example is the interior of a warehouse. In some examples, the operator 10 views the robotic environment from the perspective of the robot 300. Such a "first person" experience may be beneficial to certain applications of the system 100. The mobile device 200 displays the image of the robotic environment 301 (FIG. 2) on a user interface 221 (FIG. 2) and the operator 10 may provide a navigation input (e.g., waypoint command W) indicating selection of a location within the image that corresponds to a physical location (e.g., a target location T) in the robotic environment 301 where the operator 10 wants the robot 300 to navigate. In some examples, the navigation input (e.g., waypoint command W) indicating selection of the location within the image is sent from the mobile device 200 to the robot 300 as a point in world space corresponding to an origin the scene of the robotic environment 301 is rendered from, as well as a direction in world space corresponding to the location within the image selected by the operator 10. For instance, the mobile device 200 may execute a graphical user interface (GUI) 221 for displaying the image of the robotic environment on a screen 220 (FIG. 2) of the mobile device 200 and the operator 10 may provide the navigation input by touching the location within the image to navigate the robot 300 to the target location T. In additional examples, the operator 10 provides the navigation input via a physical button, mouse, joystick, or any other input mechanism. As used herein, the navigation input refers to an input indication selection of the location with the image that corresponds to the target location T (e.g., physical location).

In response to receiving the navigation input, the mobile device 200 sends a position command to the robot 300 that instructs the robot 300 to navigate to the target location in the robotic environment. When navigating to the target location in response to receiving the position command, the robot 300 may need to avoid an obstacle (e.g., a column) or go around a corner. The robot 300 is able to plan how to navigate to the target location given the restrictions of the robotic environment. In some scenarios, the robot 300 determines that it is unable to navigate to the target location selected by the operator 10, in which case the mobile device 200 may notify the operator 10 (e.g., by displaying a notification on the GUI and/or providing an audible alert).

As the robot 300 moves toward the target location, characteristics of the robotic environment relative to the robot 300 may change (e.g. from a flat terrain to a hilly terrain). Accordingly, the robot 300 may continuously, or at regular intervals, send updated environment information to the mobile device 200, including updated image data reflecting changes in the robotic environment. The mobile device 200 may display the updated image data to allow the operator 10 to view the robot's 300 progress while traversing through the robotic environment towards the target location.

In some implementations, the mobile device 200 is configured to display a destination image that shows the robot 300 at the target location upon reaching the target location. The operator 10 can then provide a new navigation input in the destination image that corresponds to a new target location in the robotic environment that the operator 10 wants the robot 300 to navigate. The foregoing operation repeats until the operator 10 finishes navigating the robot 300 (e.g., the robot 300 has reached the final destination in the robotic environment).

In navigating the robot 300, it may be necessary to turn the robot 300 in the robotic environment and change from a present orientation to a target orientation. The operator 10 clicks/touches a direction in an image corresponding to a target direction in which the operator 10 wants the robot 300 to turn from the present orientation (e.g., left or right) in the robotic environment. In response, the mobile device 200 displays an updated image of a view that is turned in a direction corresponding to the target direction. This gives the operator 10 the impression that the robot 300 is turning from the present orientation to the target orientation. The updated image displaying the view in the direction corresponding to the target direction may occur without actually turning/maneuvering the robot from the present orientation, thereby allowing the operator 10 to view the robot environment in the updated image from the perspective of the target orientation.

In reality, the robot 300 does not immediately execute any turning maneuver such that an actual orientation of the robot 300 remains fixed at the present orientation in the robotic environment. The mobile device 200 continues to rotate the view until the operator 10 stops clicking/touching the direction and stops at the target orientation. An angle of rotation separates the present orientation and the target orientation.

Thereafter, the mobile device 200 may send a rotation command to the robot 300 that instructs the robot 300 to execute a turning maneuver in the robotic environment based on the angle of rotation set by the operator 10. Pre-rotating the robot's 300 view of the robotic environment and displaying that view on the mobile device 200 provides immediate feedback to the operator 10 allowing the operator 10 to see the end result of turning the robot 300 before the robot 300 executes the turning maneuver. This "stick and carrot" approach may be beneficial in applications of the system 100, in which there is a latency or delay from a time when the operator 10 issues a command and a time when the robot 300 carries out that command.

Figure 2:
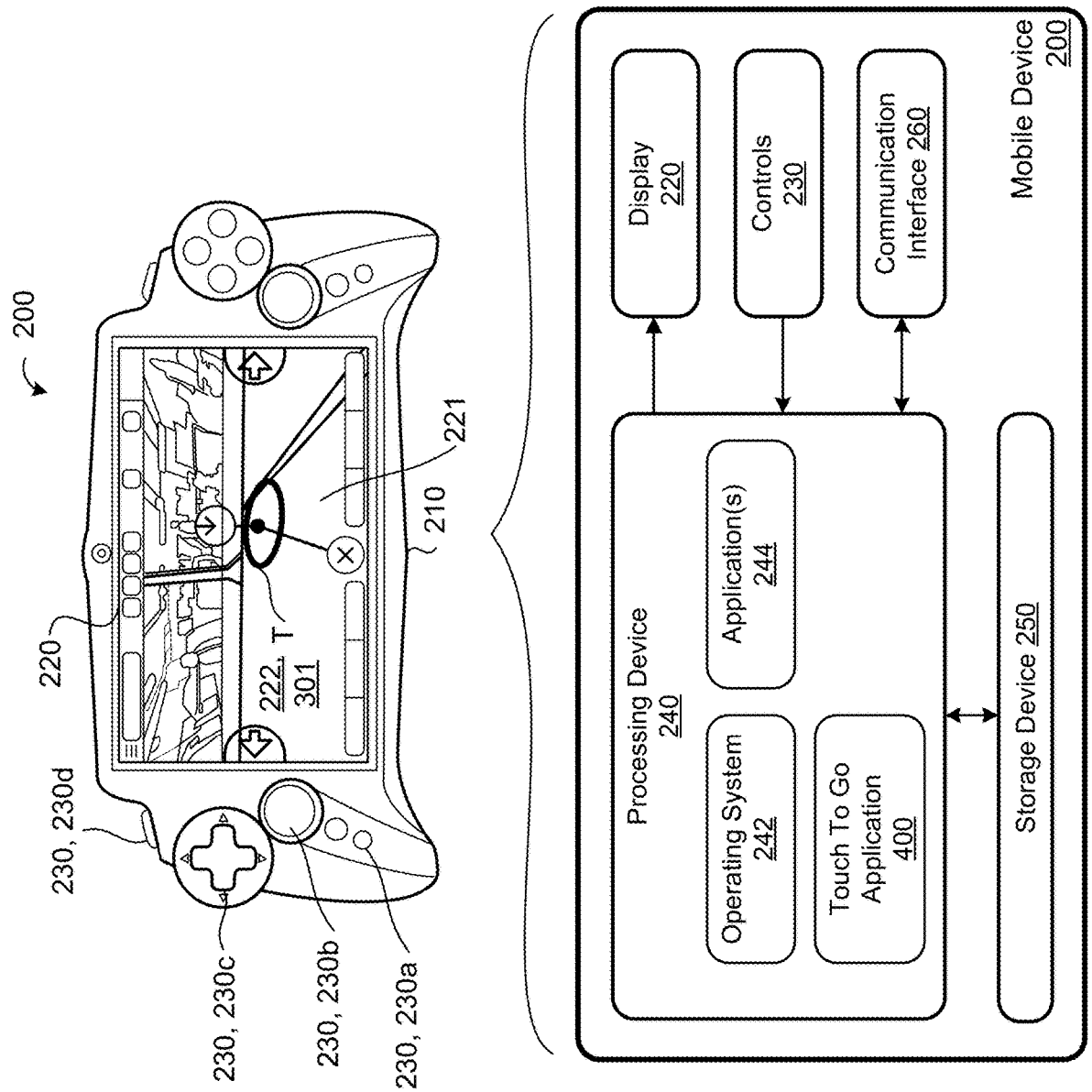
FIG. 2 is a schematic view of an example mobile device used by an operator to navigate a robot.

FIG. 2 shows an example of the mobile device 200 used by the operator 10 to navigate the robot 300 around the robotic environment. The mobile device 200 includes a housing 210 with a display 220 and a plurality of controls 230 situated around the display 220. As shown, the controls 230 are located on the front and top edge of the housing 210, and include buttons 230a, control sticks 230b, directional d-pad 230c, and shoulder buttons 230d. The housing 210 is shaped to be held in both hands of the operator 10 such that the operator's 10 thumbs are positioned to operate controls located on the front of the mobile device 200 (e.g., the control sticks 230b) and the operator's 10 index fingers are positioned to operate controls located on the top edge of the mobile device 200 (e.g., shoulder buttons 230d). The mobile device 200 may also include one or more additional controls located on the back of the mobile device 200 in a position to be operated by the operator's 10 other fingers.

The display (e.g., screen) 220 shows the operator 10 an image or scene 222 of the robotic environment based on image data captured by the robot 300. In some examples, the display 220 presents the scene 222 as a video feed.

The mobile device 200 further includes, inside the housing 210, a processing device 240, a storage device 250 (e.g., memory device), and a communication interface 260. In the example shown, the processing device 240 executes the GUI 221 for display on the screen 220 to present the scene 222 of the robotic environment for the operator 10 to view. The mobile device 200 may include additional components not depicted in FIG. 2. The processing device 240 can include one or more processors that execute computer-executable instructions and associated memory (e.g., RAM and/or ROM) that stores the computer-executable instructions. In implementations where the processing device 240 includes more than one processor, the processors can execute in a distributed or individual manner. The processing device 240 can execute an operating system 242 and a touch to go application 400 (FIG. 4A) for navigating the robot 300 in the robotic environment. In some examples, the processing device 240 executes other applications 244, which may be native or non-native to the mobile device 200, such as a web browser, all of which can be implemented as computer-readable instructions.

The storage device 250 can include one or more computer-readable mediums (e.g., hard disk drives, solid state memory drives, and/or flash memory drives). The storage device 250 can store any suitable data that is utilized by the operating system 242, the other applications 244, and the touch to go application 400. The communication interface 260 includes one or more devices that are configured to communicate with the robot 300 in the robotic environment. In some implements, the communication interface 260 is configured to communicate with the robot 300 by way of a network. The communication interface 260 can include one or more transceivers for performing wired or wireless communication. Examples of the communication interface 260 can include, but are not limited to, a transceiver configured to perform communications using the IEEE 802.11 wireless standard, an Ethernet port, a wireless transmitter, and a universal serial bus (USB) port.

Figure 3A:
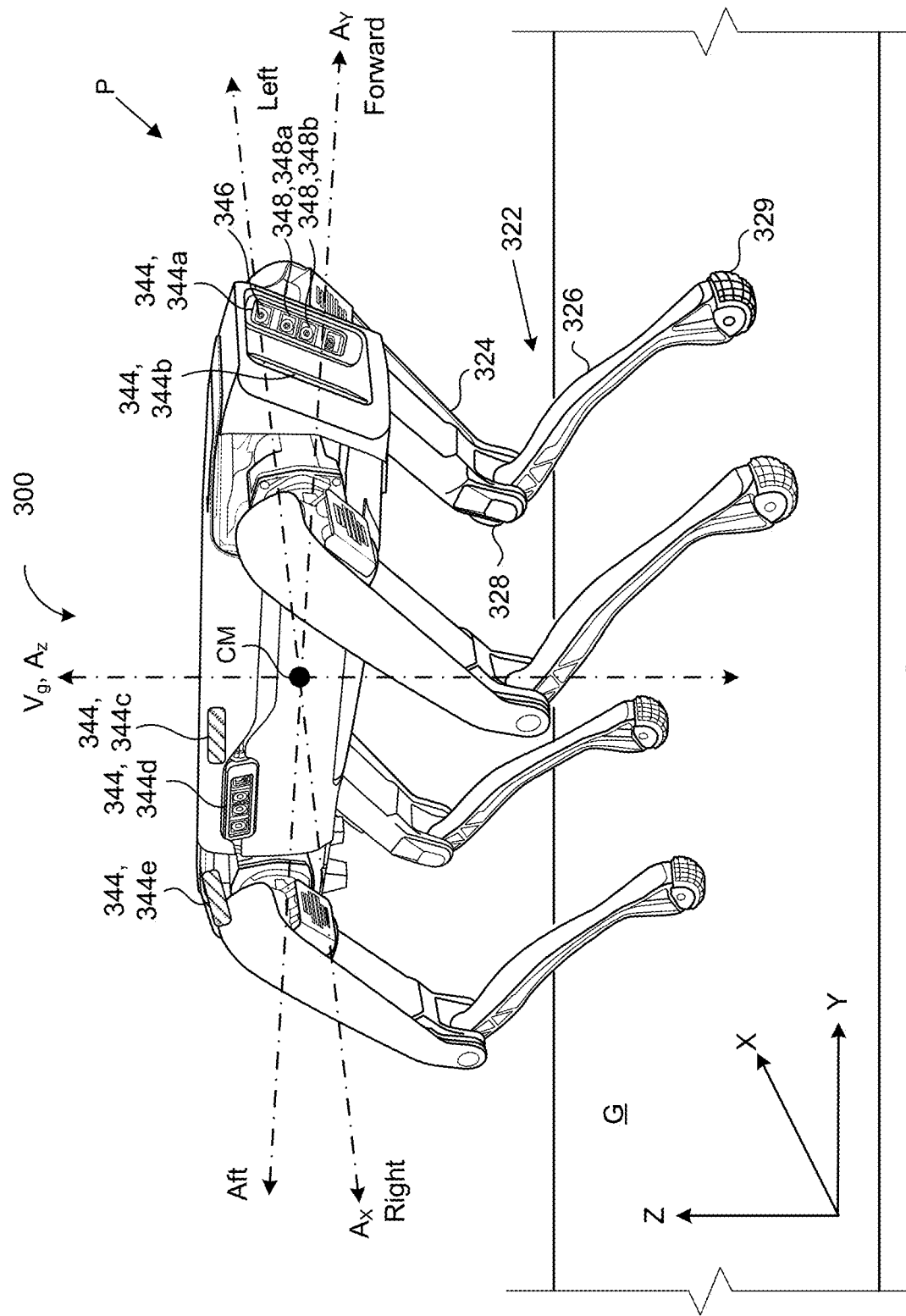
FIGS. 3A-3E are schematic views of examples of a robot that may be operated using the systems and methods described herein.
Figure 3B:
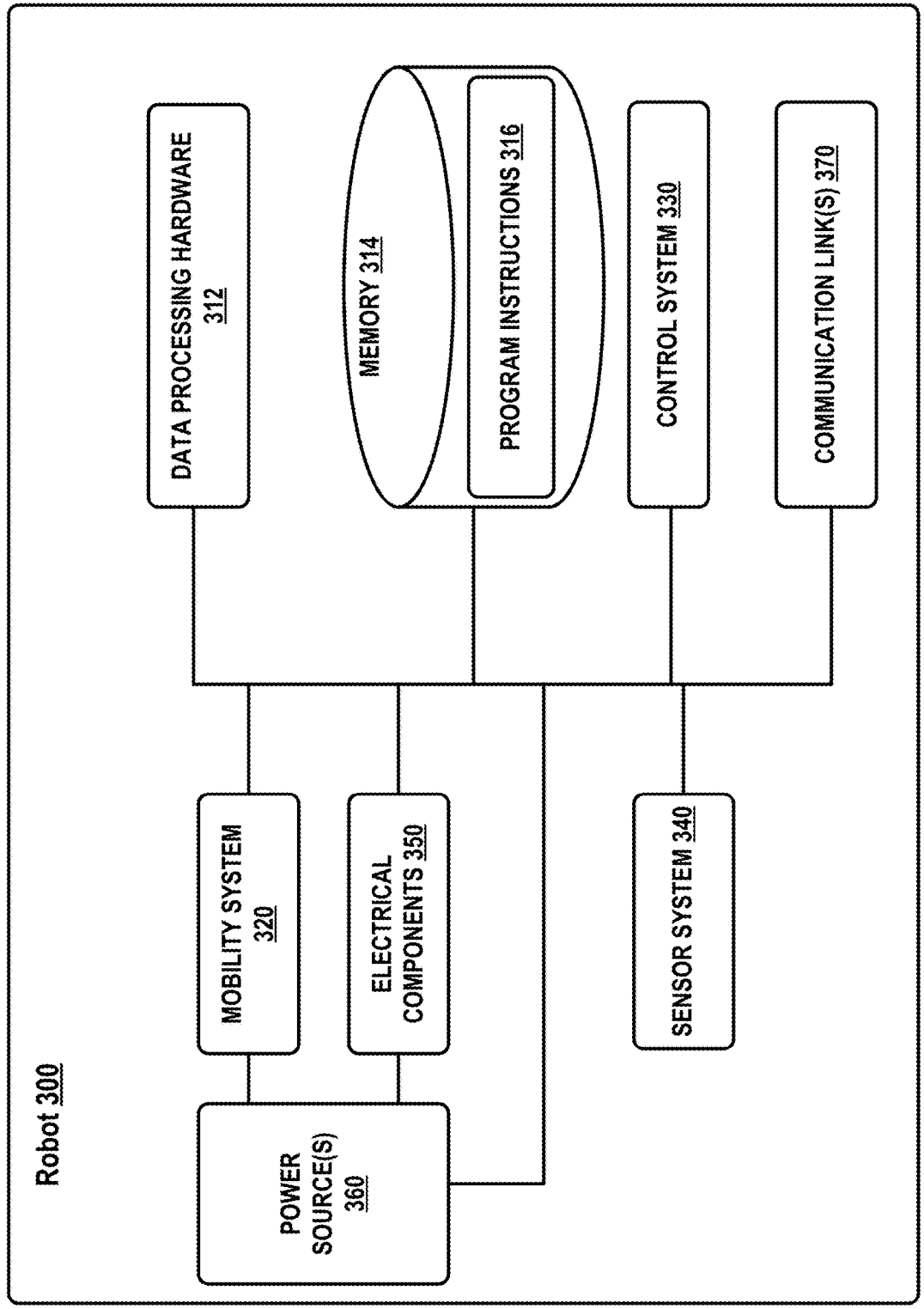

Referring to FIGS. 3A and 3B, the robot 300 includes a body 310 and a mobility system 320 coupled to the body 310 for moving the robot 300 within the robotic environment. The robot 300 further includes a control system 330 communicatively coupled to a sensor system 340. The control system 330 determines how the robot 300 moves within the robotic environment based on data collected by the sensor system 340. The robot 300 still further includes electrical components 350, one or more power source(s) 360, and one or more communication link(s) 370 for enabling various operations of the robot 300.

The robot 300 also includes, housed within the body 310, data processing hardware 312 and memory hardware 314. The data processing hardware 312 may operate as one or more general-purpose processor or special purpose processors (e.g., digital signal processors, application specific integrated circuits, etc.). The data processing hardware 312 can be configured to execute computer-readable program instructions 316 that are stored in the memory hardware 314 and are executable to provide the operations of the robot 300 described herein. For instance, the program instructions 316 may be executable to provide operations of control system 330, where the control system 330 may be configured to cause activation and deactivation of the mobility system 320 and the electrical components 116. The data processing hardware 312 may operate and enable the robot 300 to perform various functions, including the functions described herein. While the robot 300 implements the data processing hardware 312 and memory hardware 314 in the example shown, the data processing hardware 312 and/or memory may reside on a remote system 190 (FIG. 4B) in communication with the robot 300 and the mobile device 200. Similarly, the data processing hardware 312 and/or memory may be dispersed across the robot 300 and a remote system 190 (FIG. 4B).

The memory hardware 314 may exist as various types of storage media. For example, the memory hardware 314 may include or take the form of one or more computer-readable storage media that can be read or accessed by data processing hardware 312. The one or more computer-readable storage media can include volatile and/or non-volatile storage components, such as optical, magnetic, organic or other memory or disc storage, which can be integrated in whole or in part with data processing hardware 312. In some implementations, the memory hardware 314 can be implemented using a single physical device (e.g., one optical, magnetic, organic or other memory or disc storage unit), while in other implementations, the memory hardware 314 can be implemented using two or more physical devices, which may communicate via wired or wireless communication. Further, in addition to the computer-readable program instructions 316, the memory hardware 314 may include additional data such as diagnostic data, among other possibilities.

The mobility system 320 represents hardware of the robot 300 that may enable the robot 300 to operate and perform physical functions. As a few examples, the mobility system 320 may include actuator(s), extendable leg(s) ("legs"), arm(s), wheel(s), and/or other mechanical components. The mobility system 320 may depend on the design of the robot 300. Also, the mobility system 320 may be based on the functions and/or tasks the robot 300 is configured to perform. As such, depending on the operation and functions of the robot 300, different mobility systems may be available for the robot 300 to utilize. In some examples, the robot 300 may be configured to add and/or remove components of the mobility system 320, which may involve assistance from a user and/or another robotic device. For example, the robot 300 may be initially configured with four legs and operate as a quadruped, but may be altered by a user or the robot 300 to remove two of the four legs to operate as a biped. Other examples of mobility system 320 may be included.

In the example shown in FIG. 3A, the mobility system 320 system includes four legs 322 coupled to the body 310. Each of the four legs 322 includes an upper portion 324 and a lower portion 326 separated by a leg joint 328. The lower portion 326 of each leg 322 ends in a foot 329. The foot 329 of each leg is optional and the terminal end of the lower portion 326 of one or more of the legs 322 may be coupled to a wheel. The robot 300 has a vertical gravitational axis $V_g$ along a direction of gravity and a center of mass CM, which is a point where the weighted relative position of the distributed mass of the robot 300 sums to zero. In some examples, a Z axis $A_z$ coincides with the vertical gravitational axis $V_g$. The robot 300 further has a pose P based on the CM relative to the vertical gravitational axis $V_g$ (i.e., the fixed reference frame with respect to gravity) to define a particular attitude or stance assumed by the robot 300. The attitude of the robot 300 can be defined by an orientation or an angular position of the robot 300 in space. Movement by the legs 322 relative to the body 310 alters the pose P of the robot 300 (i.e., the combination of the position of the CM of the robot and the attitude or orientation of the robot 300).

In some implementations, the robot 300 further includes one or more appendages, such as an articulated arm disposed on the body 310 and configured to move relative to the body 310. The articulated arm may have five-degrees or more of freedom. Moreover, the articulated arm may be interchangeably referred to as a manipulator arm or simply an appendage. In some examples, the articulated arm includes two portions rotatable relative to one another and to the body. In other examples, the articulated arm may include more or less portions without departing from the scope of the present disclosure. The first portion may be separated from second portion by an articulated arm joint. An end effector, which may be interchangeably referred to as a manipulator head, may be coupled to a distal end of the second portion of the articulated arm and may include one or more actuators for gripping/grasping objects.

Figure 3C:
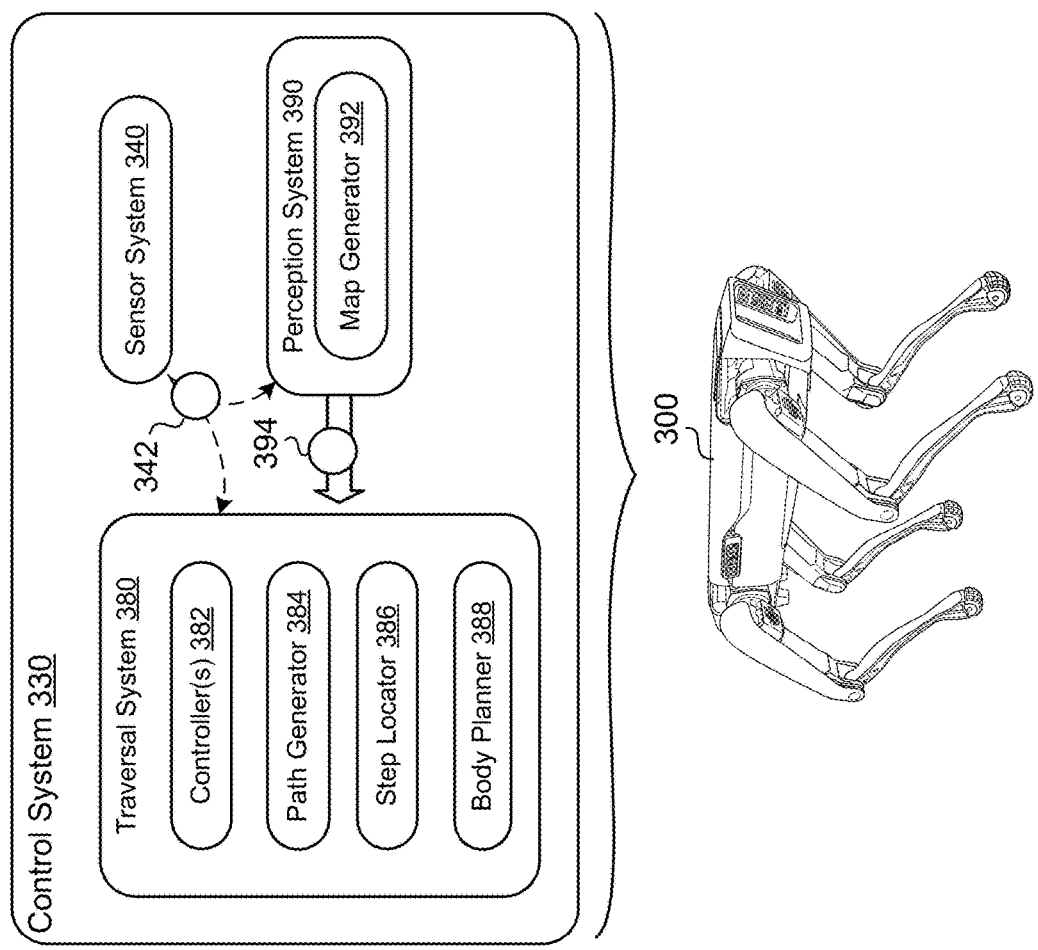

The control system 330 serves as a link between portions of the robot 300, such as a link between the mobility system 320 and/or the sensor system 340. In some instances, the control system 330 serves as an interface between the robot 300 and another computing device, such as the mobile device 200 (FIG. 2) used by the operator 10 to navigate the robot 300. Thus, the control system 330 may serve as an interface between the robot 300 and the operator 10 using the mobile device 200. FIG. 3C shows an example of the control system 330 including a traversal system 380 and a perception system 390. The traversal system 380 is responsible for coordinating and/or moving the robot 300 about the robotic environment. The perception system 390 receives image data or sensor data 342 from the sensor system 340 (sensory system/cameras) and generates one or more maps 394 that indicate obstacles in the surrounding robotic environment.

As the robot 300 moves about the robotic environment, the traversal system 380 may analyze the terrain, plan motion trajectories for the robot 300, and/or instruct the robot 300 to perform various movements. The traversal system 380 may use various systems of the robot 300 to attempt to traverse the robotic environment successfully while avoiding collisions and/or damage to the robot 300 or the robotic environment.

In some implementations, as shown in FIG. 3C, the traversal system 380 includes at least one controller 382, a path generator 384, a step planner/locator 386, and a body planner 388. The traversal system 380 is configured to communicate with the sensor system 340 and the perception system 390.

The controller 382 is configured to control movement of the robot 300 to traverse about the robotic environment based on input or feedback from the systems of the robot 300 (e.g., the traversal system 380, the perception system 390, etc.) as well as input from the operator 10 by way of the mobile device 200. This may include movement between poses and/or behaviors of the robot 300. For example, the controller 382 controls different footstep patterns, leg patterns, body movement patterns, or vision system sensing patterns. Here, the controller 382 is configured to communicate with the data processing hardware 312 and/or the memory hardware 314 of the robot 300 to execute movements provided from systems of the robot 300 (e.g., the traversal system 380, the perception system 390, etc.) or from the operator 10.

In some examples, the controller 382 includes a plurality of controllers 382 where each of the controllers 382 has a fixed cadence. A fixed cadence refers to a fixed timing for a step or swing phase of a leg 322. For example, the controller 382 instructs the robot 300 to move the legs 322 (e.g., take a step) at a particular frequency (e.g., step every 250 milliseconds, 350 milliseconds, etc.). With a plurality of controllers 382 where each controller 382 has a fixed cadence, the robot 300 can experience variable timing by switching between controllers 382. In some implementations, the robot 300 continuously switches/selects fixed cadence controllers 382 (e.g., re-selects a controller 382 every three milliseconds) as the robot 300 traverses the robotic environment.

The traversal system 380 may select a controller 382 based on a step plan for the controller 382. The traversal system 380 may generate a step plan for each controller 382 based on a cadence (i.e., movement pace programmed for a given controller) and at least one steering command to move the robot 300 about the robotic environment. A step plan refers to a map of unconstrained foot placements (referred to as an unconstrained map) corresponding to where the robot 300 would step (i.e., a placement location for feet 329 or distal ends of the legs 322) if there were no obstacles or collision regions present in the terrain about the robotic environment based on the cadence of a controller 382. Given the step plan, the traversal system 380 compares the step plan to a constrained map 394 generated by the perception system 390. Based on the comparison, the traversal system 380 selects the controller 382 whose step plan violates the least amount of constraints identified within the constrained map 394 (i.e., the step plan that requires the least amount of deviation to achieve the constrained map 394). By selecting a controller 382 with the least deviation, the traversal system 380 may ensure that the robot 300 requires the least adjustment to avoid obstacles or collision regions.

In some implementations, the traversal system 380 scores each controller 382 based on a relation between the step plan and the constrained map 394 and selects the controller 382 with an optimal score. For instance, the traversal system 380 selects a controller 382 with a lowest score corresponding to a controller 382 with the step plan having the least deviation to achieve the constrained map 394. In some examples, the score corresponds to a cost function based on soft constraints or conditions for a controller 382 in addition to the relation between the step plan and the constrained map 394. The traversal system 380 may also be configured with conditions that rule out a particular controller 382 prior to scoring and/or selection. Some examples of conditions include whether a desired contact with the terrain is achievable based on a location of the swing feet or whether particular step heights are required during traversal. In some configurations, the cost function applies weights to different conditions where the deviation between the step plan and the constrained map is the condition of greatest importance.

In some examples, the memory hardware 314 stores movements or movement constraints for the traversal system 380 locally on the robot 300. In other examples, these movements or constraints are stored and/or accessed remotely by the traversal system 380 (described below with reference to FIG. 4B).

Continuing with FIG. 3C, the path generator 384 is configured to determine horizontal motion for the robot 300. For instance, the horizontal motion refers to translation and/or yaw of the robot 300. The path generator 384 determines obstacles within the robotic environment about the robot 300 based on the sensor data 342. The path generator 384 communicates the obstacles to the step planner/locator 386 such that the step planner/locator 386 may identify footstep placements for legs 322 of the robot 300 (e.g., locations to place distal/terminal ends of the legs 322 or locations to place the feet 329). The step planner/locator 386 generates the footstep placements (i.e., locations where the robot 300 should step) using inputs from the perception system 390.

The body planner 388 determines height and pitch for the robot 300 based on inputs, such as the constrained map 394 (or a terrain map) and the footstep placements from the step planner/locator 386, and a set of constraints. In some implementations, to determine the height and the pitch for the robot 300, the body planner 388 is a quadratic programming trajectory planner configured to determine an optimal trajectory for the robot 300 that satisfies the set of constraints based on the inputs.

In some examples, the perception system 390 includes a map generator 392 that generates maps based on the sensor data 342 of the terrain about the robotic environment. Based on the generated maps, the perception system 390 generates the constrained map 394 for the robot 300 (e.g., for the traversal system 380 of the robot 300 to execute). The perception system 390 generally communicates the constrained map 394 or portions of the constrained map 394 (e.g., collision/non-collision regions) to the traversal system 380 (e.g., with the step planner/locator 386 of the traversal system 380). The step planner/locator 386 refers to a trajectory planner (also referred to as motion planning) for the robot 300 that is configured to plan trajectories of motion that avoid collisions while traversing the robotic environment.

In some implementations, the map generator 392 generates an incomplete map and is configured to fill in gaps of sensor data 342 based on the nature of the sensor data 342. In other words, the map generator 392 of the perception system 390 infers details about the obstructed terrain (also referred to as inferred terrain) from the sensor data 342 collected for the visible terrain. Based on the sensor data 342, the map generator 392 is programmed to assume the missing sensor data corresponds to either smooth terrain or flat terrain. When the sensor data 342 indicates a near object adjacent to a far object, the map generator 392 assumes this near-far contrast occurs due to an occlusion for the sensor system 340 within the robotic environment. When the map generator 392 assumes an occlusion occurs, the map generator 392 fills in gaps of the sensor data 342 by mapping these gaps as flat terrain. In contrast, when the sensor data 342 does not indicate a near-far contrast, the map generator 392 assumes the missing sensor data 342 is due to poor vision by the sensor system 340 and maps the missing sensor data 342 as smooth terrain.

The sensor system 340 includes one or more sensor(s) such as force sensors, proximity sensors, motion sensors, load sensors, position sensors, touch sensor, depth sensors, ultrasonic range sensors, and infrared sensors, among other possibilities. The sensor system 340 may provide sensor data to the data processing hardware 312 to allow for appropriate interaction of the robot 300 with the robotic environment as well as monitoring of operation of the systems of the robot 300. The sensor data may be used in evaluation of various factors for activation and deactivation of the mobility system 320 and electrical components 350 by control system 330 and/or a computing system of the robot 300.

The sensor system 340 may provide information indicative of the robotic environment of the robot 300 for the control system 330 and/or computing system (e.g., the operator 10 navigating the robot 300 using the touch to go application 400 running on the mobile device 200) to use to determine operations for the robot 300. For example, the sensor system 340 may capture data corresponding to the terrain of the environment or location of nearby objects, which may assist with environment recognition and navigation, etc. The sensor system 340 may monitor the robotic environment in real-time and detect obstacles, elements of the terrain, weather conditions, temperature, and/or other parameters of the environment for the robot 300.

Further, the robot 300 may include other sensor(s) configured to receive information indicative of the state of the robot 300, including sensor(s) that may monitor the state of the various components of the robot 300. The sensor(s) may measure activity of systems of the robot 300 and receive information based on the operation of the various features of the robot 300, such the operation of extendable legs, arms, or other mechanical and/or electrical features of the robot 300. The sensor data provided by the sensor system 340 may enable the control system 330 of the robot 300 to determine errors in operation as well as monitor overall functioning of components of robot 300.

For example, the control system 330 may use sensor data to determine the stability of the robot 300 during operations as well as measurements related to power levels, communication activities, components that require repair, among other information. As an example configuration, the robot 300 may include gyroscope(s), accelerometer(s), and/or other possible sensors to provide sensor data relating to the state of operation of the robot 300. Further, the sensor system 340 may also monitor the current state of a function, such as a gait, that the robot 300 may currently be operating. Additionally, the sensor system 340 may measure a distance between a given robotic leg of a robot and a center of mass of the robot. Other example uses for the sensor system 340 may exist as well.

Figure 3D:
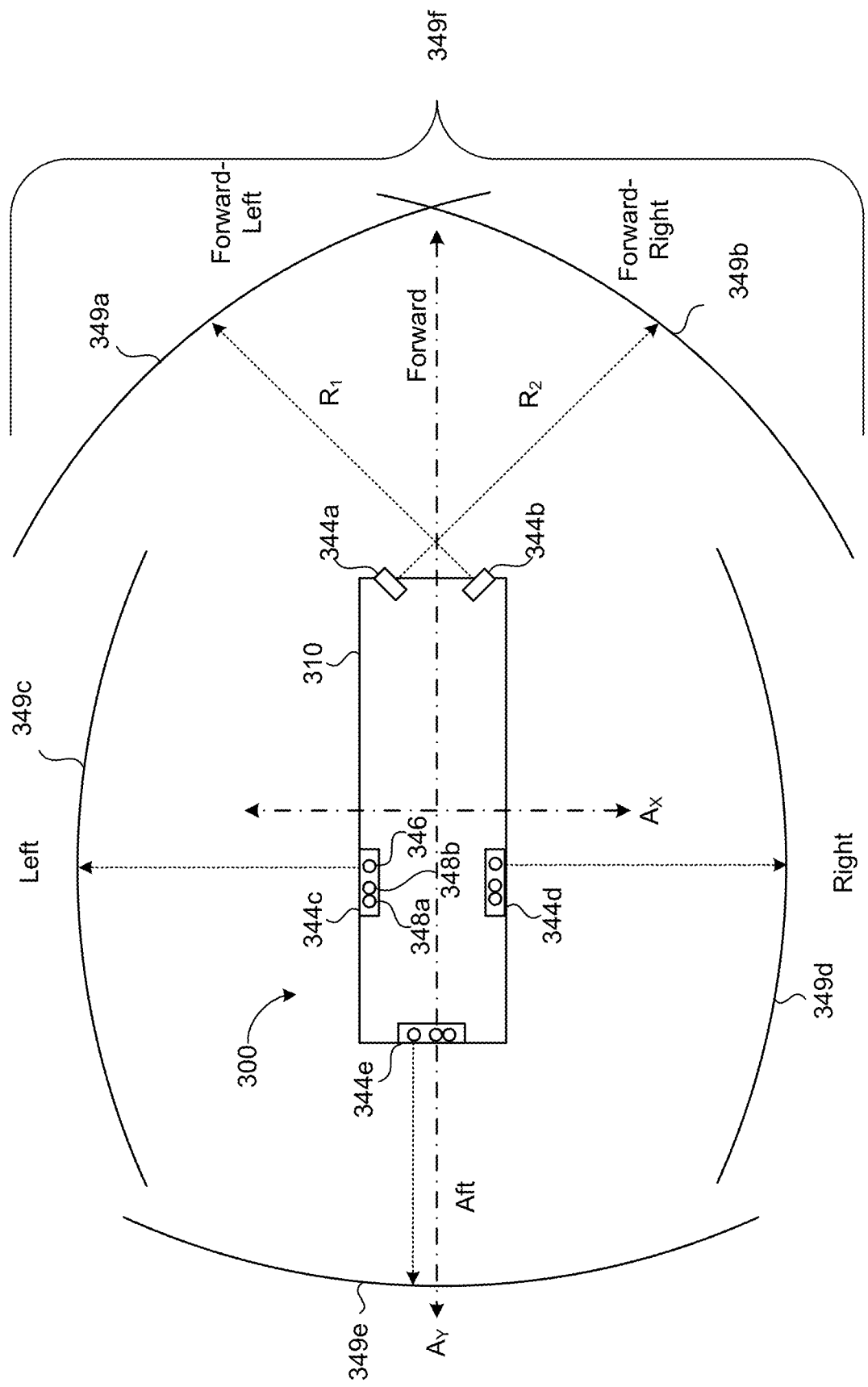

In the examples shown in FIG. 3A and FIG. 3D, the robot 300 includes five cameras: a forward-left camera 344a; a forward-right camera 344b; a left camera 344c; a right camera 344d; and an aft camera 344e. In other examples, the robot 300 may have more than five cameras (e.g., seven) or fewer than five cameras (e.g., three). For instance, the robot 300 may further include one or more payload cameras 344 mounted to the robot. In one example, the payload camera includes a ring camera. Each of the cameras 344 has a corresponding field of view, simply referred to as "view", defining a sensing range or region of the camera 344. The cameras 344 are positioned about the body 310.

With particular reference to FIG. 3D, the body 310 has an X-axis $A_X$ extending laterally in the left and right directions, and a Y-axis $A_Y$ extending longitudinally in the forward and aft directions. The forward-left camera 344a is at an angle to the Y-axis $A_Y$ and is located on the body 310 such that the forward-left camera 344a points in a forward-right direction and captures a forward-right view 349b. For example, the forward-left camera 344a is located on a forward-left portion of the body 310. The forward-right camera 344b is at an angle to the Y-axis $A_Y$ and is located on the body 310 such that the forward-right camera 344b points in a forward-left direction and captures a forward-left view 349a. For example, the forward-left camera 344a is located on a forward-left portion of the body 310. With this arrangement of the forward-left camera 344a and the forward-right camera 344b, if one draws a ray $R_1$ from the forward-right camera 344b to forward-left view 349a and a second ray $R_2$ from the forward-left camera 344a to the forward-right view 349b, the resulting rays $R_1$ and $R_2$ cross each other as shown. As such, it may be convenient to call the arrangement a "crossed camera" arrangement.

The left camera 344c is aligned with the X-axis $A_X$ and is positioned on the body 310 such that the left camera 344c points in the left direction and captures a left view 349c. For example, the left camera 344c is located on a left side of the body 310. The right camera 344d is aligned with the X-axis $A_X$ and is positioned on the body 310 such that the right camera 344d points in the right direction and captures a right view 349d. For example, the right camera 344d is located on a right side of the body 310. The aft camera 344e is aligned with the Y-axis $A_Y$ and is located on the body 310 such that the aft camera 344e points in the aft direction and captures an aft view 349e. For example, the aft camera 344e is located on an aft portion of the body 310.

In some examples, the robot 300 combines or "stitches" the forward-left view 349a and forward-right view 349b together into a forward view 349f that is larger than the individual forward-left view 349a and forward-right view 349b. With a more expansive forward view 349f, the robot 300 may have greater awareness of what is in front of it, such as obstacles and other constraints, which is particularly advantageous because the robot 300 moves in the forward direction most of the time. As shown, portions of the forward-left view 349a and forward-right view 349b may overlap, which may be useful in stitching the views. In another example, the robot 300 combines the forward-left view 349a, the forward-right view 349b, the left view 349c, the right view 349d, the aft view 349e, together to form a surrounding view that approximates a 360-degree view around the robot 300.

In the example shown in FIG. 3A, each of the cameras 344 includes three individual cameras. For ease of the reference, each arrangement of three cameras is called a "camera triplet". Other examples of the camera 344 may include more (e.g., four) or fewer (e.g., two) individual cameras. Example cameras making up the camera triplet 344 include, but are not limited to stereo camera, scanning light-detection and ranging (LIDAR) sensor, scanning laser-detection and ranging (LADAR) sensor, and infrared camera. As an example, the camera triplet 344 includes one fisheye camera 346 and two infrared cameras 348,348a-b. The fisheye camera 346 has a wide axis and a narrow axis, the layout of which is different for the different camera triplets.

Figure 3E:
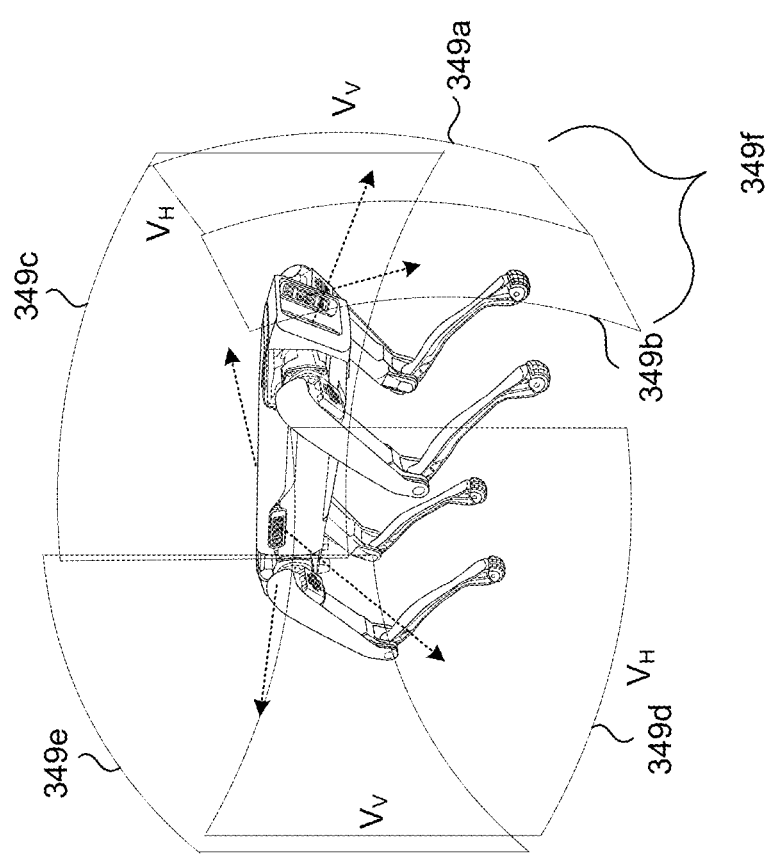

Referring to FIG. 3A and FIG. 3E, for the left, right, and aft camera triplets 344c-e, the layout of fisheye cameras 346c-e has the wide axis in a horizontal direction generally aligned with the X-axis $A_X$ and the Y-axis $A_Y$, and the narrow axis in a vertical direction generally aligned with Z-axis $A_Z$. As shown in FIG. 3E, this layout produces a field of view (viz., the left view 349c, the right view 349d, and the aft view 349e) resembling a rectangle with a horizontal field of view ($V_H$) greater than a vertical field of view ($V_V$).

For the forward-left camera triplet 344a and the forward-right camera triplet 344b, the layout of fisheye cameras 346a, 346b has the narrow axis in the horizontal direction and the wide axis in the vertical direction. As shown in FIG. 3E, this layout produces a field of view (viz., the forward-left view 349a and forward-right view 349b) resembling a rectangle with the horizontal field of view ($V_H$) less than the vertical field of view ($V_V$). The forward view 349f (i.e., the result of combining the forward-left 349a and forward-right view 349b) resembles a square.

The infrared cameras 348 (FIG. 3A) detect infrared light. Each infrared camera 348 includes a projector that emits a pattern of infrared light onto surfaces that might not have a pattern. The emitted pattern reflects off of a surface of the object and is detected by the infrared camera 348. In this way, the infrared camera 348 can "see" texture on an object that does not have a texture.

When surveying a field of view with a sensor (e.g., the forward-left view 349a with the forward-right camera 344b) the sensor system 340 generates sensor data 342 corresponding to the field of view. In some examples, the sensor data 342 includes image data that corresponds to a three-dimensional volumetric point cloud generated by a three-dimensional volumetric image sensor. Additionally or alternatively, when the robot 300 is maneuvering about the robotic environment, the sensor system 340 gathers pose data for the robot 300 that includes inertial measurement data (e.g., measured by an inertial measurement unit). In some examples, the pose data includes kinematic data and/or orientation data about the robot 300. With the sensor data 342, the perception system 390 may generate a map, such as the constrained map 394 for the terrain about the robotic environment 10.

Sensor data 342 gathered by the sensor system 340, such as the image data, pose data, inertial data, kinematic data, etc., relating to the robotic environment may be communicated to the traversal system 380 (e.g., the data processing hardware 312 and the memory hardware 314) of the robot 300. In some examples, the sensor system 340 gathers and stores the sensor data 342 (e.g., in the memory hardware 314 or memory hardware 196 of remote resources 192 of FIG. 4B). In other examples, the sensor system 340 gathers the sensor data 342 in real-time and processes the sensor data 342 without storing raw (i.e., unprocessed) sensor data 342. In yet other examples, the traversal system 380 and/or remote resources 192 (FIG. 4B) store both processed sensor data 342 and raw sensor data 342.

In the example robot architecture of FIG. 3B, the data processing hardware 312 and the memory hardware 314 are central to the robot 300 such that various systems of the robot 300 may share in use of the hardware (e.g., the control system 330, the sensor system 340, the traversal system 380, and the perception system 390). In some configurations, one or more systems (e.g., the control system 330, the sensor system 340, the traversal system 380, and/or the perception system 390) of the robot 300 have their own dedicated hardware (e.g., in communication with the data processing hardware 312 and the memory hardware 314).

Referring to FIG. 3B, robot 300 may include one or more power source(s) 360 configured to supply power to various components/systems of the robot 300. Among possible power sources, the robot 300 may include a hydraulic system, electrical system, batteries, and/or other types of power sources. As an example illustration, the robot 300 may include one or more batteries configured to provide power to components/systems via a wired and/or wireless connection. Within examples, components of the mobility system 320 and electrical components 350 may each connect to a different power source or may be powered by the same power source. Components of the robot 300 may connect to multiple power sources as well.

Within example configurations, any type of power source may be used to power the robot 300, such as a gasoline engine. Further, the power source(s) 360 may charge using various types of charging, such as wired connections to an outside power source, wireless charging, combustion, or other examples. Other configurations may also be possible. Additionally, the robot 300 may include a hydraulic system configured to provide power to the mobility system 320 using fluid power. Components of the robot 300 may operate based on hydraulic fluid being transmitted throughout the hydraulic system to various hydraulic motors and hydraulic cylinders, for example. The hydraulic system of the robot 300 may transfer a large amount of power through small tubes, flexible hoses, or other links between components of the robot 300. Other power sources may be included within the robot 300.

The electrical components 350 may include various components capable of processing, transferring, providing electrical charge or electric signals, for example. Among possible examples, the electrical components 350 may include electrical wires, circuitry, and/or wireless communication transmitters and receivers to enable operations of the robot 300. The electrical components 350 may interwork with the mobility system 320 to enable the robot 300 to perform various operations. The electrical components 350 may be configured to provide power from the power source(s) 360 to the components of the mobility system 320, for example. Further, the robot 300 may include electric motors. Other examples of electrical components 350 may exist as well.

In some implementations, the robot 300 may also include communication link(s) 370 configured to send and/or receive information. The communication link(s) 370 may transmit data indicating the state of the various components/systems of the robot 300. For example, information read in by the sensor system 340 may be transmitted via the communication link(s) 370 to a separate computing device (e.g., the mobile device 200 of FIG. 2). Other diagnostic information indicating the integrity or health of the data processing hardware 312, the memory hardware 314, the control system 330, the mobility system 320, the power source(s) 360, and/or the electrical components 350, may be transmitted via the communication link(s) 370 to an external device (e.g., the mobile device 200 of FIG. 2 used by the operator 10 to navigate the robot 300).

In some implementations, the robot 300 receives information at the communication link(s) 370 that is processed by the data processing hardware 312. The received information may indicate data that is accessible by the data processing hardware 312 during execution of the program instructions 316, for example. Further, the received information may change aspects of the control system 330 that may affect the behavior of the mobility system 320 or the electrical components 350. In some cases, the received information indicates a query requesting a particular piece of information (e.g. the operational state of one or more of the components/systems of the robot 300), and the data processing hardware 312 may subsequently transmit that particular piece of information back out the communication link(s) 370.

Examples of the communication link(s) 370 include a wireless connection to for connecting the robot 300 to an external device (e.g., the mobile device 200 of FIG. 2 used by the operator 10 to navigate the robot 300) without any physical wires. Some example wireless connections may utilize a cellular connection, such as CDMA, EVDO, GSM/GPRS, 4G telecommunication (such as WiMAX or LTE) or 5G telecommunication. Alternatively or in addition, the wireless connection may utilize a Wi-Fi connection to transmit data to a wireless local area network (WLAN). In some implementations, the wireless connection may also communicate over an infrared link, Bluetooth, or a near-field communication (NFC) device. Other examples of the communication link(s) 370 may include, in addition to or alternatively to the wireless connection, a wired connection. In these examples, the robot 300 may include one or more ports to interface the communication link(s) 370 to an external device (e.g., the mobile device 200 of FIG. 2 used by the operator 10 to navigate the robot 300).

Note that the robot 300 shown in FIGS. 3A-3E is for illustration purposes and may include more or less components without departing from the scope of the disclosure herein. The various components of robot 300 may be connected in any manner, including wired or wireless connections, etc. Further, in some examples, components of the robot 300 may be positioned on multiple distinct physical entities rather on a single physical entity. Other example configurations of robot 300 may exist as well.

The robot 300 and its examples described above with reference to FIGS. 3A-3E represent an example robotic device configured to perform the operations described herein. Additionally, the robot 300 may be configured to operate autonomously, semi-autonomously, and/or using directions provided by an operator 10 (e.g., via the mobile device 200), and may exist in various forms, such as a humanoid robot or a quadruped robot (e.g., a dog), among other examples. Furthermore, the robot 300 may also be referred to as a robotic device, mobile robot, or robot, among other designations.

Figure 4A:
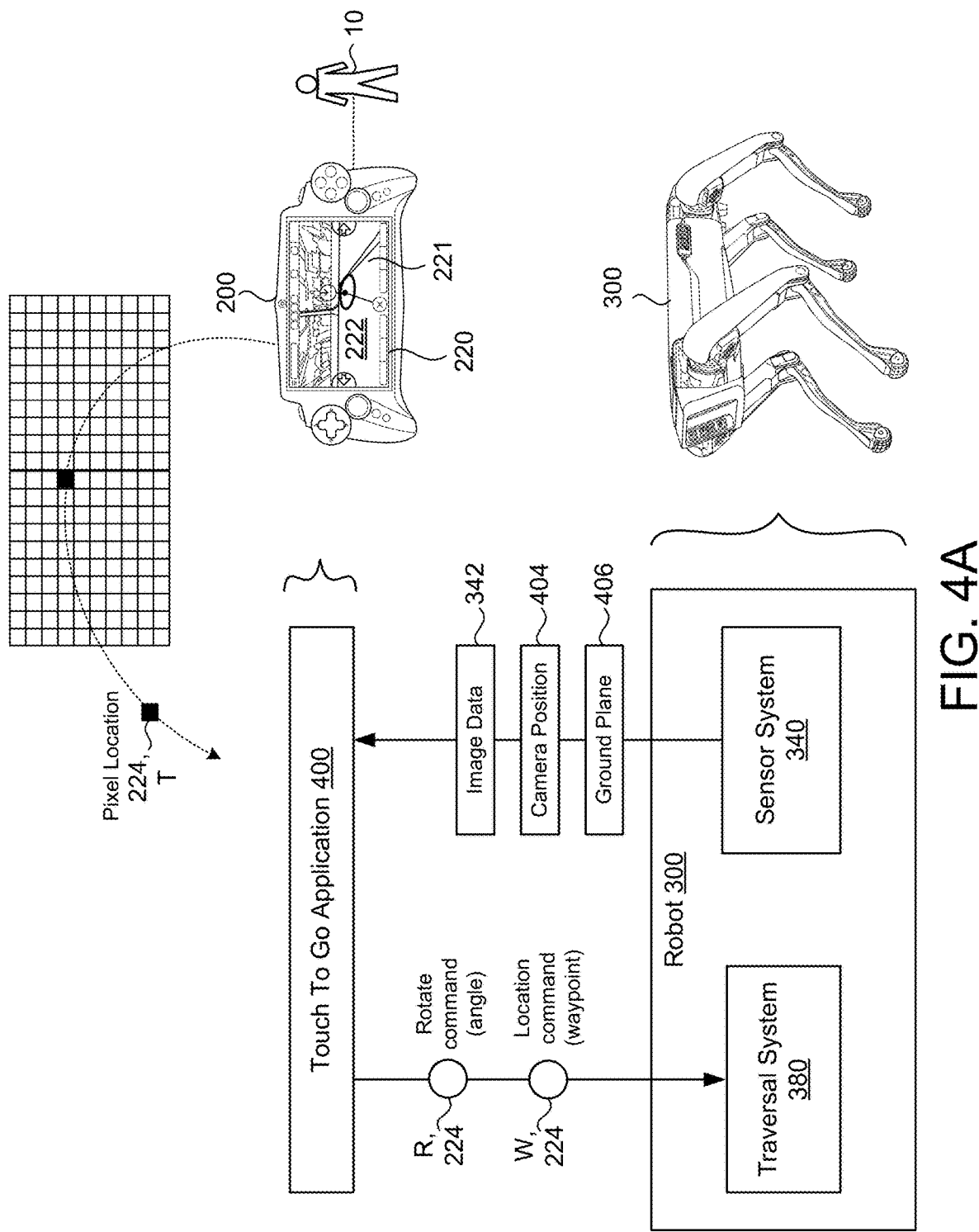
FIGS. 4A-4B are block diagrams of examples of a touch to go application for navigating a robot.
Figure 4B:
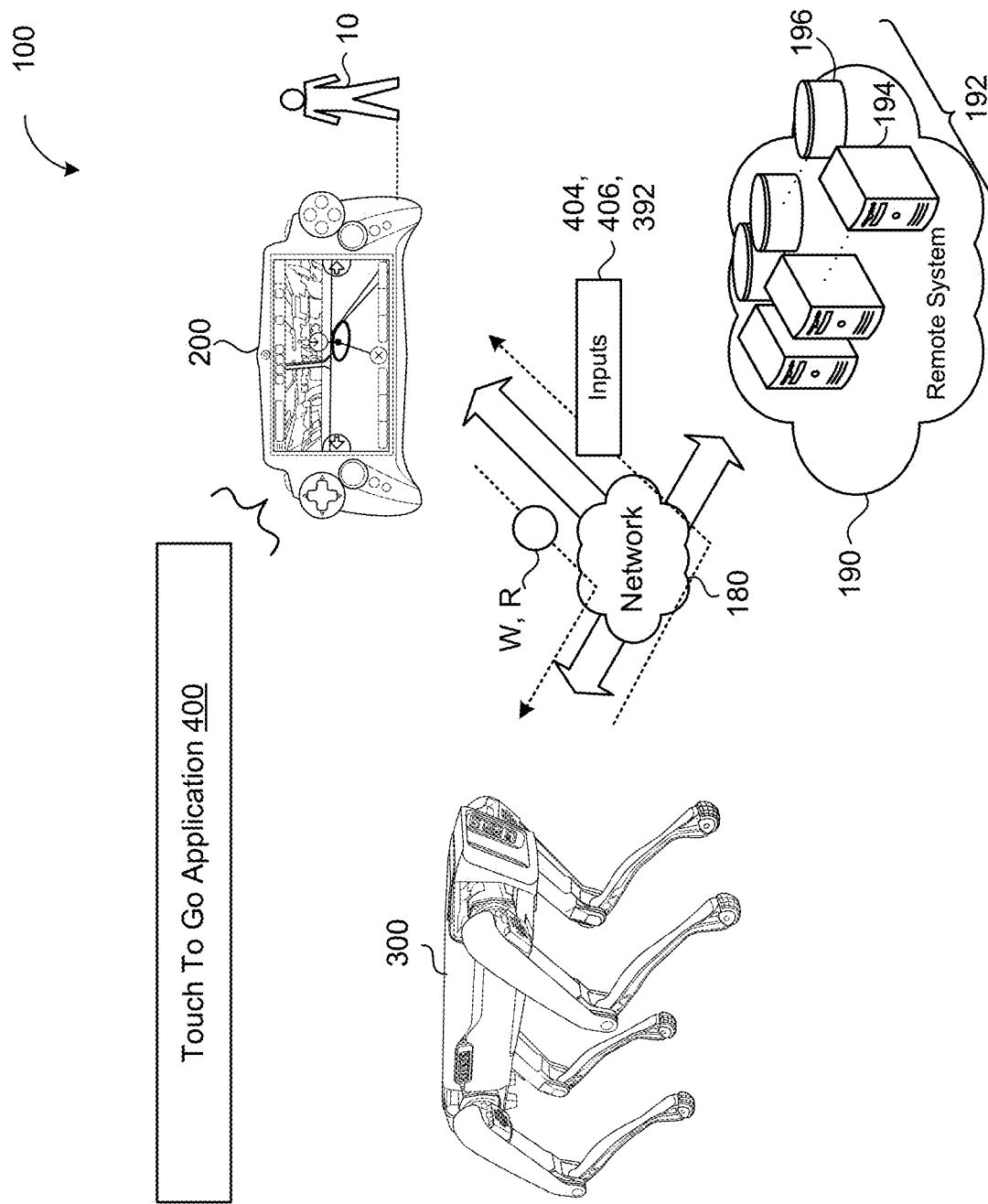

Referring to FIG. 4A, the touch to go application 400 executing on the mobile device 200 (e.g., executing on the processing device 240 (e.g., data processing hardware 240 of the mobile device 200)) determines a target location T (e.g., physical location) in the robotic environment or a "waypoint" of where the operator 10 wants the robot 300 to navigate. From the sensor system 340 (FIGS. 3B and 3C), the touch to go application 400 receives image data 342, a camera position/location 404, and a terrain estimate 406 of the robot 300. One or more cameras on the robot 300, such the fisheye cameras 346 described above with reference to FIG. 3D, may capture the image data 342. The image data 342 corresponds to one or more field of views surveyed/captured by the cameras (e.g., the forward view 349f of FIG. 3D). The mobile device 200 executes the GUI 221 to render the image data 342 on the display 220 as an image or scene 222 so that the operator 10 sees a view of the robotic environment from the perspective of the robot 300. The operator 10 provides a navigation input (e.g., input indication) directed to a location in the scene 222 that corresponds to a physical or target location T in the robotic environment where the operator 10 wants the robot 300 to navigate. For ease of reference, the location within the scene 222 corresponding to the target location may be referred to as a "pixel location" 224.

From the pixel location 224 and the inputs 342, 404, 406, the touch to go application 400 determines a waypoint W (described in greater detail below) and provides the waypoint W to the traversal system 380 (FIG. 3C). For example, the touch to go application 400 transmits a position command with the waypoint to the robot 300. Here, the position command with the waypoint may correspond to a waypoint command. The traversal system 380 then uses the waypoint W together with the inputs from the sensor system 340 and the perception system 390 (FIG. 3C) to control and navigate the robot 300 to the waypoint W, as described above with reference to FIG. 3C.

Referring to FIG. 4B, the system 100 may include network components. For example, the traversal system 380 communicates with a remote system 190 via a network 180. The remote system 190 may be a server or cloud-based environment that includes remote resources 192 such as remote data processing hardware 194 and remote memory hardware 196. In some implementations, movement or traversal constraints are stored and/or processed on the remote system 190 using remote resources 192. The constraints are communicated to the traversal system 380 of the robot 300 via the network 180. In yet other examples, different outputs related to the traversal system 380 are processed and/or stored remotely (e.g., via the remote system 190) and locally (e.g., via the memory hardware 314 (FIG. 3B)). The waypoint W determined by the touch to go application 400 may be transmitted to the robot 300 by way of the network 180 (e.g., as a waypoint command).

Figure 5A:
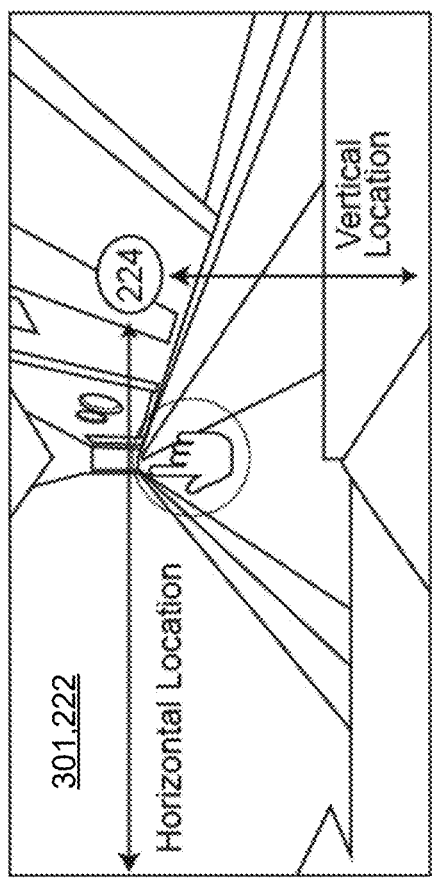
FIGS. 5A-5H are diagrams of example methods of the touch to go application for determining waypoints.
Figure 5B:
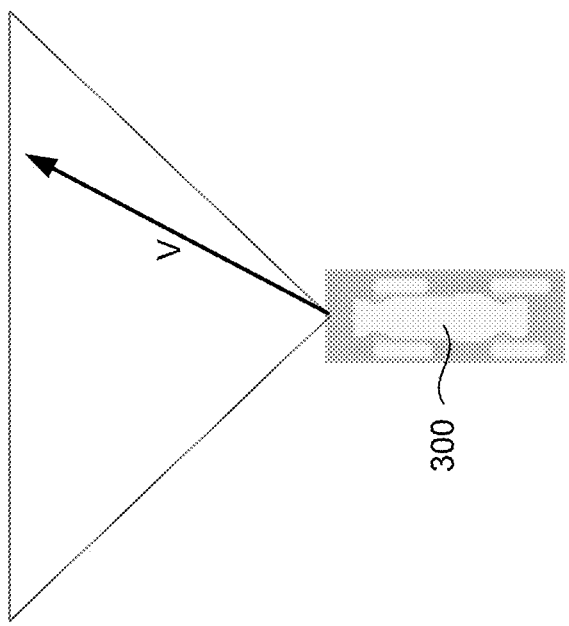
Figure 5C:
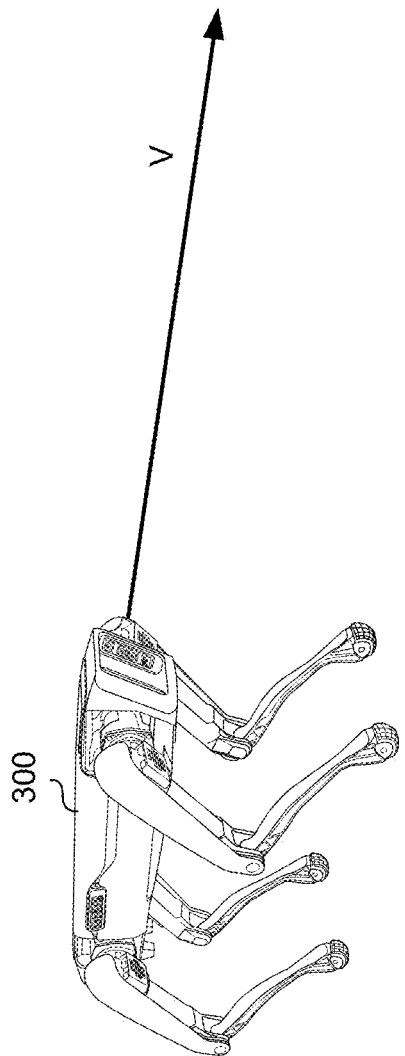
Figure 5D:
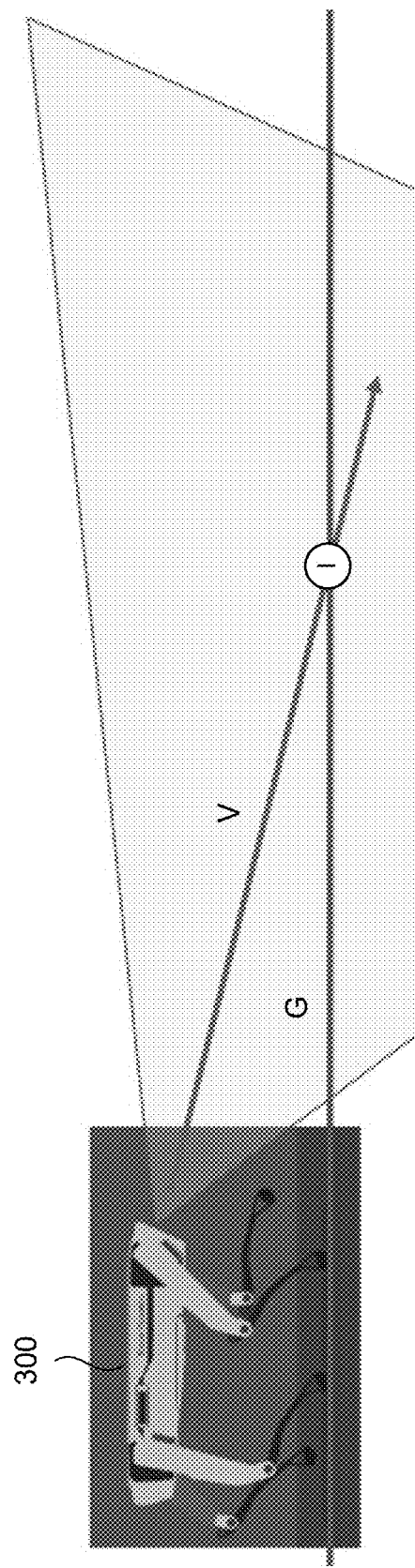

Referring to FIGS. 5A-5C, the touch to go application 400 uses a horizontal location and a vertical location of the pixel location 224 to determine a navigation direction input by the operator 10 for maneuvering the robot 300 in the robotic environment (FIG. 5A). The horizontal location and the vertical location may be associated with horizontal and vertical coordinates, respectively, of the pixel location 224 within the scene 222. The navigation direction input provided by the operator 10 can be represented by a pointing vector V (FIGS. 5B and 5C). Accordingly, the touch to go application may determine the pointing vector V based on the selection of the pixel location 224 within the scene 222, wherein the pointing vector V represents a direction of travel for navigating the robot 300 in the environment 301. The pointing vector V may be further based on calibration information, such as camera position 404, of at least one camera 344 capturing the image data 242 corresponding to the scene 222. The touch to go application 400 combines the pointing vector V with a ground plane estimate G of the robot 300 to find an intersection I (FIG. 5D) between the pointing vector V and the ground plane estimate G (FIG. 5D). When an intersection I between the pointing vector V and the ground plane estimate G is in front of the robot 300, as shown in FIG. 5D, the touch to go application 400 sends/transmits the location of the intersection I as a waypoint (e.g., target location) to the robot 300, causing the robot 300 to navigate to the waypoint (e.g., autonomously). In this example, the touch to go application 400 may identify the intersection I as the target location when a distance between a current position of the robot 300 and the intersection satisfies (e.g., is less than or equal to) a threshold distance (e.g., four meters). As used herein, the waypoint sent to the robot 300 by the application 400 corresponds to a waypoint command W that instructs the robot 300 to navigate to a target location associated with the waypoint.

Optionally, rather than sending an actual "waypoint" based on the intersection I, the application 400 executing on the mobile device 200 sends a waypoint command W that includes a point in world space that corresponds to an origin of the at least one camera 344 capturing the image data 242 corresponding to the scene 222 and the pointing vector V in world space based on the selection of the pixel location 224 within the scene 222. In this scenario, upon receiving the waypoint command W that merely includes the point and pointing vector V in world space, the robot 300 responsively travels in a direction of the pointing vector V until a distance threshold is reached or the robot 300 detects an obstacle that intersects the pointing vector V. Advantageously, the mobile device 200 does not have to determine a terrain estimate (e.g., ground plane estimate G) for calculating actual "waypoint coordinates" sent to the robot 300, but instead allows the robot 300 to continuously recalculate the terrain estimate (e.g., ground plane estimate) while navigating in the direction of the pointing vector V as it approaches the target location T.

In some scenarios, the operator 10 selects a pixel location 224 that corresponds to a target location in the robotic environment 301 that is beyond (e.g., dissatisfies) a threshold distance or specified range that the robot 300 is permitted, intended, or otherwise designed to navigate autonomously (e.g., a range of autonomous navigation of four meters). Instead of returning an error message requiring the operator 10 to select a new pixel location, the touch to go application 400 instructs the robot 300 to start moving towards the target location and stop at an intermediate location before the target location (e.g., four meters from a starting location of the robot 300). Here, a distance between the location of the robot 300 when the pixel location 224 (i.e., navigation direction input) was received and the intermediate location may correspond to the threshold distance that the robot 300 is permitted to navigate autonomously. Accordingly, the user experience of the operator 10 for controlling the robot 300 is improved by enabling the robot 300 to move in the direction towards the target location without requiring the operator 10 to choose another pixel location that satisfies the threshold distance.

Figure 5E:
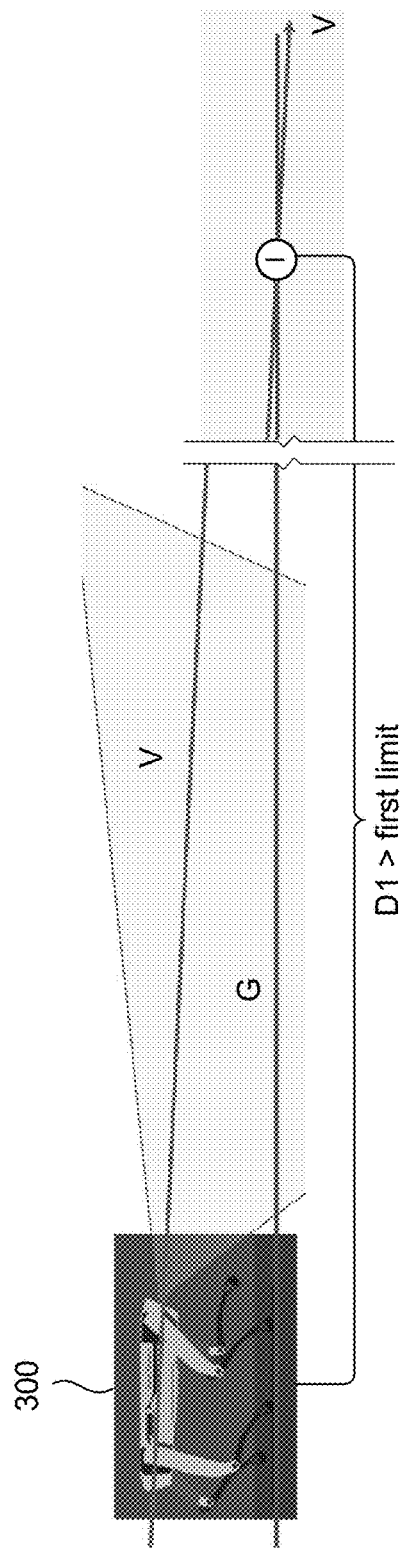
Figure 5F:
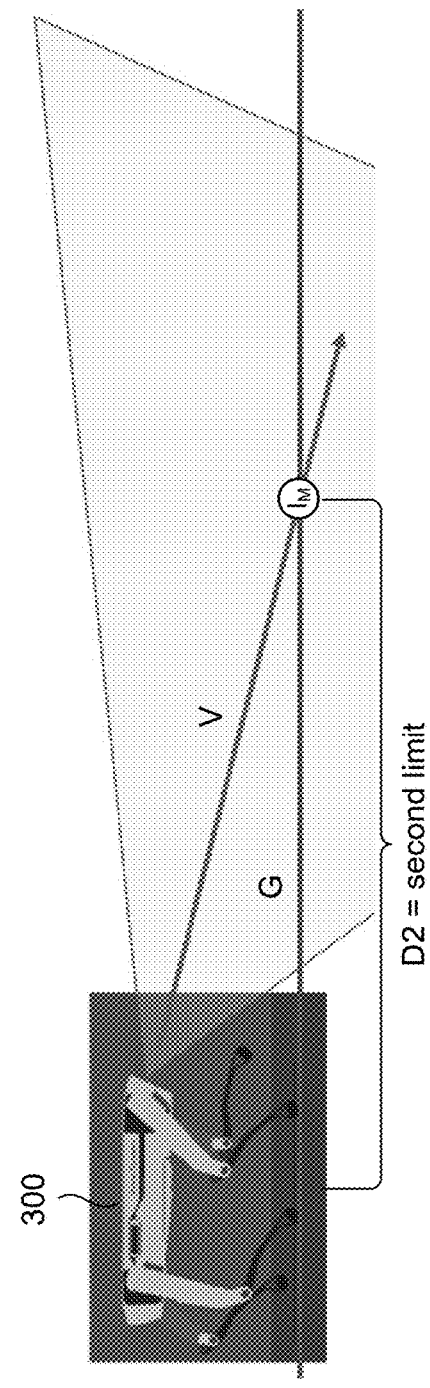

Referring to FIGS. 4B, 5E, and 5F, when a first distance D1 between the robot 300 and an intersection I between a pointing vector V and a ground plane estimate G in front of the robot 300 dissatisfies (e.g., exceeding) the threshold distance (e.g., four meters), the touch to go application 400 sends a waypoint command W (FIG. 4B) to the robot 300 that causes the robot 300 to move towards the intersection I by a shortened distance D2 (FIG. 5F) between the robot 300 and a moved intersection $I_M$ (FIG. 5F). FIG. 5F shows the shortened distance D2 equal to a second limit equal to or less than the threshold distance (e.g., equal to four meters), which is less than the first limit (FIG. 5E). IN other words, when the distance between the intersection I and the robot 300 dissatisfies the threshold distance, the application 400 may shift or move the intersection I closer to the robot 400 such that the resulting moved intersection $I_M$ satisfies the threshold distance. The touch to go application 400 sends the location of the moved intersection $I_M$ as a waypoint command W to the robot 300, and then the robot 300 navigates to the waypoint on its own.

The operator 10 may select a pixel location 224 that corresponds to a location above the horizon in the robotic environment, that is, a location not on the ground. Instead of returning a warning or an error message, the touch to go application 400 interprets the operator's 10 selection as wanting to navigate the robot 300 far away, but the operator 10 accidently selected a location that is above the horizon. Based on this interpretation, the touch to go application 400 instructs the robot 300 to move in a direction intended by the operator 10 without the operator 10 having to pick another location.

Figure 5G:
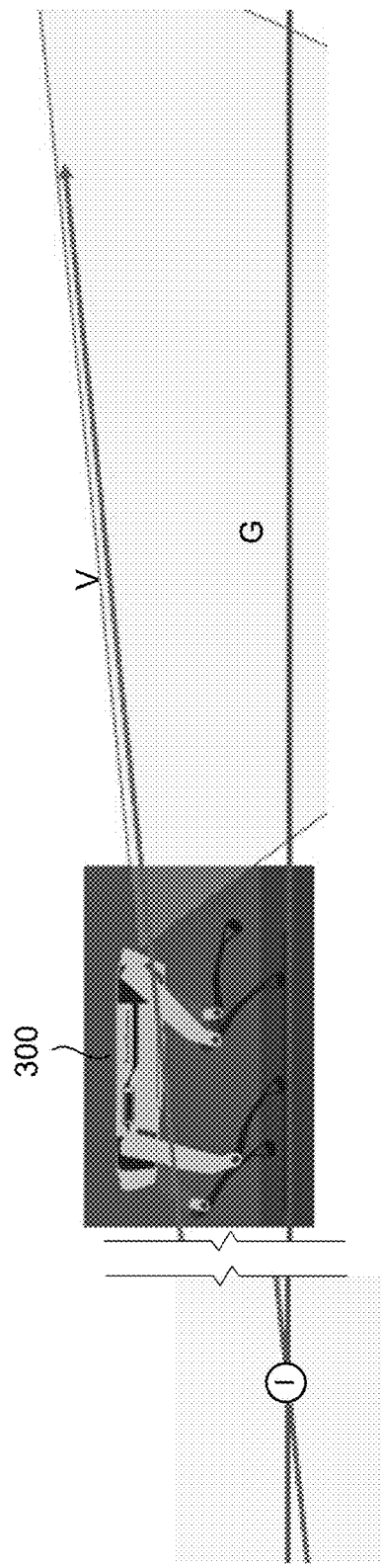
Figure 5H:
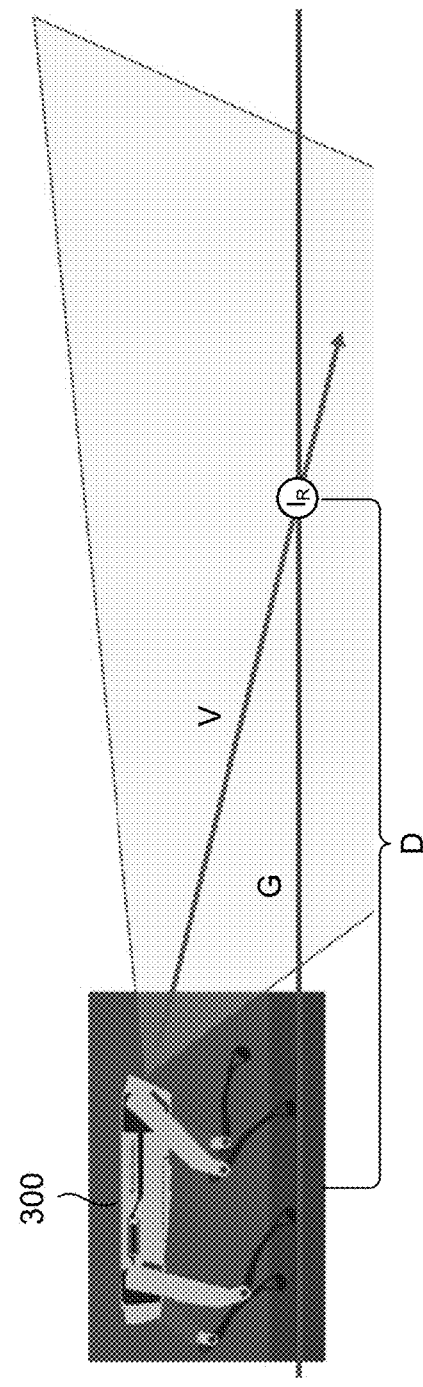

Referring to FIGS. 4B, 5G, and 5H, when a pixel location 224 selected by the operator 10 is above the horizon, an intersection I between a pointing vector V representing the direction where the operator 10 wants the robot 300 to navigate and a ground plane estimate G of the robot 300 is located behind the robot 300 (FIG. 5G). In this scenario, FIG. 5H shows the touch to go application 400 reflecting the intersection I so that a reflected intersection $I_R$ is in front of the robot 300. Here, a distance between the robot 300 and the intersection I behind the robot 300 is equal to a distance between the robot and the reflected intersection $I_R$ in front of the robot 300. In this way, the robot 300 is not instructed to move in a direction opposite the intended direction. The touch to go application 400 moves the reflected intersection $I_R$ closer to or further from the robot 300 so that the robot 300 is a distance D from the reflected intersection ($I_R$) (FIG. 5H) that satisfies the threshold distance (e.g., less than or equal to four meters). The touch to go application 400 sends the location of the reflected intersection $I_R$ as a waypoint command to the robot 300, thereby causing the robot 300 to navigate to the waypoint associated with the reflected intersection $I_R$.

Figure 6A:
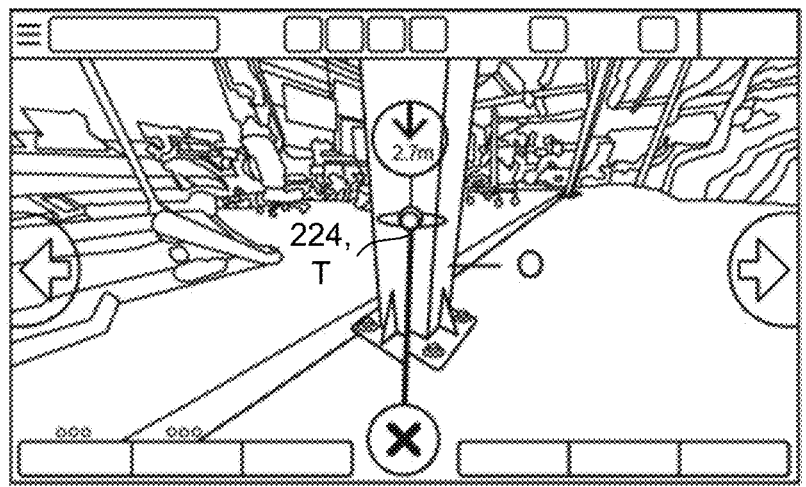
FIGS. 6A-6C are screenshots of an operator using an example of the touch to go application to navigate a robot, where the robot avoids an obstacle.
Figure 6B:
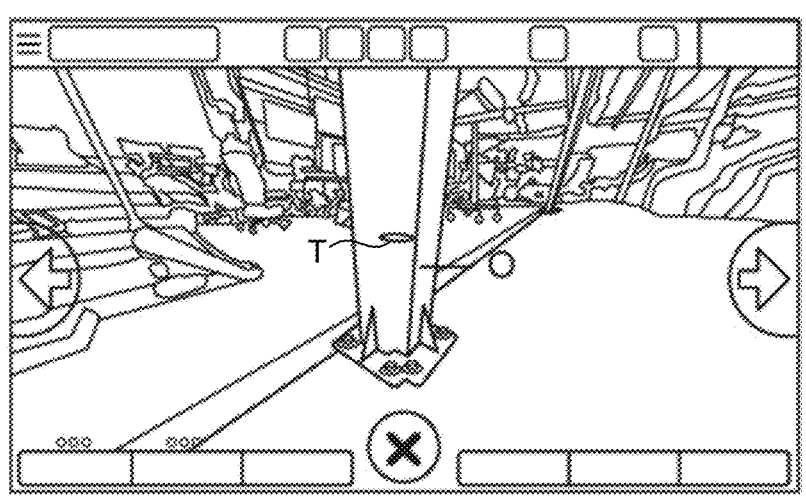
Figure 6C:
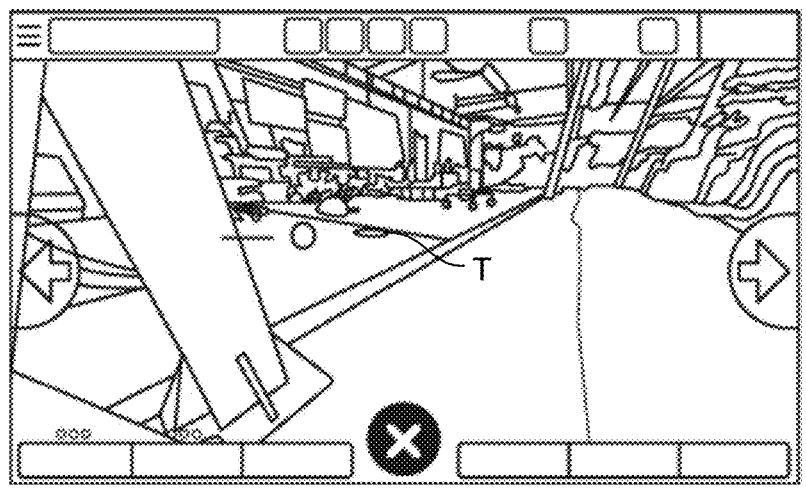
Figure 7A:
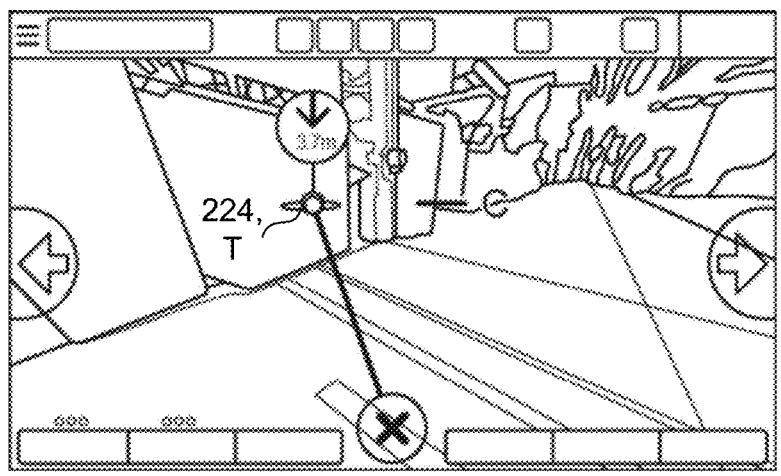
FIGS. 7A-7C are screenshots of an operator using an example of the touch to go application to navigate a robot, where the robot goes around a corner.

Referring to FIGS. 6A-6C and 7A-7C, in some scenarios, the operator 10 wants the robot 300 to navigate to a waypoint (e.g., target location T) that is located behind an obstacle O (FIG. 6A) or is located around a corner C (FIG. 7A) formed by intersecting walls. For instance, FIG. 6A shows the operator 10 providing a navigation input by inputting a pixel location 224 behind the obstacle O to cause the robot 300 to maneuver to the target location T behind the obstacle O. Likewise, FIG. 7A shows the operator 10 providing a navigation input by inputting a pixel location 224 around the corner C to cause the robot 300 to maneuver to the target location T that includes a hallway or a general area around the corner C. In these situations, the traversal system 380, with input from the sensor system 340 and the perception system 390, controls the robot 300 so that the robot 300 avoids the obstacle O (FIGS. 6B and 6C) by navigating around the obstacle O and maneuvering to the target location T. That is, the traversal system 380 is configured to override the navigation input to allow the robot 300 to traverse around the obstacle when feasible. In scenarios when traversing around an obstacle is not feasible, the traversal system 380 can cease performing the navigation maneuver to the target location. In these scenarios, the traversal system 380 may inform the application 400 that navigating to the target location T is not feasible, and the application 400 may output a message (visual, haptic, and/or audio) informing the operator 10 that the navigation input is not feasible.

Figure 7B:
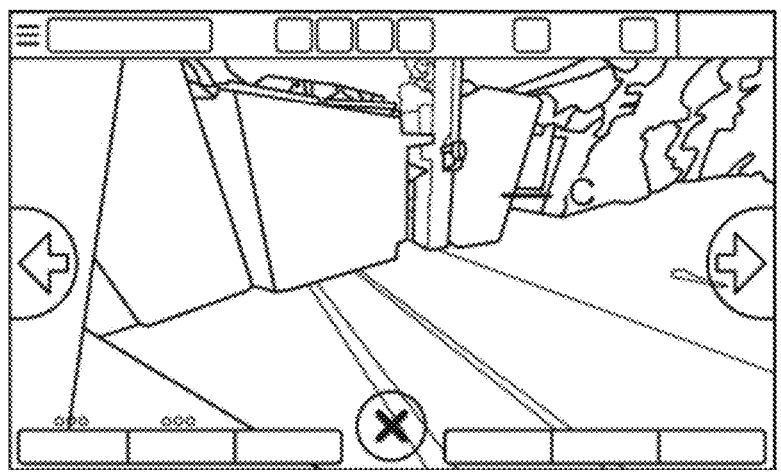
Figure 7C:
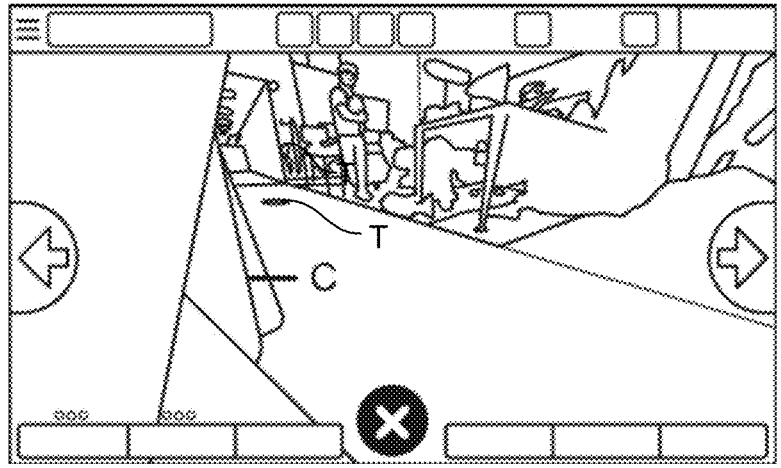

Similarly, as shown in FIGS. 7A and 7B, the traversal system 380, with input from the sensor system 340 and the perception system 390, controls the robot 300 to approach the corner (FIG. 7B) and then maneuver around the corner C (e.g., maneuver to the right relative to the view of FIG. 7C) to get to the target location in the robot environment associated with the pixel location 224 input by the operator 10. Advantageously, the operator 10 can provide the pixel location 224 as a high level command to reach a target location T and the robot 300 is tasked with locating a side path to reach the target location T. In the example shown, the robot 300 skirts the wall until finding the opening around the corner C to pass through to reach the target location. This obstacle avoidance functionality alleviates the operator 10 from having to provide multiple intermediate navigation inputs to navigate the robot 300 around each obstruction (e.g., obstacle O or corner C) in order maneuver the robot 300 to the target location. Some implementations may rely on the control/traversal technologies disclosed in U.S. Application No. 62/744,954, filed Oct. 12, 2018, entitled "Terrain and Constraint Planning for Footstep Plan" and U.S. application Ser. No. 16/382,390, filed Apr. 12, 2019, entitled "Robotically Negotiating Stairs", which are incorporated herein in their entireties.

Figure 8A:
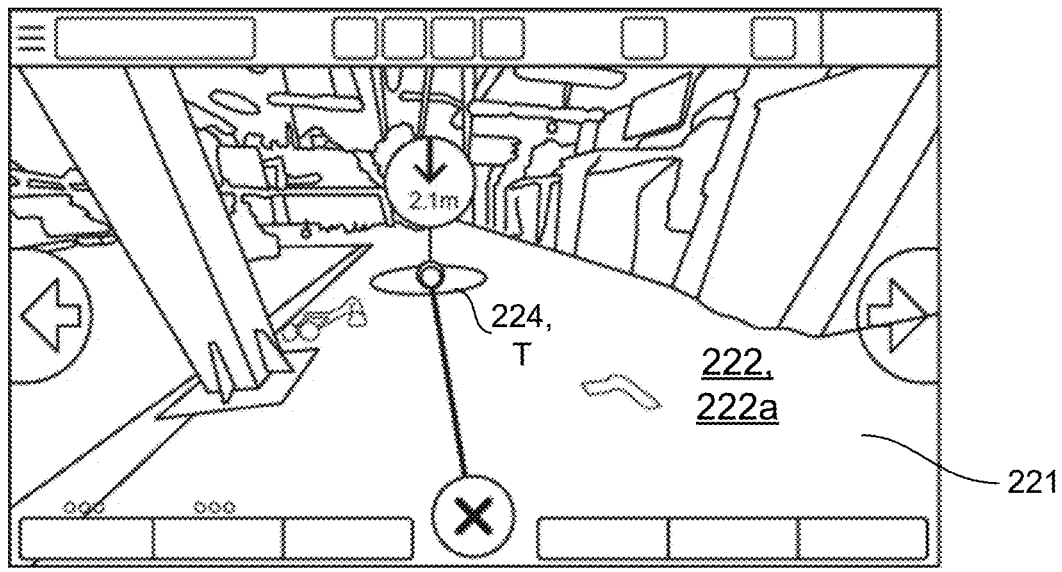
FIGS. 8A-8D are screenshots of an operator using an example of the touch to go application to change a direction of travel of a robot by changing scenes.
Figure 8B:
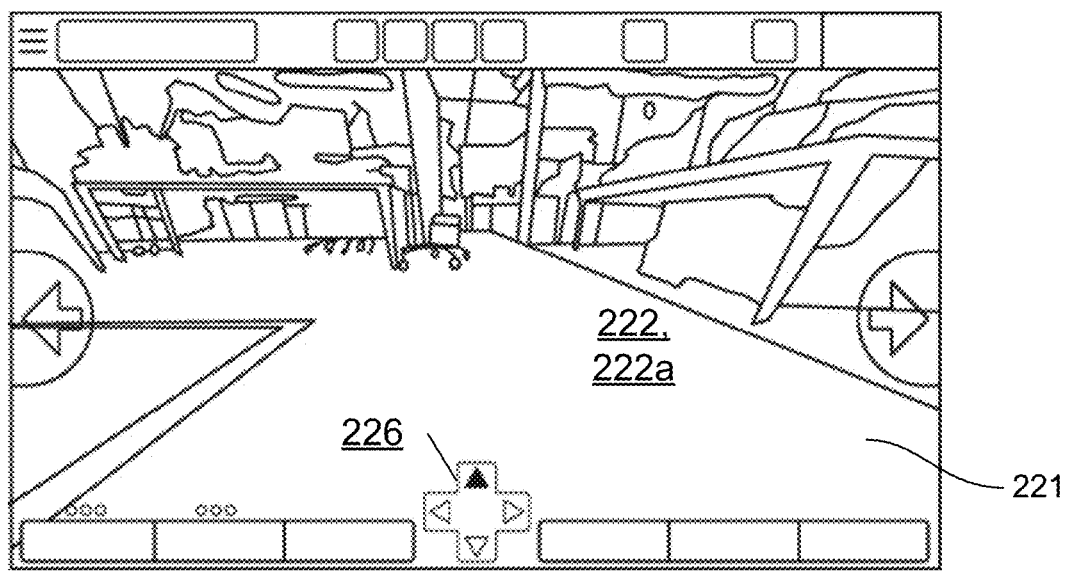
Figure 8C:
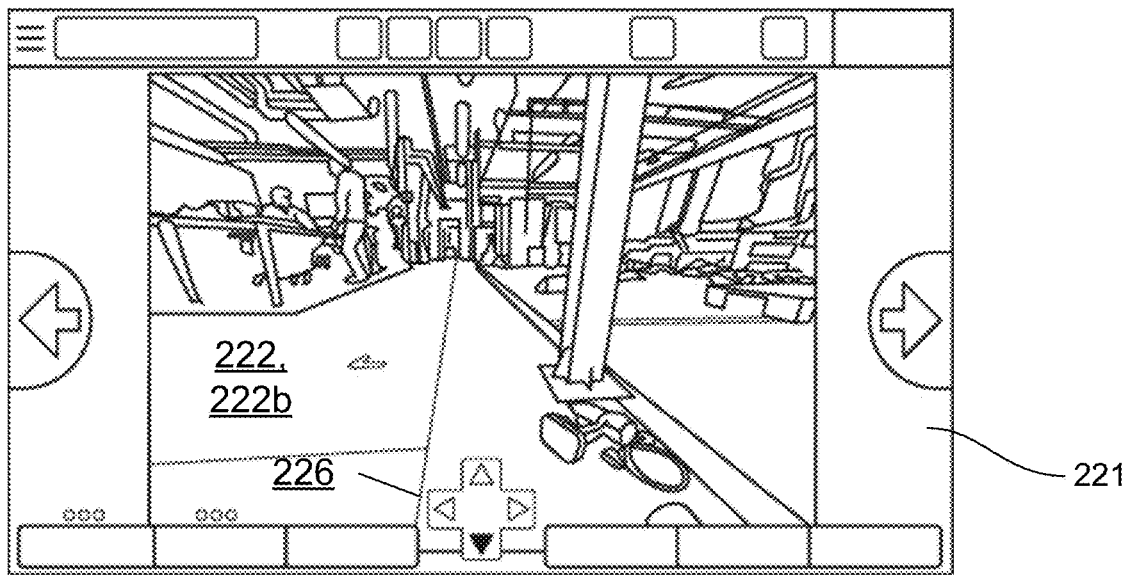
Figure 8D:
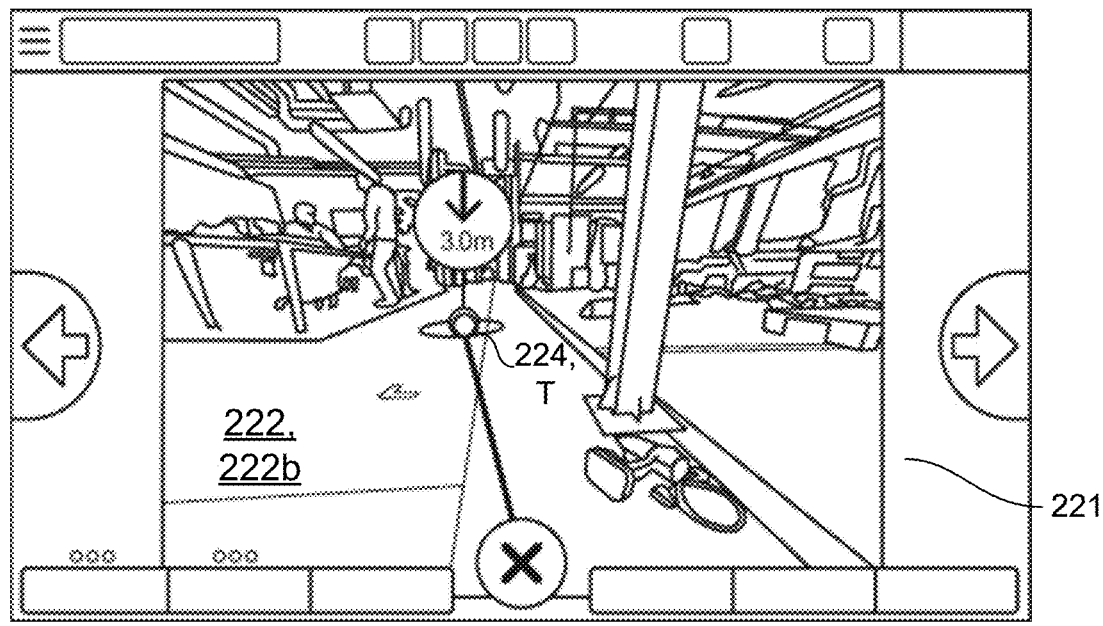

In some implementations, the touch to go application 400 allows the operator 10 can change a direction in which the robot 300 is moving by changing scenes. As described above with reference to FIGS. 3D and 3E, each of the cameras 344, 344a-e on the robot 300 surveys or captures a portion of the robotic environment within their respective field of view 349, 349a-f (or simply "view") and provides image data 342 corresponding to that field of view. The touch to go application 400 in turn renders the image data 342 into an image or a scene so the operator 10 sees a change in scene. For example, FIGS. 8A and 8B show the GUI 221 presenting a forward scene 222, 222a rendered from the forward view 349f captured by the forward-left camera 344a and forward-right camera 344b of the robot 300. The forward scene 222a presents, to the operator 10, the robot environment front of the robot 300. FIGS. 8C and 8D show the GUI 221 presenting an aft scene 222, 222b rendered from the aft view 349e captured by the aft camera 344e of the robot 300. The aft scene 222b is displayed to the operator 10 so that operator 10 can see what is behind of the robot 300.

Referring to FIGS. 8B and 8C, the application 400 may present a scene changer 226 graphical element (e.g., button) on the GUI 221 to allow the operator 10 to change between the different scenes as well as to change the direction that the robot 300 is moving, as described in greater detail below. In the example shown, the scene changer 226 graphical element includes four directional arrows that the operator 10 may select to toggle between the different scenes. For instance, the operator 10 may provide an input indication indicating selection of the forward directional arrow of the scene changer 226 to view the forward scene 222a (FIG. 8B), and then toggle to view the aft scene 222b (FIG. 8C) by providing another input indication selection of the aft directional arrow of the scene changer 226. The operator 10 may further toggle between left and right scenes (not shown) by providing input indications indicating selections of the left and right directional arrows of the scene changer 226, respectively. In these scenarios, based on the input indication received by the scene changer 226, the GUI 221 may present the left scene 222 or right scene 222 for the operator 10 to view before the touch to go application 400 sends a corresponding turn command to cause the robot to execute a turning maneuver associated with the change in direction. While the scene changer 226 only provides four options for changing scenes (e.g., forward, aft, left, and right), the touch to go application 400 may enable more or less than four options for changing scenes.

FIGS. 8A-8D provide examples of the GUI 221 while the operator 10 uses the touch to go application 400 to navigate the robot 300 in the robotic environment. In FIG. 8A, the operator 10 is viewing the forward scene 222a and provides a navigation input by selecting a pixel location 224 corresponding to a target location T for the robot 300 to navigate to. In response to receiving the navigation input, the touch to go application 400 instructs (e.g., sends a waypoint command W) the robot 300 to move forward (relative to the view of FIGS. 8A and 8B) towards the determined target location T, as described above with reference to FIGS. 5A-5F. The robot 300 then navigates to the target location T associated with the pixel location 224 selected by the operator 10. Upon the robot 300 navigating to the target location T in the forward scene 222a, FIG. 8B shows the operator 10 providing another navigation input by selecting another pixel location 224 corresponding to a new target location for the robot 300 to navigate to. In this way, the operator 10 can continue to move the robot 300 in a forward direction by selecting new pixel locations 224 as the robot 300 traverses forward.

FIG. 8C shows the operator 10 selecting the aft directional arrow of the scene changer 226 graphical element to view the aft scene 222b and cause the robot 300 to reverse the direction of travel in the aft direction. While the GUI 221 presents the aft scene 222b in in response to the input indication selecting the aft directional arrow of the scene changer 226, FIG. 8D shows the operator 10 providing a navigation input by selecting a pixel location 224 corresponding to a target location T for the robot 300 to navigate to. In response to receiving the navigation input associated with the pixel location 224 in the aft scene 222b, the touch to go application 400 instructs (e.g., sends a waypoint command W) the robot 300 to move in the aft direction (e.g., backwards) toward the target location T. In some examples, rather than moving backwards, the robot 300 first executes a turning maneuver to turn substantially 180-degrees to face the aft direction 222b as a new forward direction in response to receiving the waypoint command W, and then moves forward toward the determined target location. The robot 300 may decide whether or not to traverse in the aft direction or first execute a turning maneuver to traverse in the forward direction based on one or more factors. For example, non-limiting factors may include a distance to the target location T, feasibility for the robot 300 to execute a turning maneu-ver, familiarity with the robot environment, camera position 404 (FIG. 4A), or user preference. In some configurations, the robot 300 is not configured to move in the aft direction, thereby requiring the robot 300 to first execute the turning maneuver so that it can move to the target location T by moving in the forward direction.

Figure 9A:
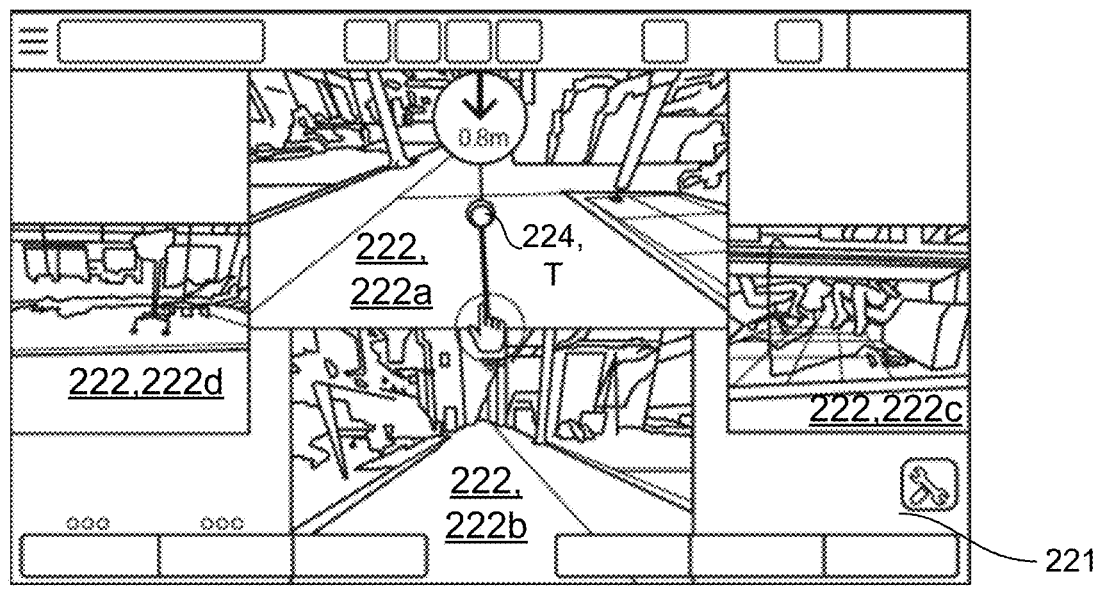
FIGS. 9A-9D are screenshots of an operator using an example of the touch to go application to change a direction of travel of a robot by selecting a scene from multiple scenes.
Figure 9B:
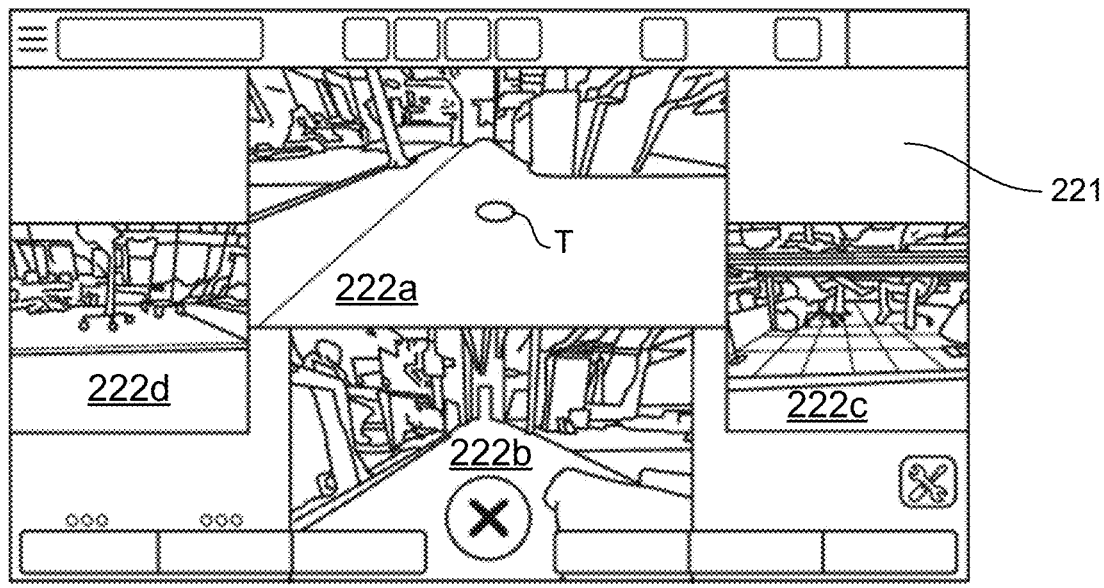

FIGS. 9A-9D provide examples of the GUI 221 of the touch to go application 400 rendering simultaneous display of a forward scene 222a, an aft scene 222b, a right scene 222c, and a left scene 222d. Here, the operator 10 does not need to use the scene changer 226 to change scenes, and can instead provide a navigation input to a target location T by selecting the pixel location 224 in the corresponding one of the available scenes 222, 222a-d that presents the target location T. For instance, FIG. 9A shows the operator selecting a pixel location 224 from the forward scene 222a that corresponds to a target location T for the robot 300 to navigate to. In response to receiving the navigation input, the touch to go application 400 instructs (e.g., sends a waypoint command W) the robot 300 to move forward (relative to the view of FIGS. 9A and 9B) towards the determined target location T, as described above with reference to FIGS. 5A-5F.

Figure 9C:
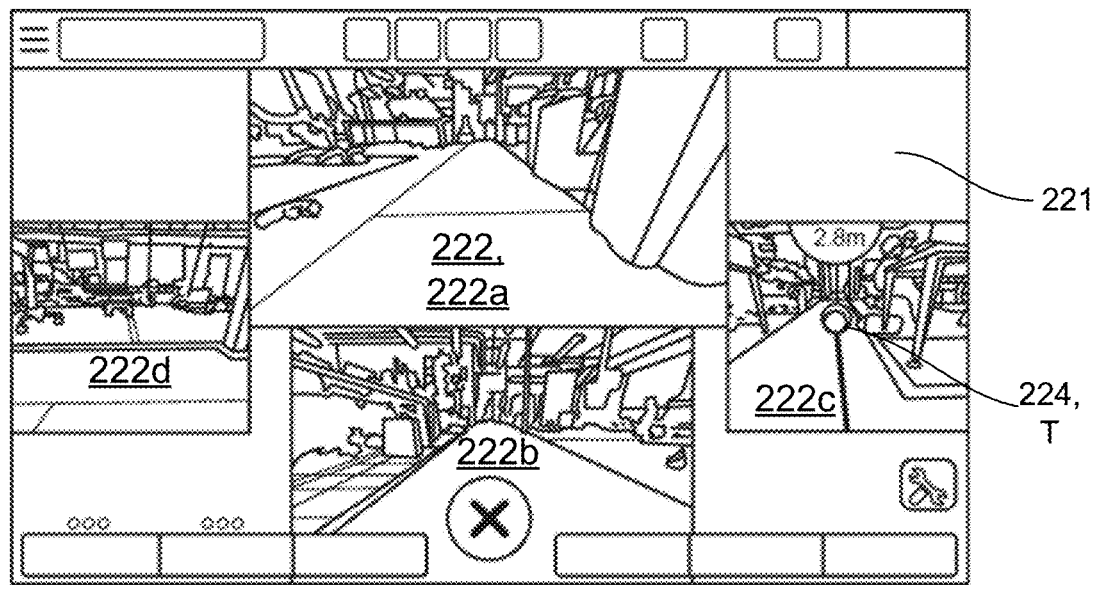
Figure 9D:
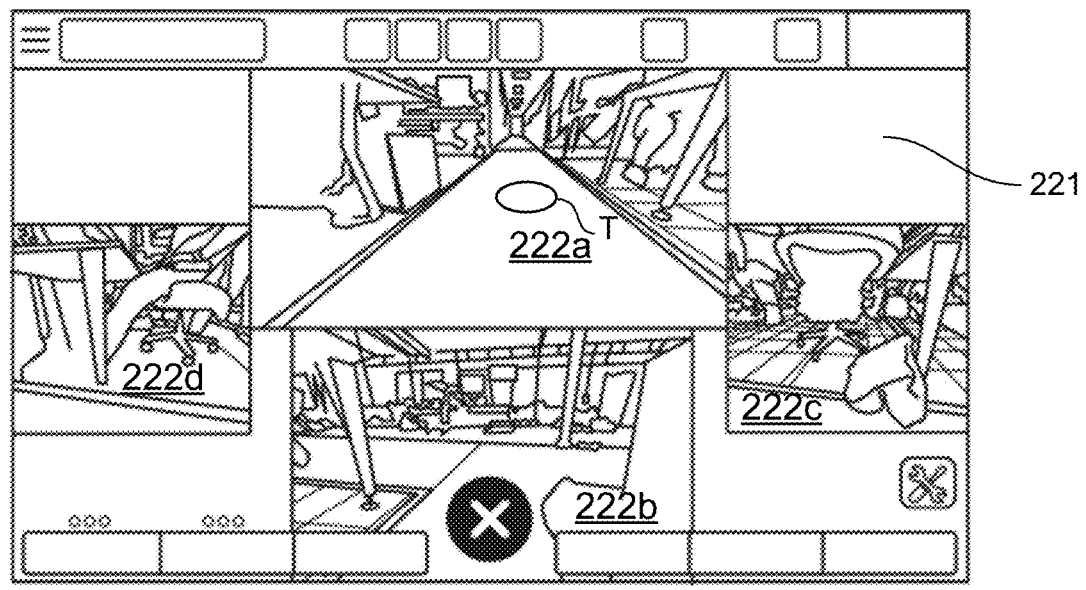

FIG. 9C shows the operator selecting a new pixel location 224 from the right scene 222c that corresponds to a new target location T for the robot 300 to navigate to. In response to receiving the navigation input associated with the pixel location 224 in the right scene 222c, the touch to go application 400 instructs (e.g., sends a waypoint command W) the robot 300 to execute a turning maneuver to the right and then move forward toward the determined new target location T. FIG. 9D shows the GUI 221 rendering the simultaneous display of the scenes 222a-d while the robot 300 is moving toward the new target location T after executing the turning maneuver to the right. That is, the view of the robotic environment depicted in each of the scenes 222a-d of FIG. 9C is rotated 90-degrees such that the forward scene 222a of FIG. 9D corresponds to the right scene 222c of FIG. 9C, the right scene 222c of FIG. 9D corresponds to the aft scene 222b of FIG. 9C, the aft scene 222b of FIG. 9D corresponds to the left scene 222d of FIG. 9C, and the left scene 222d of FIG. 9D corresponds to the forward scene 222a of FIG. 9C.

Figure 10A:
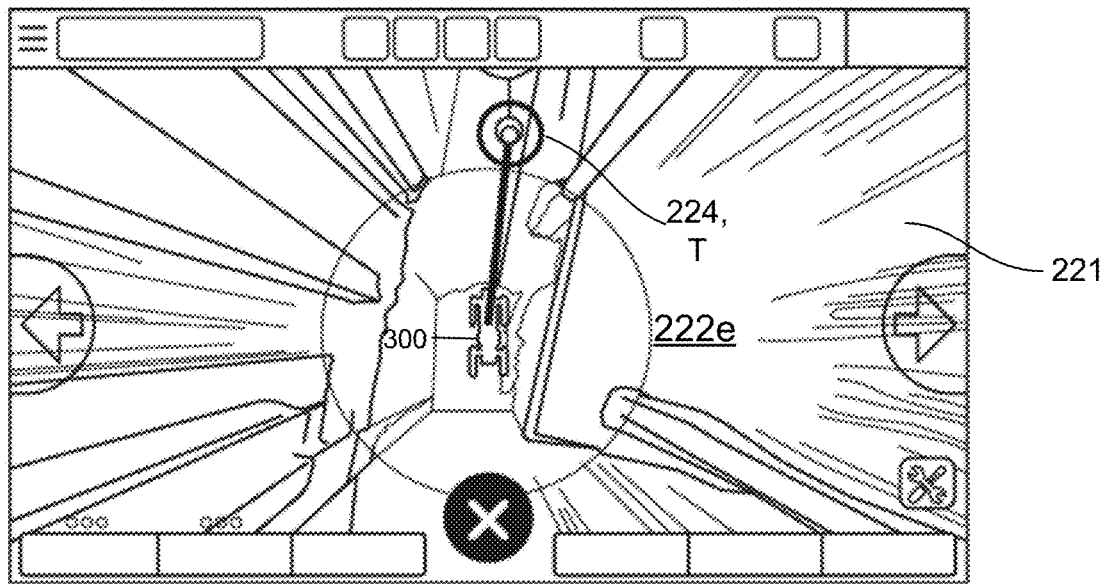
FIGS. 10A-10B are screenshots of an operator using an example of the touch to go application to navigate a robot from a top-down scene.
Figure 10B:
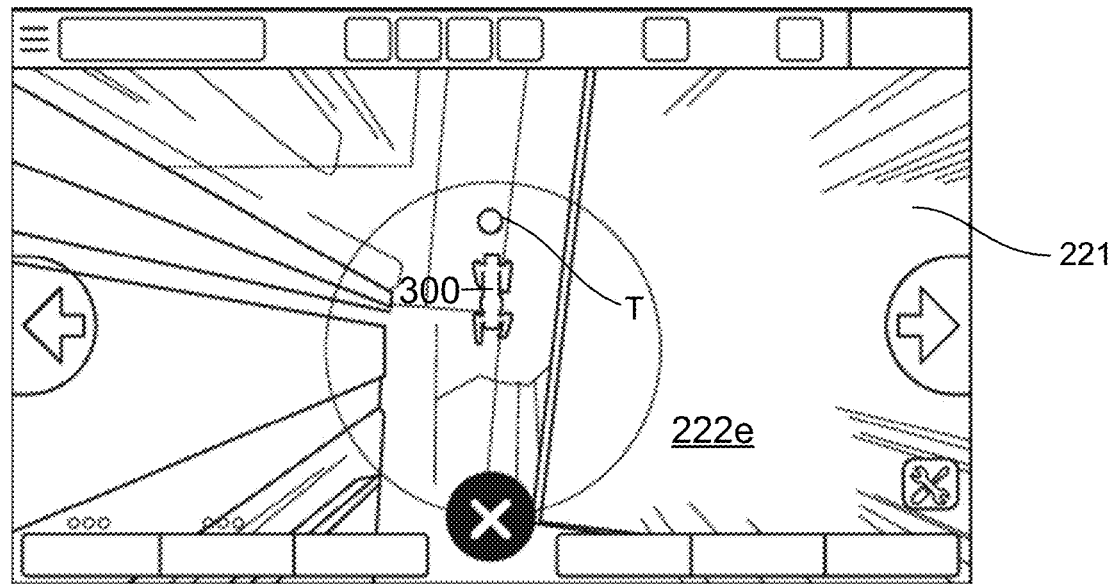

FIGS. 10A and 10B provide examples of the GUI 221 of the touch to go application 400 rendering display of a top-down scene 222e of the robot 300. The application 400 may construct the top-down scene 222e using image data 342 captured from any combination of the cameras 344, 344a-e on the robot 300 within their respective field of view 349, 349a-f (or simply "view"). The image data 342 used for constructing the top-down scene 222e may be further captured from a payload camera 344 mounted on the robot 300. To navigate the robot 300 to a target location T, FIG. 10A shows the operator 10 providing a navigation input by selecting a pixel location 224 within the top-down scene 222e associated with the target location T. Based on the pixel location 224, the touch to go application 400 is able to determine the target location T for navigating the robot 10. Accordingly, in response to receiving the navigation input, FIG. 10B shows the touch to go application 400 instructing (e.g., sends a waypoint command W) the robot 300 to move forward (relative to the view of FIGS. 10A and 10B) towards the determined target location T, as described above with reference to FIGS. 5A-5F. A graphic depicting the robot 300 may be rendered on the top-down scene 222e to display a current position of the robot 300 within the robotic environment. For instance, the graphic of the robot 300 may move to depict the instantaneous position of the robot 300 while traversing to the target location T.

Figure 11A:
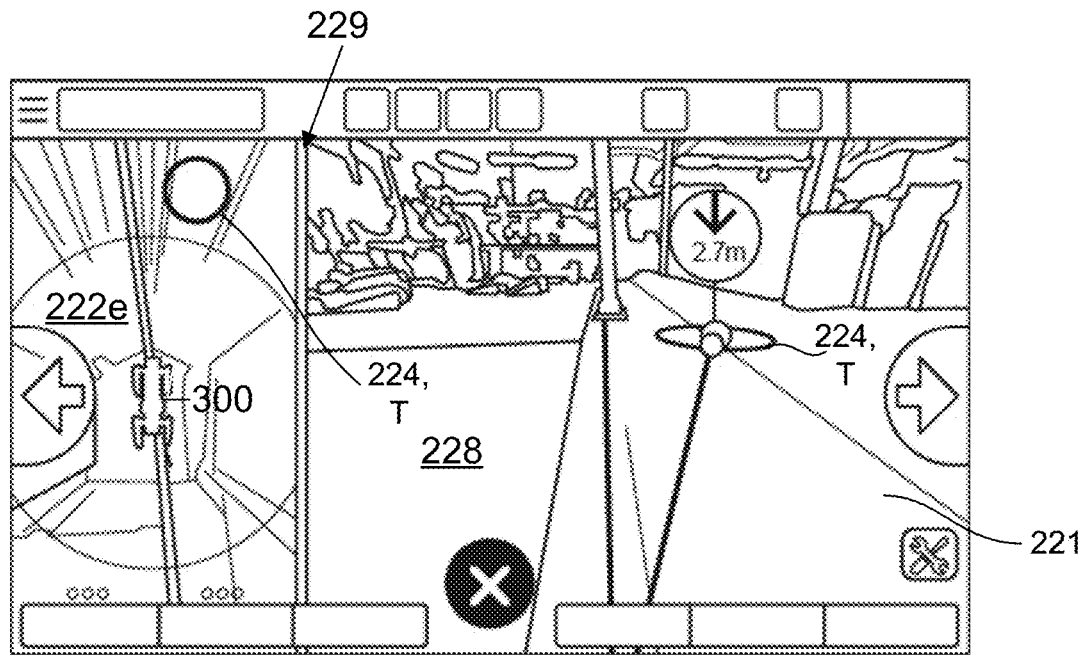
FIGS. 11A and 11B are screenshots of an operator using an example of the touch to go application to navigate a robot using a split screen.
Figure 11B:
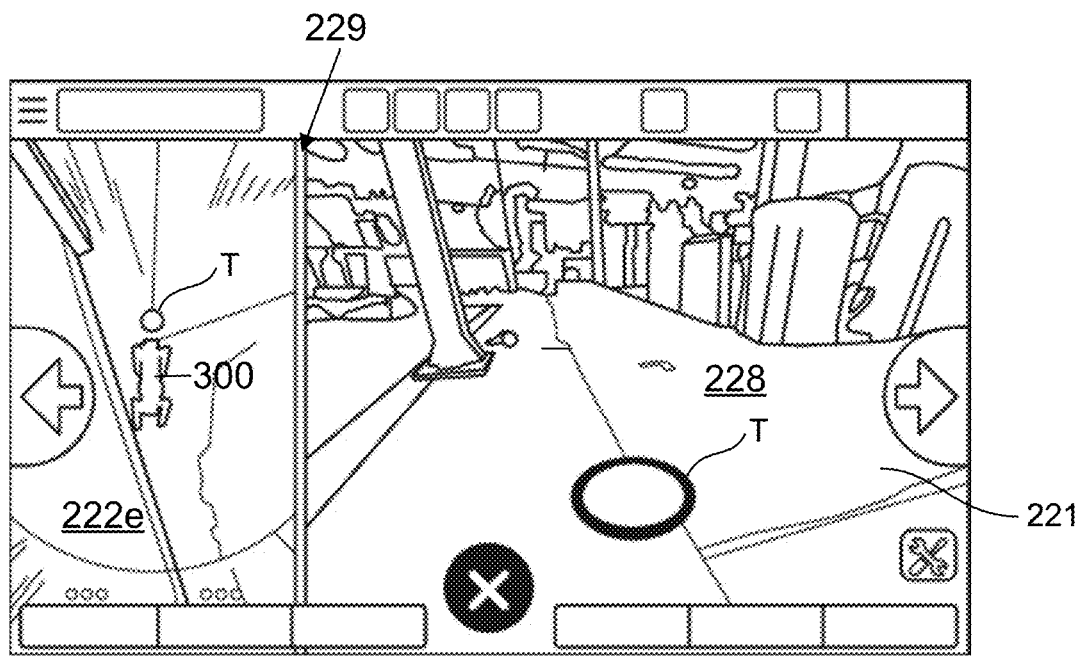

In additional examples, FIGS. 11A and 11B show the GUI 221 of the touch to go application 400 is configured to display a split screen 229 depicting both the top-down scene 222e (FIGS. 10A and 10B) and a user-selected scene 228 of the robotic environment simultaneously. The orientation of the scenes 222e, 228 can be displayed on opposite sides of the split screen 229 without departing from the scope of the present disclosure. In some examples, the application 400 allows the operator 10 to customize the location of the scenes 22e, 228 rendered on the GUI 221 and/or adjust a window size of either of the scenes 222e, 228. In the example shown, the user-selected scene 228 corresponds to a forward scene 222a. In other examples, the user-selected scene 228 corresponds to any one of the aft scene 222b, right scene 222c, or left scene 222d. The GUI 221 may present a button (not shown) for allowing the operator 10 to select which scene 222a-d to render in the GUI 221 as the user-selected scene 228. The GUI 221 of any of FIGS. 8A-10B may similarly present one or more buttons for allowing the operator 10 to select between the various different GUI configurations. For example, the operator 10 may prefer to provide high level-navigation inputs using top-down scene 222e and then switch to the GUI 221 to render four scenes 222a-d simultaneously when fine-grained navigation inputs are needed.

To navigate the robot 300 to a target location T, FIG. 11A shows the operator 10 providing a navigation input by selecting either a pixel location 224 in the top-down scene 222e associated with the target location T or a pixel location 224 in the user-selected scene 228 associated with the target location T. While the pixel locations 224 in each of the scenes 222e, 228 are different, the touch to go application 400 is able to determine the same target location T for navigating the robot 300 regardless of which scene 222e, 228 the operator 10 uses to provide the navigation input. IN other implementations, the application 400 allows the operator 10 to provide navigation inputs to only one of the scenes 222e, 228. Based on the pixel location 224, the touch to go application 400 is able to determine the target location T for navigating the robot 10. Accordingly, in response to receiving the navigation input, FIG. 11B shows the touch to go application 400 instructing (e.g., sends a waypoint command W) the robot 300 to move forward (relative to the view of FIGS. 11A and 11B) towards the determined target location T, as described above with reference to FIGS. 5A-5F. A graphic depicting the robot 300 may be rendered on the top-down scene 222e to display a current position of the robot 300 within the robotic environment. For instance, the graphic of the robot 300 may move to depict the instantaneous position of the robot 300 while traversing to the target location T.

The user-selected scene 228 and the top-down scene 222e are synchronized such the operator 10 views the robotic environment relative to the robotic environment in the first person view 228 and the top-down scene 222e simultaneously and in real-time. Further, selecting the pixel location 224 for the target location T in one of the scenes 222e, 228 may cause the other scene 222e, 228 to mirror selection of a corresponding pixel location 224 for the target location T. Advantageously, with the split screen 229 the operator 10 has the option of using a particular view/scene to navigate the robot 300 that is suited for a given task, circumstance, and/or environment.

Figure 12A:
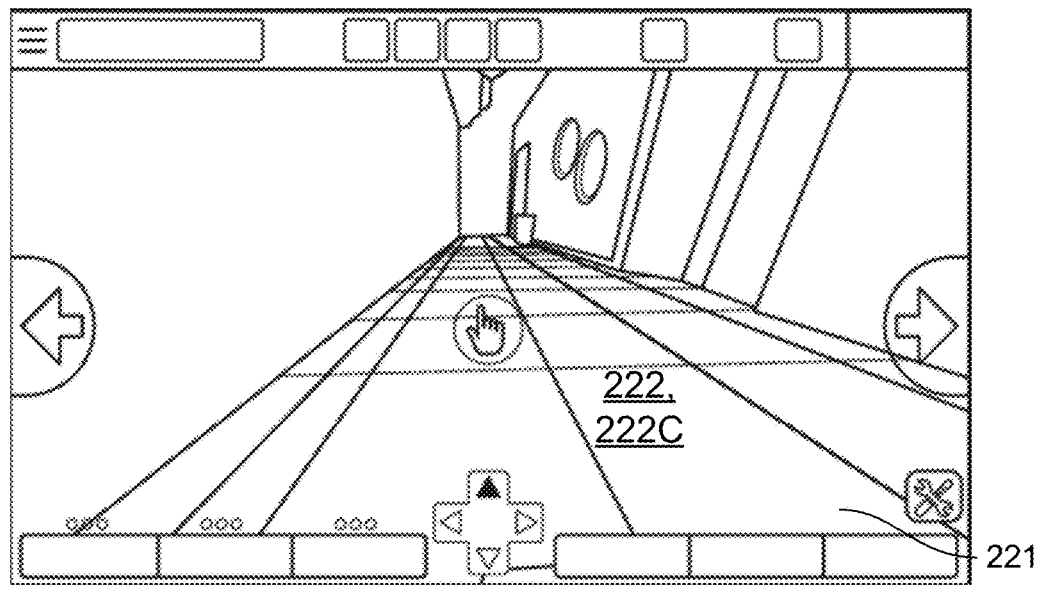
FIGS. 12A and 12B are screenshots of an operator using an example of the touch to go application to "pre-rotate" a robot.
Figure 12B:
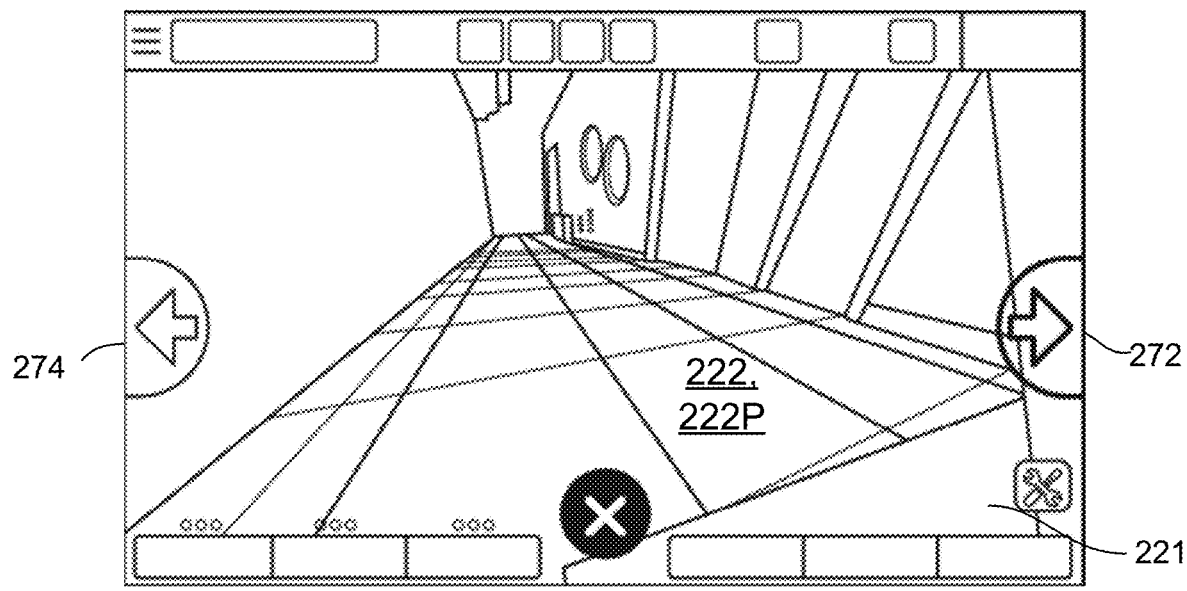

Referring to FIGS. 12A and 12B, in some implementations, the touch to go application 400 is configured to allow the operator 10 to preview a scene 222, 222P (FIG. 12B) of the robotic environment without physically instructing the robot 300 to move. For instance, while presenting a current scene 222, 222C on the GUI 221 (FIG. 12A), the GUI 221 also presents first and second rotation graphics 272, 274, that when selected by the operator 10, cause the GUI 221 to present the preview scene 222P (FIG. 12B) by rotating the field of view in one of a first direction or an opposite second direction away from the current scene 222C. Alternatively or additionally, the operator 10 can use the controls 230 on the mobile device 200, such as control sticks 230b or directional d-pad 230c, to carry out the functionality of the first and second rotation graphics 272, 274. As such, the GUI 221 may receive a rotation input that causes the field of view to rotate away from the current scene 222C upon selection of either of the rotation graphics 272, 274 and/or user inputs to the control sticks 230b or directional d-pad 230c.

For instance, the GUI 221 may receive a rotation input indicating selection of the first rotation graphic 272 to cause the field of view to rotate in the first direction (e.g., to the right) away from the current scene 222C to convey a turning maneuver by the robot 300 to the right without the robot 300 physically moving or performing the turning maneuver. In some examples, selection of the first rotation graphic 272 also causes the touch to go application 400 to command the robot 300 to execute a turning maneuver in the first direction. In these examples, the GUI 221 may responsively rotate the field of view in the first direction away from the current scene 222C to provide the operator 10 instant feedback of the robot 300 executing the turning maneuver before the robot 300 actually executes the turning maneuver due to lag (e.g., communication lag between the mobile device 200 and the robot 300, as well as lag resulting from the time to physically control the robot 300 to execute the turn). In other examples, the selection of the first rotation graphic 272 simply causes the field of view to rotate in the first direction away from the current scene 222C to allow the operator 10 to view the preview scene 222D without physically requiring movement by the robot 300. For instance, the operator 10 may rotate the field of view in the first direction to view a scene to the right of the robot 300 to assist the operator 10 in making navigation decisions before instructing the robot 300 to maneuver. In some examples, the amount the field of view rotates is proportional to how long the first rotation graphic 272 is in contact with the operator 10 (e.g., by touching). For instance, the field of view may rotate in the first direction until the operator 10 releases contact with the first rotation graphic 272. In additional examples, the field of view rotates by an increment each time the first rotation graphic 272 is touched and released. The application 400 may augment (e.g., change the color of the first rotation graphic 272) to indicate when the graphic 272 is selected.

Similarly, the GUI 221 may receive a rotation input indicating selection of the second rotation graphic 274 to cause the field of view to rotate in the second direction (e.g., to the left) away from the current scene 222C to convey a turning maneuver by the robot 300 to the left without the robot 300 physically moving or performing the turning maneuver. In some examples, selection of the second rotation graphic 274 also causes the touch to go application 400 to command the robot 300 to execute a turning maneuver in the second direction. In these examples, the GUI 221 may responsively rotate the field of view in the second direction away from the current scene 222C to provide the operator 10 instant feedback of the robot 300 executing the turning maneuver before the robot 300 actually executes the turning maneuver due to lag (e.g., communication lag between the mobile device 200 and the robot 300, as well as lag resulting from the time to physically control the robot 300 to execute the turn). In other examples, the selection of the second rotation graphic 274 simply causes the field of view to rotate in the second direction away from the current scene 222C to allow the operator 10 to view the preview scene 222D without physically requiring movement by the robot 300. For instance, the operator 10 may rotate the field of view in the second direction to view a scene to the left of the robot 300 to assist the operator 10 in making navigation decisions before instructing the robot 300 to maneuver. In some examples, the amount the field of view rotates is proportional to how long the second rotation graphic 274 is in contact with the operator 10 (e.g., by touching). For instance, the field of view may rotate in the second direction until the operator 10 releases contact the second rotation graphic 274. In additional examples, the field of view rotates by an increment each time the second rotation graphic 274 is touched and released. The application 400 may augment (e.g., change the color of the second rotation graphic 274) to indicate when the graphic 274 is selected.

Whether the field of view is rotating in the first direction or the second direction away from the current scene 222C, the image data 342 rendered for display on the GUI 221 does not simply pan/slide in the first direction or the second direction. Rather, the touch to go application 400 is configured to compile and distort image data 342 captured by various cameras 394 on the robot 300 so that rotation of the field of view in the first direction or the second direction simulates the robot 300 actually turning in the corresponding one of the first direction or the second direction. The availability of image data 342 may constrain how far in either direction the preview scene 222P is able to rotate away from the current scene 222C. Thus, when image data 342 becomes unavailable, the application 400 may blackout an outer peripheral of the preview scene 222P where image data 342 is not available.

Figure 13A:
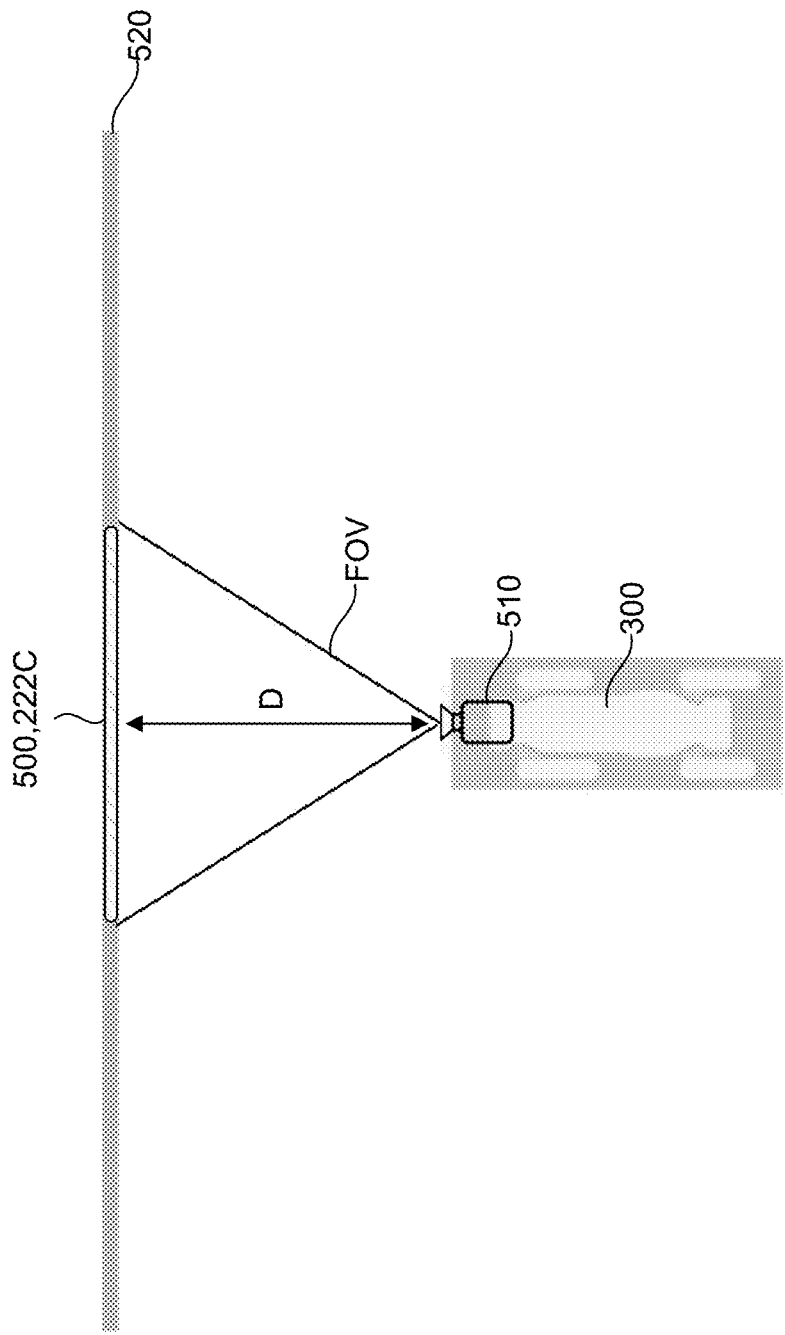
FIGS. 13A-13E are block diagrams of example methods of the touch to go application for "pre-rotating" a robot.

Referring to FIG. 13A, a scene 500 (e.g., current scene 222C) is rendered from a scene camera 510 using a virtual rectangle 520. The scene camera 510 includes a hypothetical camera located near the center of the robot 300 and pointing forward towards the virtual rectangle 520. The scene camera 510 may leverage one or more real cameras 344 of the robot 300 to capture image data 342 for rendering the scene 500. The virtual rectangle 520 is located in front of the scene camera 510 at a distance D called a "stitching distance". The scene camera 510 has a field of view (FOV) that can be adjust programmatically. For example, an angle of the FOV, called the angle of view, can be increased or decreased so more or less of a scene with objects falls within the FOV.

Figure 13B:
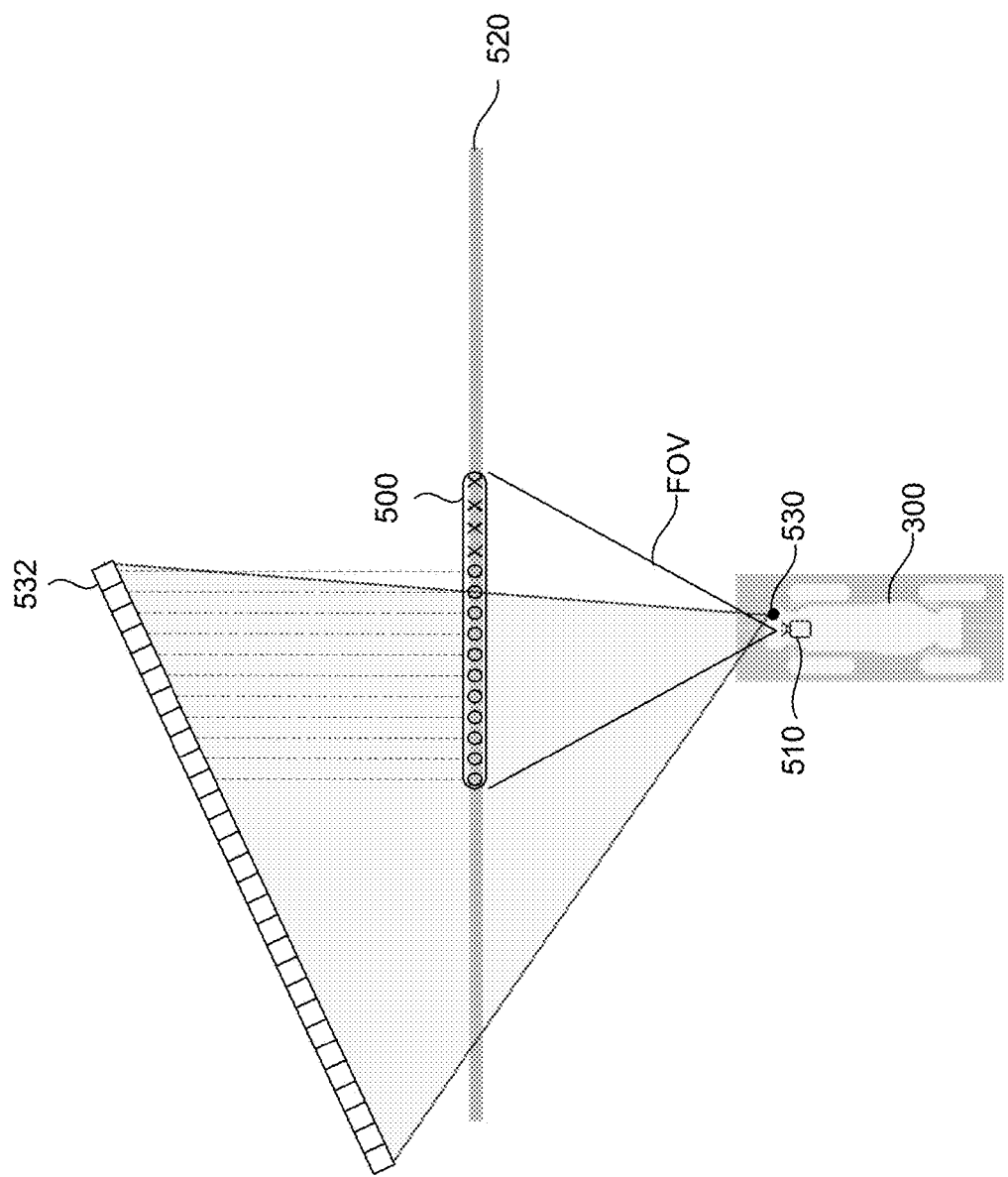

Referring to FIG. 13B, to render the scene 500 (e.g., current scene 222C), the touch to go application 400 "colors" in points on the virtual rectangle 520 with image colors from corresponding pixels on one or more real cameras 530 (e.g., cameras 344) on the robot 300. For the sake of explanation, the real camera 530 can be thought of as a projector, projecting a real image 532 into space from a known position in a known direction. For example, with reference to FIG. 3D, the real camera 530 may be the forward-right camera 344b and the real image 532 may be the forward-left view 349a.

The touch to go application 400 uses the position of the virtual rectangle 520 relative to the robot 300 together with intrinsic and extrinsic calibration information from the real camera 530 to color in the virtual rectangle 520. The position of the virtual rectangle 520 relative to the robot 300 is defined to be in front of the robot 300 at the stitching distance, as described above with reference to FIG. 13A. The touch to go application 400 determines the position of the real camera 530 relative to the robot 300 from the extrinsic calibration information. From the intrinsic calibration information, the touch to go application 400 determines a pixel (representing in the figure as a square) that any point on the virtual rectangle 520 corresponds to in the real image 532.

If points on the virtual rectangle 520 correspond to pixels on the real camera, then the touch to go application 400 colors those points in with the colors from the real image 532 (representing in the figure as O's). If points on the virtual rectangle 520 do not correspond to pixels on the real camera 530, then the touch to go application 400 colors those points black or other color (representing in the figure as X's). When the scene camera 510 is wide enough such that all points on the virtual rectangle 520 correspond to pixels on the real camera 530 and the points are colored in with colors from the real image 532, the operator 10 can make out from the rendered scene the bounds of the real image 532 as shown in FIG. 13B.

Figure 13C:
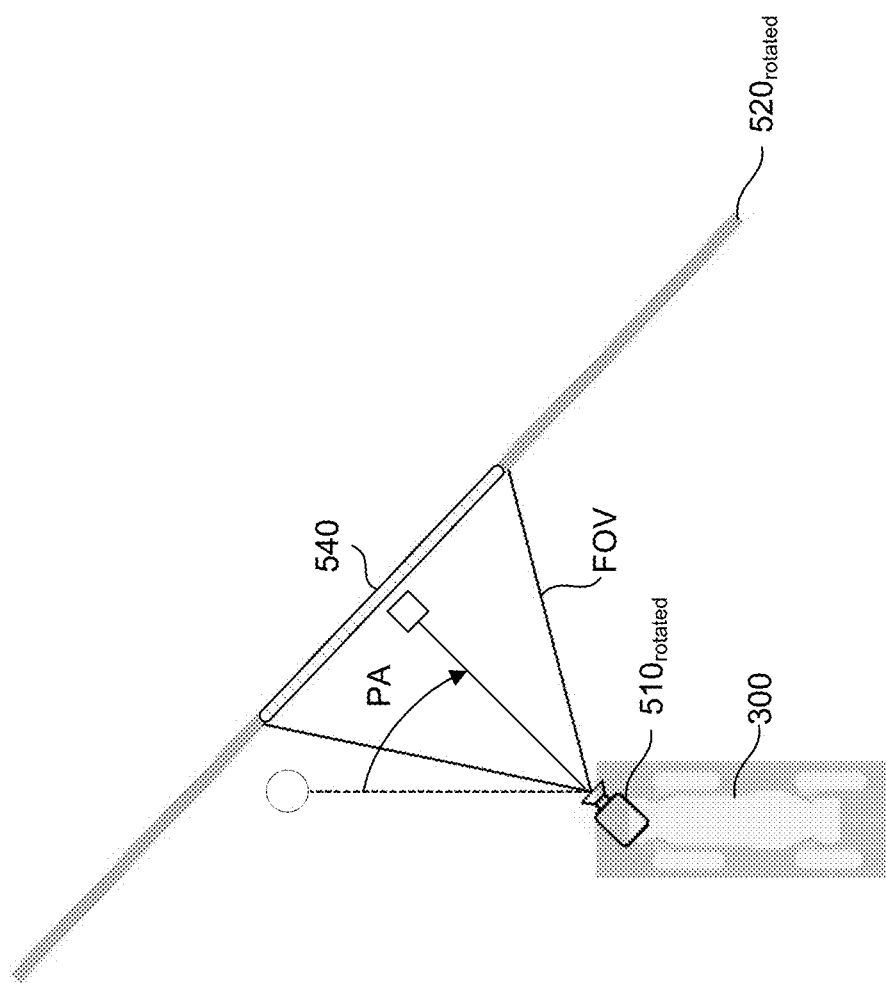

Referring to FIG. 13C, when the operator 10 wants the robot 300 to turn from a present orientation (represented in the figure as a circle) to a target orientation (represented in the figure as a square), which are separated by an angle, the touch to go application 400 rotates the scene camera 510 and the virtual rectangle 520 by a preview angle PA that matches the angle. The rotation produces a rotated scene camera $510_{rotated}$ and a rotated virtual rectangle $520_{rotated}$. The touch to go application 400 then proceeds to color in points on the rotated virtual rectangle $520_{rotated}$ with the colors from the real image (not shown in the figure for clarity) to render the preview scene 540 (e.g., preview scene 222P).

In one implementation, the touch to go application 400 integrates over time a "virtual velocity" that corresponds to the operator's 10 user input to command the robot 300 to rotate. For example, the virtual velocity relates to the operator 10 selecting and holding down the first rotation graphic 272 (FIG. 12B) or the second rotation graphic 274 (FIG. 12B). By using the virtual velocity to turn the rotated scene camera $510_{rotated}$ and the rotated virtual rectangle $520_{rotated}$ by the preview angle PA, the rendered preview scene 540 is responsive to the operator's 10 command, and thus, simulates the robot 300 actually rotating by the preview angle PA. That is, from the preview scene 540, it appears the robot 300 turns as the operator 10 commands rotation and it appears the robot 300 stops turning when the operator 10 stops commanding rotation. Such immediate or near-immediate user feedback may overcome challenges to remote controlling a mobile robot, precisely, where there are delays in communications with the mobile robot and/or delays in the mobile robot executing commands.

Figure 13D:
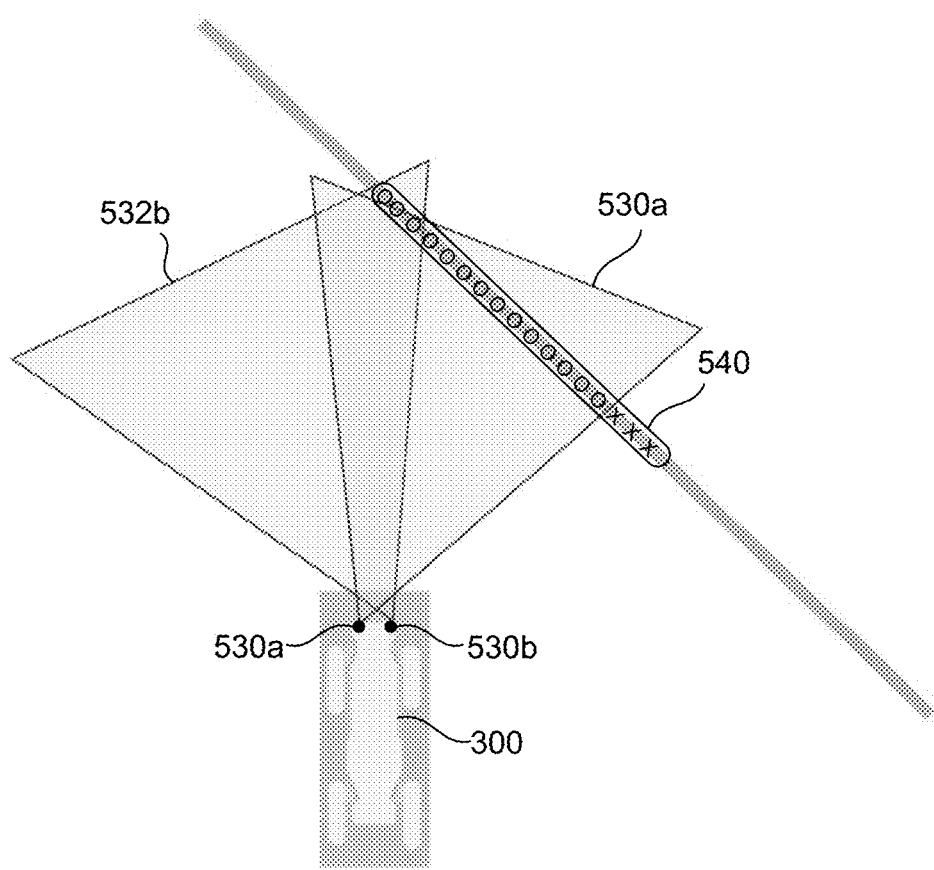
Figure 13E:
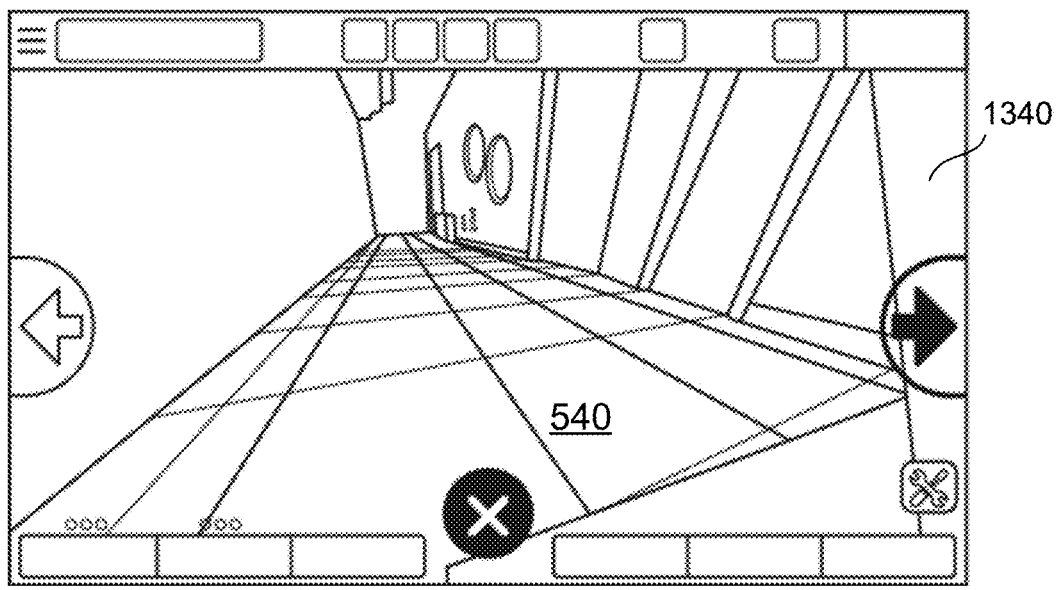

Referring to FIG. 13D, because the robot 300 has not rotated, the real cameras 530, 530a-b on the robot 300 maintain the current field of view and the real images 532, 532a-b from the real cameras 530, 530a-b maintain the current scene. When the scene camera (not shown in the figure for clarity) is rotated to an aggressive preview angle, there is only enough data from the real camera 530 to fill in a portion of the rotated virtual rectangle $520_{rotated}$, depicted in the figure as O's. The remaining portion of the rotated virtual rectangle $520_{rotated}$ is filled in with the color black (or other color), depicted in the figure as X's. The operator 10 sees this as a blacked-out area 1340 (or other colored bar/area) on the right most side of the preview scene 540, as shown in FIG. 13E.

FIGS. 14A-14H show example GUIs 221 (FIGS. 14A, 14C, 14E, 14G) and example robotic environments 301 (FIGS. 14B, 14D, 14F, 14H) when an operator 10 uses the touch to go application 400 to command the robot 300 to turn right from a present orientation to a target orientation. The operator 10 using a mobile device 200 provides user input to control the robot 300. The touch to go application 400 responds to the operator's 10 user input by pre-rotating the robot 300 so the operator sees, from the robot's 300 perspective, the robot 300 turning in a robotic environment towards the target orientation before the robot 300 physical turns.

For purposes of explaining, the pre-rotation process is described with reference to a start time $T_{start}$ and a stop time $T_{stop}$. The start time $T_{start}$ corresponds to a time just before the operator starts controlling the robot and the stop time $T_{stop}$ corresponds to a time just after the operator stops controlling the robot. Further, reference is made to intermediate times $T_1$ and $T_2$ between the start time $T_{start}$ and the stop time $T_{stop}$ such that a complete ordered sequence of times is $T_{start}$, $T_1$, $T_2$, and $T_{stop}$. The intermediate times $T_1$ and $T_2$ correspond when the touch to go application 400 is pre-rotating the robot 300 while the operator 10 is controlling the robot 300.

Figure 14B:
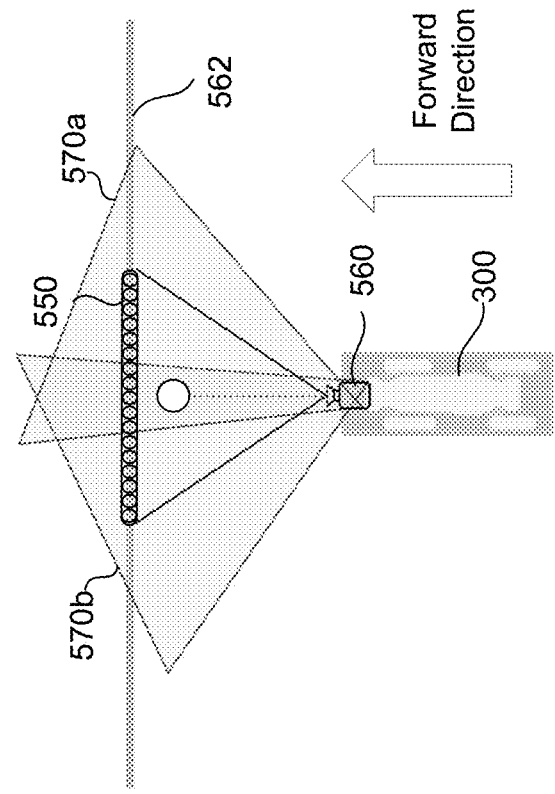
FIGS. 14A-14H are combinations of example scenes displayed on graphical user interfaces and example robotic environments during a pre-rotation process.
Figure 14A:
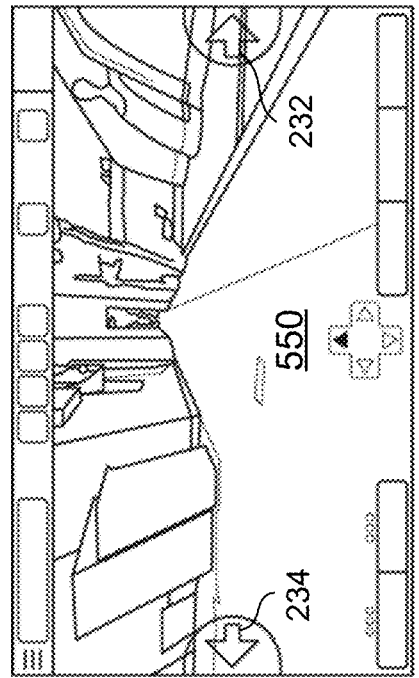
Figure 14D:
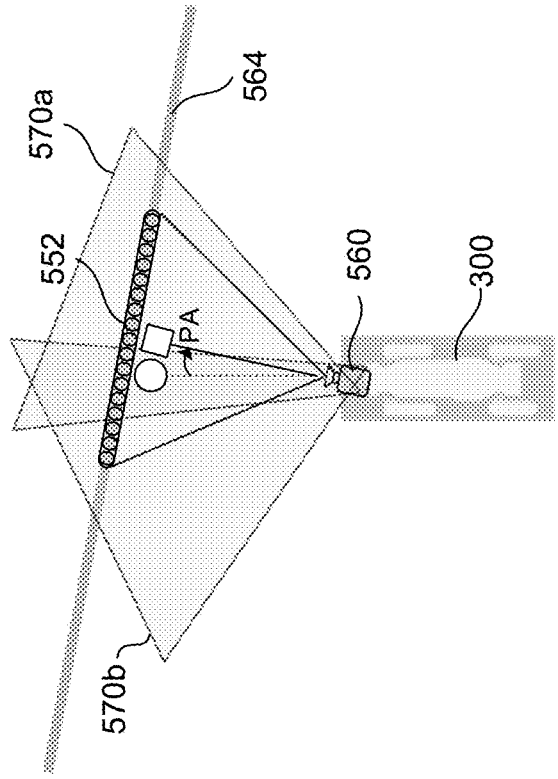
Figure 14C:
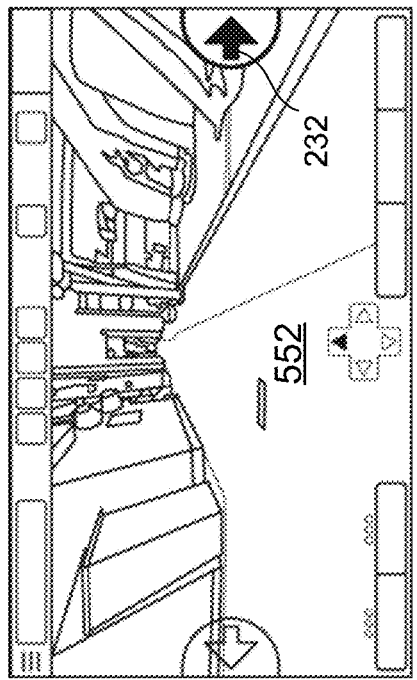
Figure 14F:
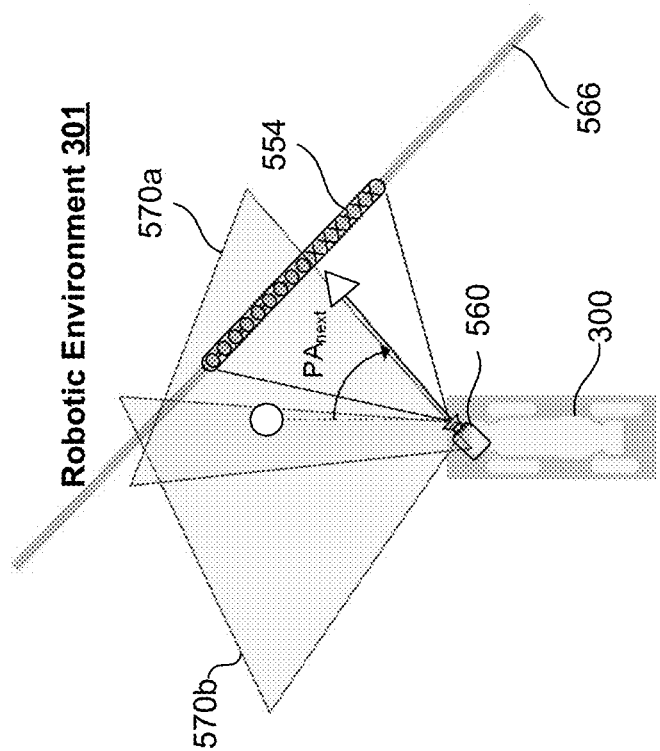
Figure 14E:
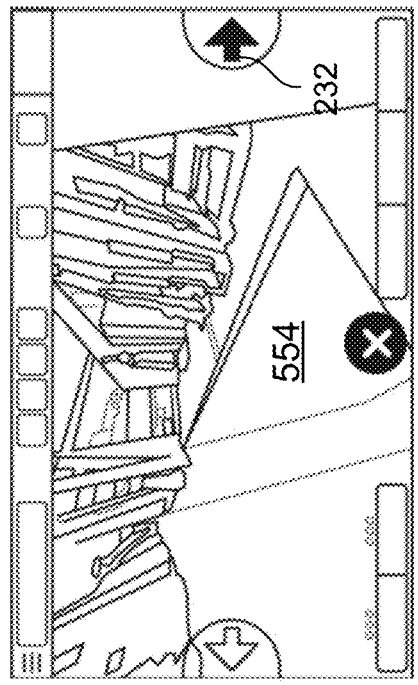
Figure 14H:
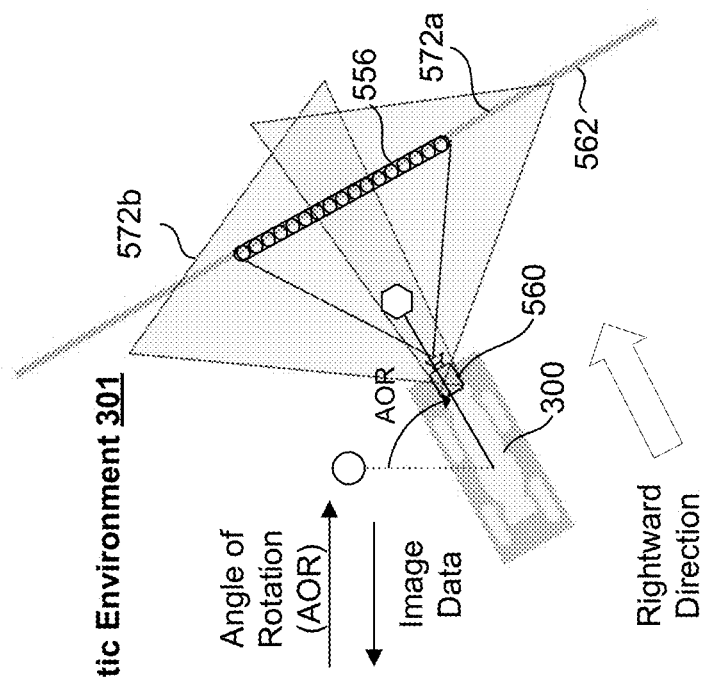
Figure 14G:
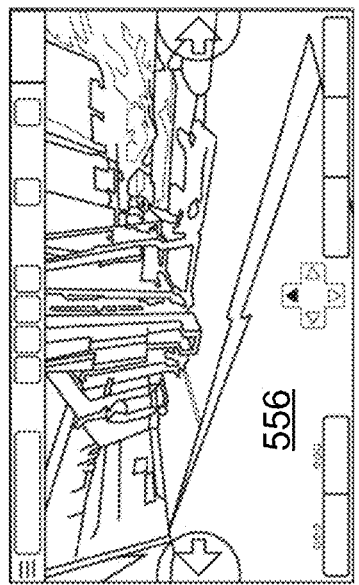

Scenes rendered in the GUI 221 displayed on the screen of the mobile device 200 provide the operator 10 with views of the robotic environment 301 from the robot's 300 perspective. FIGS. 14A and 14B depict a forward scene 550 at start time $T_{start}$, FIGS. 14C and 14D depict a preview scene 552 at intermediate time $T_1$, FIGS. 14E and 14F depict a next preview scene 554 at intermediate time $T_2$, and FIGS. 14G and 14H depict a rightward scene 556 at $T_{stop}$. Each of the scenes (550, 552, 554, 556) is rendered on the GUI 221 from a scene camera 560 projecting a virtual rectangle (562, 564, 566), as described above with reference to FIGS. 13A-13E. For example, referring to FIGS. 14A and 14B, to render the forward scene 550 on the GUI 221, the touch to go application 400 colors in points on the virtual rectangle 562 that correspond to pixels in real images 570a, 570b with image colors of the corresponding pixels. For points on the virtual rectangle 562 that do not correspond to any pixels in the real images 570a, 570b, the touch to go application 400 colors in those points black (or another color) (e.g., the blackout area 1340 of FIG. 13E). The real images 570a, 570b are captured by real cameras (not shown for clarity) on the robot 300. For example, with reference to FIG. 3D, the real cameras may be the forward-left camera 344a and the forward-right camera 344b.

With continued reference to FIGS. 14A and 14B, at the start time $T_{start}$, the robot 300 is in the present orientation or, for the sake of simplicity, the robot 300 is facing a forward direction. The real images 570a, 570b captured by the real cameras on the robot 300 are of the robotic environment in the forward direction, which in this example is called a "forward view" for ease of reference. The touch to go application 400 renders the forward scene 550 for display on the GUI 221 by coloring in the virtual rectangle 562 with image colors from the real image 570a and the real image 570b of the forward view. To the operator 10 viewing the GUI 221, it appears from the forward scene 550 that the robot 300 is facing the forward direction.

The operator 10 uses a first rotation graphic 232 and a second rotation graphic 234 displayed on the GUI 221 to command the robot 300 to turn right or left with respect to the present orientation. For this example, the operator 10 presses down on first rotation graphic 232 to provide a user input indication indicating a command to rotate the robot 300 the right from the present orientation towards the target orientation.

Referring to FIGS. 14C and 14D, at the intermediate time $T_1$ while the operator 10 is controlling the robot 300, the touch to go application 400 determines a preview angle PA from a virtual velocity corresponding to the user input indication. In the example shown, the preview angle PA at the intermediate time $T_1$ is shown as an angle between the present orientation (represented as a circle) and an intermediate orientation (represented as a square). The touch to go application 400 rotates the scene camera 560 by the preview angle PA resulting in a rotated virtual rectangle 564. The robot 300, however, remains facing the forward direction, and the real image 570a and the real image 570b are still of the forward view.

At the preview angle PA separating the rotated virtual rectangle 564 from the real image 570a and the real image 570b, FIG. 14D shows every point on the rotated virtual rectangle 564 finds correspondence with a pixel in either the real image 570a or the real image 570b. The touch to go application 400 renders the preview scene 552 for display on the GUI 221 by coloring in the rotated virtual rectangle 564 with image colors from the real image 570a and the real image 570b of the forward view. To the operator 10 viewing the GUI 221, it appears from the preview scene 552 that the robot 300 is turning to right in response to their command. In reality, however, the robot 300 is still facing the forward direction (i.e., the robot's 300 present orientation).

The operator 10 continues to press or holds down the right arrow button 232 to command the robot 300 to continue turning to the right towards the target orientation. Referring to FIGS. 14E and 14F, at the intermediate time $T_2$ while the operator 10 is controlling the robot 300, the touch to go application 400 determines a next preview angle $PA_{next}$ from the virtual velocity corresponding to the user input 202. In the example shown, the next preview angle $PA_{next}$ at the intermediate time $T_2$ is shown as an angle between the present orientation (represented as a circle) and an next intermediate orientation (represented as triangle). The touch to go application 400 rotates the scene camera 560 by the next preview angle $PA_{next}$ resulting in a next rotated virtual rectangle 566. The robot 300, however, remains facing the forward direction, and the real image 570a and the real image 570b are still of the forward view.

At the next preview angle $PA_{next}$ separating the next rotated virtual rectangle 566 from the real image 570a and the real image 570b, FIG. 14F shows that not every point on the next rotated virtual rectangle 566 finds correspondence with a pixel in either the real image 570a or the real image 570b. In simple terms, the scene camera 560 is at such a large or extreme angle relative to the real cameras on the robot 300 that there is not enough information or image data from the real image 570a and the real image 570b to color in all the points on the next rotated virtual rectangle 566. The touch to go application 400 renders the next preview scene 554 for display on the GUI 221 by coloring in points on the next rotated virtual rectangle 566 that match pixels found in the real image 570a and the real image 570b with image colors of those corresponding pixels (represented in the figure as O's).

For those points on the next rotated virtual rectangle 566 that do not match any pixel found in the real image 570a and the real image 570b, the touch to go application 400 colors those points (represented in the figure as X's) black or another color. The mobile device 200 displays to the operator 10 the next preview scene 554 with a black area to the right of the scene indicating a lack or absence of image data from the real image 570a and the real image 570b. To the operator 10, it appears from the next preview scene 554 that the robot 300 is turning to the right in response to their command. In reality, however, the robot 300 is still facing the forward direction. At intermediate time $T_2$, unlike before at intermediate time T1, the operator's 10 view of the robotic environment from the robot's 300 perspective is incomplete or partial due to the large next preview angle $PA_{next}$.

When the operator 10 sees the robot 300 has reached the target orientation, the operator 10 releases the right arrow button 232 and stops providing user input 202. At the stop time $T_{stop}$, the touch to go application 400 determines an angle of rotation AOR from the virtual velocity corresponding to the last of the user input 202. Referring to FIGS. 14G and 14F together with FIG. 4A, the touch to go application 400 provides a rotation command R with the angle of rotation AOR to the traversal system 380. The traversal system 380, in turn, with inputs from the sensor system 340 and/or the perception system 390 effects the rotation command R and the robot 300 turns from its present orientation to the target orientation (represented in the figure as a hexagon).

The robot 300 is now facing a rightward direction after turning to the target orientation. The real cameras on the robot 300 capture real images 572a, 572b of the robotic environment 301 in the rightward direction, which in this example is called a "rightward view" for ease of reference. The touch to go application 400 returns or otherwise resets the scene camera 560 and the virtual rectangle 562 to their non-rotated state such that they also face the rightward direction. It may be convenient to say that rotation wise, the robot 300 has "caught up" to the pre-rotation process of the touch to go application 400.

With the real cameras on the robot 300 and the scene camera 560 facing the same general direction, FIG. 14H shows every point on the virtual rectangle 562 has a corresponding pixel in either the real image 572a or the real image 572b of the rightward view. By contrast, in the example shown in FIG. 14F, the scene camera 560 is rotated too far to the right of the real cameras such that there is not enough information from the real image 570a and the real image 570b of the forward view to color in all the points on the next rotated virtual rectangle 566. The touch to go application 400 renders the rightward scene 556 for display on the GUI 221 by coloring in the virtual rectangle 562 with image colors from the real image 572a and the real image 572b of the rightward view.

In the foregoing discussion of the pre-rotating process, the touch to go application 400 is describes as providing the angle of rotation (in the rotation command R) once the operator 10 stops controlling the robot 300 (i.e., they no longer providing user input). Other implementations of the touch to go application 400 provide the robot 300 with an angle of rotation after receiving user input from the operator 10 for a set period of time (e.g., after a timer expires). For illustration purposes, the touch to go application 400 provides an angle of rotation after every five milliseconds of receiving user input. In this example, the operator 10 provides user input for fifteen milliseconds and the touch to go application 400 responds by providing a first angle of rotation at five milliseconds, a second angle of rotation at ten milliseconds, and third angle of rotation at fifteen milliseconds. With such implementations of the touch to go application 400, the robot 300 turns, incrementally, while the touch to go application 400 pre-rotates the robot 300, continuously. Advantageously, such implementations may reduce the amount of image data from real images that is missing when rendering preview scenes while pre-rotating the robot 300.

In addition, the foregoing discussion of the pre-rotating process describes the touch to go application 400 with reference to discrete instances in time (e.g., the intermediate time $T_1$ and the intermediate time $T_2$). Other implementations of pre-rotating process may occur on a continuous basis. For example, the touch to go application 400 pre-rotates the robot 300, continuously, in response to continuous user input provided by the operator 10. Pre-rotating in this manner provides immediate feedback allowing the operator 10 to see the end result of their command before the command is actually sent to the robot 300.

Figure 15:
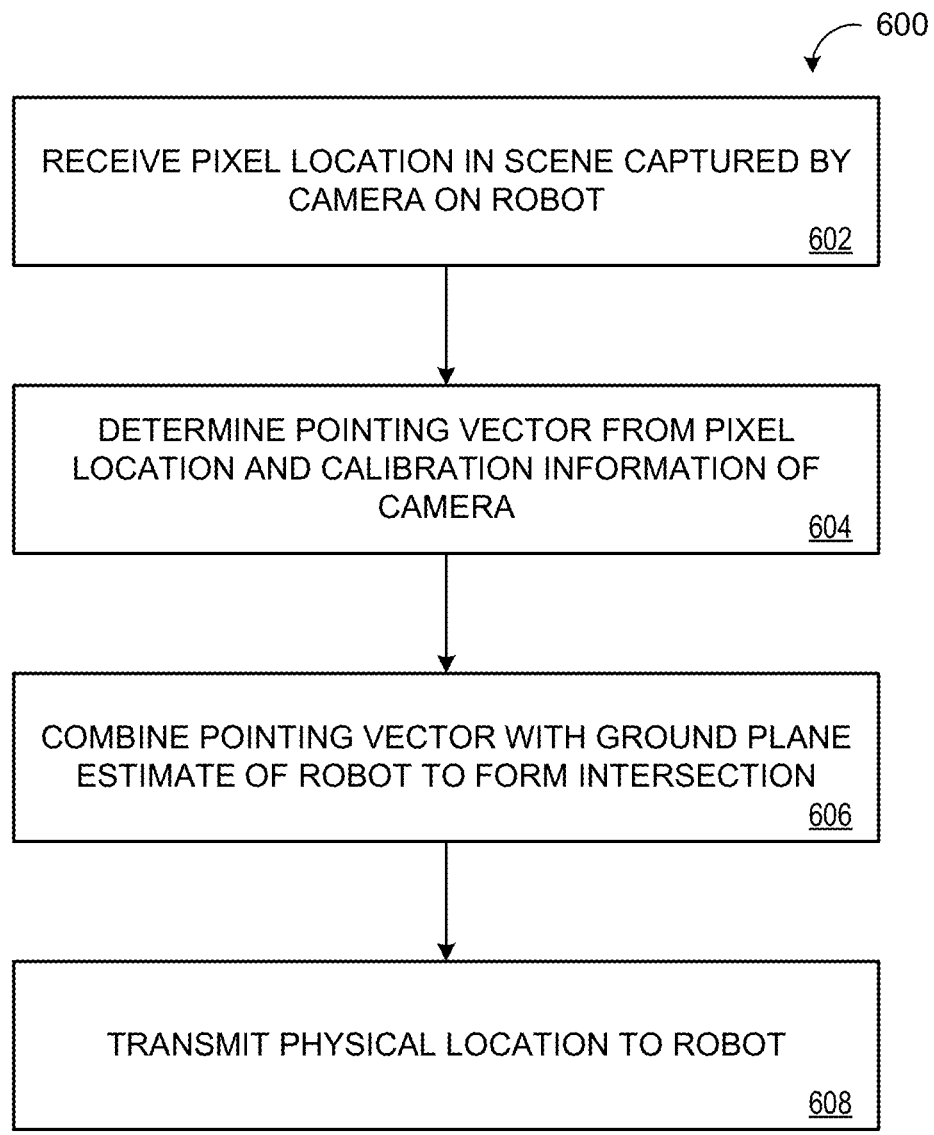
FIG. 15 is a flowchart of an example arrangement of operations for a method of navigating a robot.

FIG. 15 is a flowchart of an example arrangement of operations for a method 600 of navigating a robot 300. At operation 602, the method 600 receives a pixel location in a scene of a robotic environment captured by a camera on the robot 300. The pixel location being received is selected by an operator of the robot 300. At operation 604, the method 600 determines a pointing vector from the pixel location and calibration information of the camera. At operation 606, the method 600 combines the pointing vector with a ground plane estimate of the robot 300 to form an intersection. Here, the intersection includes a physical location in the robotic environment. At operation 608, the method 600 transmits the physical location to the robot 300 causing the robot 300 to navigate to the physical location in the robotic environment.

Figure 16:
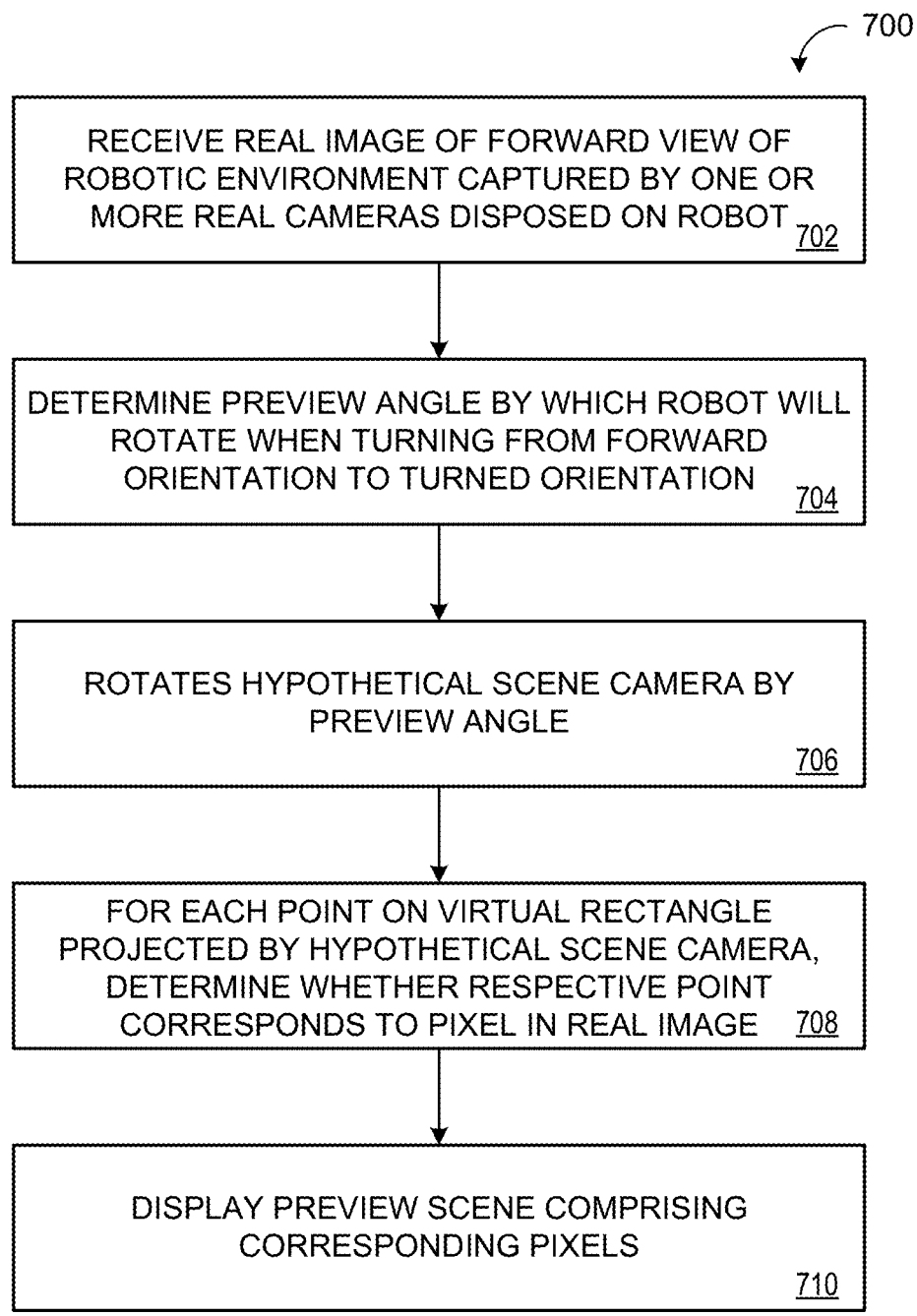
FIG. 16 is a flowchart of an example arrangement of operations for a method of pre-rotating a robot.

FIG. 16 is a flowchart of an example arrangement of operations for a method 700 of "pre-rotating" a robot 300. At operation 702, the method 700 receives a real image of a forward view of a robotic environment captured by a one or more real cameras disposed on the robot 300, where the robot 300 is in a forward orientation and facing a forward direction. At operation 704, the method 700 determines a preview angle by which the robot 300 will rotate when turning from the forward orientation to a turned orientation, where the robot 300 is facing a rightward direction or a leftward direction. At operation 706, the method 700 rotates a hypothetical scene camera by the preview angle. Here, the hypothetical scene camera is rotating with respect to the forward orientation of the robot 300. At operation 708, for each point on a virtual rectangle projected by the hypothetical scene camera, the method 700 determines whether a respective point corresponds to a pixel in the real image. At operation 710, the method 700 displays a preview scene including the corresponding pixels. Here, the preview scene is a view of the robotic environment that is turned by the preview angle in either the rightward direction or the leftward direction without the mobile robot actually turning from the forward orientation to the turned orientation.

Figure 17:
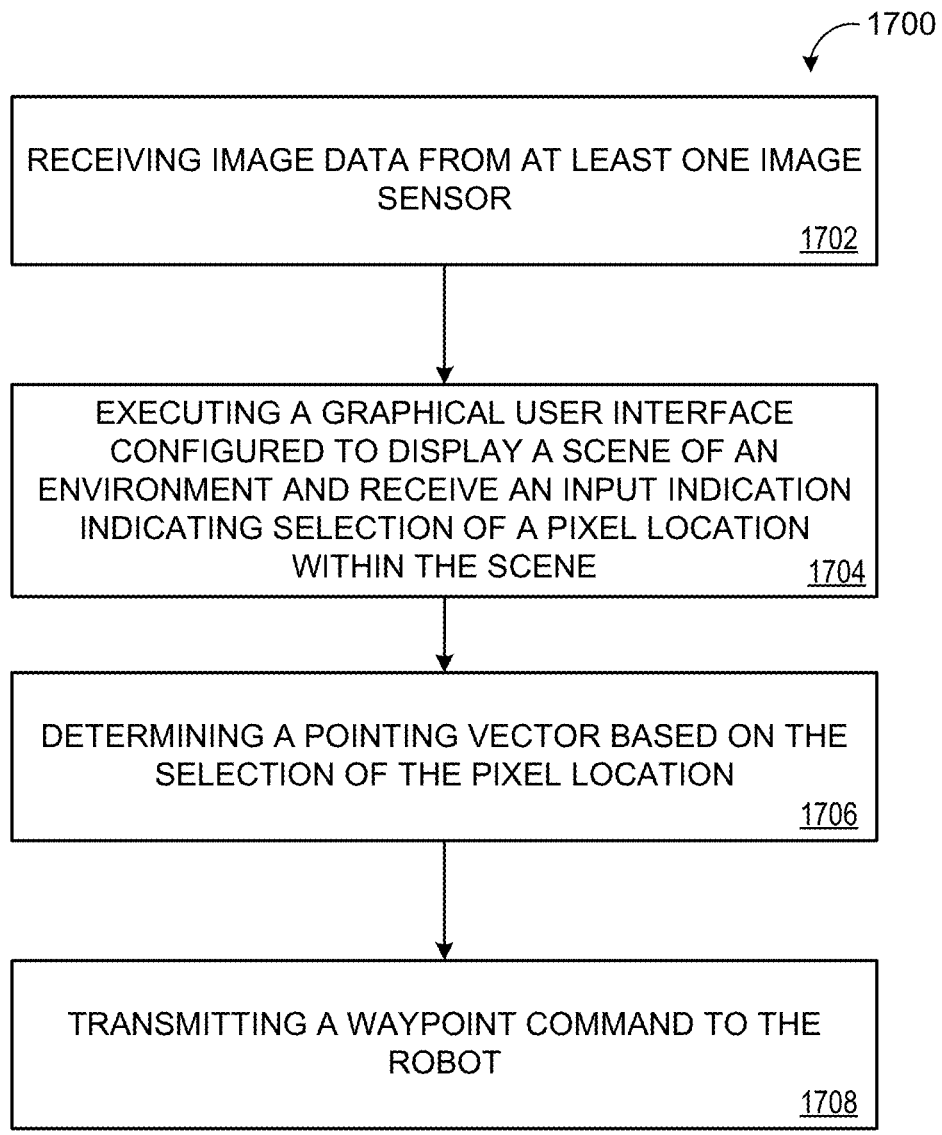
FIG. 17 is a flowchart of an example arrangement of operations for a method of controlling a robot.

FIG. 17 is a flowchart of an example arrangement of operations for a method 1700 of controlling a robot 300. At operation 1702, the method 1700 includes receiving, at data processing hardware 240 of an operator device 200, image data 342 from at least one image sensor 344. The image data 342 corresponds to an environment 301 about the robot 300.

At operation 1704, the method 1700 includes executing, by the data processing hardware 240, a graphical user interface (GUI) 221 for display on a screen 220 of the operator device 200. The GUI 221 is configured to display a scene 222 of the environment 301 about the robot 300 based on the image data 342 and receive an input indication indicating selection of a pixel location 224 within the scene 222 of the environment 301 about the robot 300

At operation 1706, the method 1700 includes determining, by the data processing hardware 240, a pointing vector V based on the selection of the pixel location 224. The pointing vector represents a direction of travel for navigating the robot 300 in the environment 301. At operation 1708, the method 1700 includes transmitting, by the data processing hardware 240, a waypoint command W to the robot 300. The waypoint command W when received by the robot 300 causes the robot 300 to navigate to a target location T. The target location is based on an intersection between the pointing vector V and a terrain estimate (e.g., ground plane estimate) G of the robot 300.

In some implementations, the data processing hardware 240 determines the terrain estimate (e.g., ground plane estimate) and sends the waypoint command W as an actual waypoint based on the intersection between the pointing vector V and the ground plane estimate G. In other implementations, rather than sending an actual "waypoint" based on the intersection I, the application 400 executing on the mobile device 200 sends a waypoint command W that includes a point in world space that corresponds to an origin of the at least one camera 344 capturing the image data 242 corresponding to the scene 222 and the pointing vector V in world space based on the selection of the pixel location 224 within the scene 222. In this scenario, upon receiving the waypoint command W that merely includes the point and pointing vector V in world space, the robot 300 responsively travels in a direction of the pointing vector V until a distance threshold is reached or the robot 300 detects an obstacle that intersects the pointing vector V. Advantageously, the data processing hardware 240 of the mobile device 200 does not have to determine a terrain estimate (e.g., ground plane estimate G) for calculating actual "waypoint coordinates" sent to the robot 300, but instead allows the robot 300 to continuously recalculate the terrain estimate (e.g., ground plane estimate) while navigating in the direction of the pointing vector V as it approaches the target location T. This may optimize navigation of the robot 300 in scenarios when a calculated/determined terrain estimate (e.g., ground plane estimate) on the mobile device 200 is invalid.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 18:
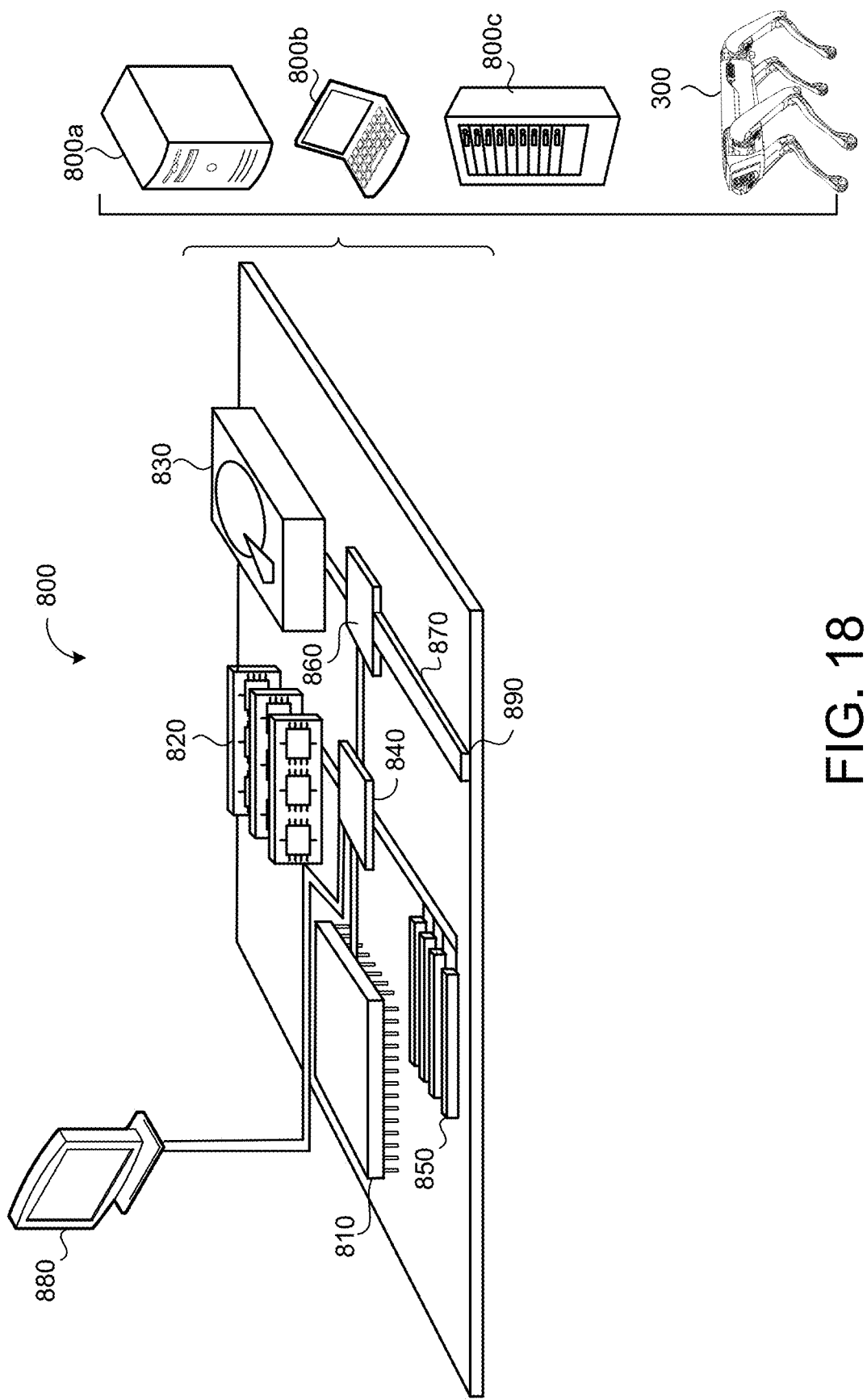
FIG. 18 is a schematic view of an example computing device that may be used to implement the systems and methods described herein.

FIG. 18 is schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/controller 840 connecting to the memory 820 and high-speed expansion ports 850, and a low speed interface/controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800a or multiple times in a group of such servers 800a, as a laptop computer 800b, or as part of a rack server system 800c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware of an operator device, image data from at least one image sensor, the image data corresponding to an environment about a robot, the robot comprising a quadruped robot;
   executing, by the data processing hardware, a graphical user interface for display on a screen of the operator device, the graphical user interface configured to:
      display a scene of the environment about the robot based on the image data; and
      receive an input indication indicating selection of a pixel location within the scene of the environment about the robot;
   determining, by the data processing hardware, a pointing vector based on the selection of the pixel location, the pointing vector representing a direction of travel for navigating the robot in the environment; and
   transmitting, by the data processing hardware, a waypoint command to the robot, the waypoint command, when received by the robot, causing the robot to navigate to a target location, the target location based on an intersection between the pointing vector and a terrain estimate of the robot.

2. The method of claim 1, wherein the scene of the environment about the robot comprises any one of:
   a forward scene of the environment based on the image data, the image data captured by a forward-left camera and a forward-right camera disposed on the robot;
   a left scene of the environment based on the image data, the image data captured by a left camera disposed on the robot;
   a right scene of the environment based on the image data, the image data captured by a right camera disposed on the robot;
   an aft scene of the environment based on the image data, the aft scene captured by an aft camera disposed on the robot; or
   a top-down scene of the robot based on the image data, the image data captured by a payload camera, the forward-left camera, the forward-right camera, the left camera, the right camera, and the aft camera.

3. The method of claim 1, further comprising:
   determining, by the data processing hardware, whether the intersection between the pointing vector and the terrain estimate is in front of the robot; and
   when the intersection between the pointing vector and the terrain estimate is in front of the robot, identifying, by the data processing hardware, the intersection as the target location.

4. The method of claim 3, further comprising, when the intersection between the pointing vector and the terrain estimate is behind the robot:
- reflecting, by the data processing hardware, the intersection to determine a reflected intersection in front of the robot; and
- identifying, by the data processing hardware, the reflected intersection as the target location.

5. The method of claim 3, further comprising, prior to identifying the intersection as the target location:
- determining, by the data processing hardware, that a first distance between a current position of the robot and the intersection between the pointing vector and the terrain estimate dissatisfies a threshold distance; and
- moving, by the data processing hardware, the intersection to an intermediate location closer to the robot to form a moved intersection, wherein a second distance between the current position of the robot and the moved intersection satisfies the threshold distance.

6. The method of claim 1, wherein the robot is configured to:
- determine whether the target location is located behind an obstacle; and one of:
- when the target location is not located behind the obstacle, autonomously navigate to the target location; or
- when the target location is located behind the obstacle:
  - determine whether maneuvering around the obstacle is feasible; and
  - when maneuvering around the obstacle is feasible, autonomously navigate the robot around the obstacle and to the target location.

7. The method of claim 6, wherein the robot is further configured to, when the target location is located behind the obstacle and when maneuvering around the obstacle is not feasible, prevent the robot from autonomously navigating to the target location.

8. The method of claim 1, wherein the at least one image sensor comprises one or more fisheye cameras and one or more infrared cameras.

9. The method of claim 1, wherein:
- the at least one image sensor is disposed on the robot; and
- the operator device is in communication with the image sensor via a network.

10. The method of claim 1, wherein the graphical user interface is further configured to:
- receive a rotation input to rotate a field of view of the environment about the robot in a direction away from a current scene displayed in the graphical user interface; and
- display a preview scene by rotating the field of view of the environment about the robot in the direction away from the current scene.

11. The method of claim 10, wherein the graphical user interface is configured to display the preview scene without requiring physical movement by the robot.

12. The method of claim 10, wherein the graphical user interface is configured to receive the rotation input in response to receiving an input indication indicating selection of a rotation graphic displayed in the graphical user interface.

13. The method of claim 10, wherein the rotation of the field of view of the environment about the robot in the direction away from the current scene simulates the robot executing a turning maneuver in the direction away from the current scene and toward the preview scene.

14. A system comprising:
- data processing hardware; and
- memory hardware in communication with the data processing hardware, the memory hardware storing instructions that when executed on the data processing hardware cause the data processing hardware to perform operations comprising:
  - receiving image data from at least one image sensor, the image data corresponding to an environment about a robot, the robot comprising a quadruped robot;
  - executing a graphical user interface for display on a screen of an operator device, the graphical user interface configured to:
    - display a scene of the environment about the robot based on the image data; and
    - receive an input indication indicating selection of a pixel location within the scene of the environment about the robot;
  - determining a pointing vector based on the selection of the pixel location, the pointing vector representing a direction of travel for navigating the robot in the environment; and
  - transmitting a waypoint command to the robot, the waypoint command when received by the robot causing the robot to navigate to a target location, the target location based on an intersection between the pointing vector and a terrain estimate of the robot.

15. The system of claim 14, wherein the scene of the environment about the robot comprises any one of:
- a forward scene of the environment based on the image data, the image data captured by a forward-left camera and a forward-right camera disposed on the robot;
- a left scene of the environment based on the image data, the image data captured by a left camera disposed on the robot;
- a right scene of the environment based on the image data, the image data captured by a right camera disposed on the robot;
- an aft scene of the environment based on the image data, the aft scene captured by an aft camera disposed on the robot; or
- a top-down scene of the robot based on the image data, the image data captured by a payload camera, the forward-left camera, the forward-right camera, the left camera, the right camera, and the aft camera.

16. The system of claim 14, wherein the operations further comprise:
- determining whether the intersection between the pointing vector and the terrain estimate is in front of the robot; and
- when the intersection between the pointing vector and the terrain estimate is in front of the robot, identifying the intersection as the target location.

17. The system of claim 16, wherein the operations further comprise, when the intersection between the pointing vector and the terrain estimate is behind the robot:
- reflecting the intersection to determine a reflected intersection in front of the robot; and
- identifying the reflected intersection as the target location.

18. The system of claim 16, wherein the operations further comprise, prior to identifying the intersection as the target location:
- determining that a first distance between a current position of the robot and the intersection between the pointing vector and the terrain estimate dissatisfies a threshold distance; and
- moving the intersection to an intermediate location closer to the robot to form a moved intersection, wherein a second distance between the current position of the robot and the moved intersection satisfies the threshold distance.

19. The system of claim 14, wherein the robot is configured to:
determine whether the target location is located behind an obstacle; and one of:
when the target location is not located behind the obstacle, autonomously navigate to the target location; or
when the target location is located behind the obstacle:
determine whether maneuvering around the obstacle is feasible; and
when maneuvering around the obstacle is feasible, autonomously navigate the robot around the obstacle and to the target location.

20. The system of claim 19, wherein the robot is further configured to, when the target location is located behind the obstacle and when maneuvering around the obstacle is not feasible, prevent the robot from autonomously navigating to the target location.

21. The system of claim 14, wherein the at least one image sensor comprises one or more fisheye cameras and one or more infrared cameras.

22. The system of claim 14, wherein:
the at least one image sensor is disposed on the robot; and
the operator device is in communication with the image sensor via a network.

23. The system of claim 14, wherein the graphical user interface is further configured to:
receive a rotation input to rotate a field of view of the environment about the robot in a direction away from a current scene displayed in the graphical user interface; and
display a preview scene by rotating the field of view of the environment about the robot in the direction away from the current scene.

24. The system of claim 23, wherein the graphical user interface is configured to display the preview scene without requiring physical movement by the robot.

25. The system of claim 23, wherein the graphical user interface is configured to receive the rotation input in response to receiving an input indication indicating selection of a rotation graphic displayed in the graphical user interface.

26. The system of claim 23, wherein the rotation of the field of view of the environment about the robot in the direction away from the current scene simulates the robot executing a turning maneuver in the direction away from the current scene and toward the preview scene.

27. A method comprising:
receiving, at data processing hardware of an operator device, image data from at least one image sensor, the image data corresponding to an environment about a robot;
executing, by the data processing hardware, a graphical user interface for display on a screen of the operator device, the graphical user interface configured to:
display a scene of the environment about the robot based on the image data; and
receive an input indication indicating selection of a pixel location within the scene of the environment about the robot;
receive a rotation input to rotate a field of view of the environment about the robot in a direction away from a current scene displayed in the graphical user interface; and
display a preview scene by rotating the field of view of the environment about the robot in the direction away from the current scene,
wherein the graphical user interface is configured to display the preview scene without requiring physical movement by the robot;
determining, by the data processing hardware, a pointing vector based on the selection of the pixel location, the pointing vector representing a direction of travel for navigating the robot in the environment; and
transmitting, by the data processing hardware, a waypoint command to the robot, the waypoint command, when received by the robot, causing the robot to navigate to a target location, the target location based on an intersection between the pointing vector and a terrain estimate of the robot.

28. A system comprising:
data processing hardware; and
memory hardware in communication with the data processing hardware, the memory hardware storing instructions that when executed on the data processing hardware cause the data processing hardware to perform operations comprising:
receiving image data from at least one image sensor, the image data corresponding to an environment about a robot;
executing a graphical user interface for display on a screen of an operator device, the graphical user interface configured to:
display a scene of the environment about the robot based on the image data; and
receive an input indication indicating selection of a pixel location within the scene of the environment about the robot;
receive a rotation input to rotate a field of view of the environment about the robot in a direction away from a current scene displayed in the graphical user interface; and
display a preview scene by rotating the field of view of the environment about the robot in the direction away from the current scene,
wherein the graphical user interface is configured to display the preview scene without requiring physical movement by the robot;
determining a pointing vector based on the selection of the pixel location, the pointing vector representing a direction of travel for navigating the robot in the environment; and
transmitting a waypoint command to the robot, the waypoint command when received by the robot causing the robot to navigate to a target location, the target location based on an intersection between the pointing vector and a terrain estimate of the robot.

* * * * *